(12) United States Patent
Trovero et al.

(10) Patent No.: US 8,364,517 B2
(45) Date of Patent: *Jan. 29, 2013

(54) COMPUTER-IMPLEMENTED SYSTEMS AND METHODS FOR FORECAST RECONCILIATION

(75) Inventors: Michele Angelo Trovero, Dunellen, NJ (US); Mahesh V. Joshi, Cary, NC (US); Michael James Leonard, Apex, NC (US); Richard Patrick Fahey, Cary, NC (US); Dmitry V. Golovashkin, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/328,811

(22) Filed: Dec. 16, 2011

(65) Prior Publication Data

US 2012/0089609 A1    Apr. 12, 2012

Related U.S. Application Data

(63) Continuation of application No. 11/848,982, filed on Aug. 31, 2007.

(60) Provisional application No. 60/856,868, filed on Nov. 3, 2006.

(51) Int. Cl.
*G06Q 10/00* (2006.01)

(52) U.S. Cl. .......... 705/7.31; 705/7; 705/7.11; 705/7.29

(58) Field of Classification Search ........................ 705/7
See application file for complete search history.

(56) References Cited

U.S. PATENT DOCUMENTS

| | | | |
|---|---|---|---|
| 5,991,740 A | 11/1999 | Messer | |
| 5,995,943 A | 11/1999 | Bull et al. | |
| 6,052,481 A | 4/2000 | Grajski et al. | |
| 6,128,624 A | 10/2000 | Papierniak et al. | |
| 6,151,584 A | 11/2000 | Papierniak et al. | |
| 6,169,534 B1 | 1/2001 | Raffel et al. | |
| 6,189,029 B1 | 2/2001 | Fuerst | |
| 6,208,975 B1 | 3/2001 | Bull et al. | |
| 6,216,129 B1 | 4/2001 | Eldering | |
| 6,230,064 B1 | 5/2001 | Nakase et al. | |
| 6,286,005 B1 | 9/2001 | Cannon | |
| 6,308,162 B1 | 10/2001 | Ouimet et al. | |
| 6,317,731 B1 | 11/2001 | Luciano | |
| 6,334,110 B1 | 12/2001 | Walter et al. | |
| 6,356,842 B1 | 3/2002 | Intriligator et al. | |
| 6,397,166 B1 | 5/2002 | Leung et al. | |
| 6,400,853 B1 | 6/2002 | Shiiyama | |
| 6,526,405 B1 | 2/2003 | Mannila et al. | |
| 6,539,392 B1 | 3/2003 | Rebane | |
| 6,542,869 B1 | 4/2003 | Foote | |
| 6,564,190 B1 | 5/2003 | Dubner | |
| 6,591,255 B1 | 7/2003 | Tatum et al. | |
| 6,611,726 B1 | 8/2003 | Crosswhite | |
| 6,640,227 B1 | 10/2003 | Andreev | |
| 6,735,738 B1 | 5/2004 | Kojima | |
| 6,775,646 B1 | 8/2004 | Tufillaro et al. | |
| 6,792,399 B1 | 9/2004 | Phillips et al. | |
| 6,850,871 B1 | 2/2005 | Barford et al. | |
| 6,878,891 B1 | 4/2005 | Josten et al. | |

(Continued)

*Primary Examiner* — Leland Marcus
(74) *Attorney, Agent, or Firm* — Jones Day

(57) ABSTRACT

Systems and methods for reconciling a forecast are presented. A method can be used that receives a plurality of hierarchical forecast data sets. An output child data set including an index value and a status indicator representing an unprocessed state is generated. A particular parent data set forecast is identified from a parent data set. Locations for a group of one or more child data set forecasts that are children of the particular parent data set forecast are identified and accessed. A reconciliation operation is performed, a particular child data set forecast is adjusted and stored in a record, and a status indicator for the record is modified.

30 Claims, 32 Drawing Sheets

U.S. PATENT DOCUMENTS

| | | |
|---|---|---|
| 6,928,398 B1 | 8/2005 | Fang et al. |
| 6,978,249 B1 | 12/2005 | Beyer et al. |
| 7,072,863 B1 | 7/2006 | Phillips et al. |
| 7,103,222 B2 | 9/2006 | Peker |
| 7,130,822 B1 | 10/2006 | Their et al. |
| 7,171,340 B2 | 1/2007 | Brocklebank |
| 7,194,434 B2 | 3/2007 | Piccioli |
| 7,216,088 B1 | 5/2007 | Chappel et al. |
| 7,222,082 B1 | 5/2007 | Adhikari et al. |
| 7,236,940 B2 | 6/2007 | Chappel |
| 7,251,589 B1 | 7/2007 | Crowe et al. |
| 7,260,550 B1 | 8/2007 | Notani |
| 7,280,986 B2 | 10/2007 | Goldberg et al. |
| 7,433,834 B2 | 10/2008 | Joao |
| 7,523,048 B1 | 4/2009 | Dvorak |
| 7,530,025 B2 | 5/2009 | Ramarajan et al. |
| 7,565,417 B2 | 7/2009 | Rowady, Jr. |
| 7,570,262 B2 | 8/2009 | Landau et al. |
| 7,610,214 B1 | 10/2009 | Dwarakanath et al. |
| 7,617,167 B2 | 11/2009 | Griffis et al. |
| 7,693,737 B2 | 4/2010 | Their et al. |
| 7,702,482 B2 | 4/2010 | Graepel et al. |
| 2002/0169657 A1 | 11/2002 | Singh et al. |
| 2003/0101009 A1 | 5/2003 | Seem |
| 2003/0105660 A1 | 6/2003 | Walsh et al. |
| 2003/0110016 A1 | 6/2003 | Stefek et al. |
| 2003/0154144 A1 | 8/2003 | Pokorny et al. |
| 2003/0187719 A1 | 10/2003 | Brocklebank |
| 2003/0200134 A1 | 10/2003 | Leonard et al. |
| 2004/0172225 A1 | 9/2004 | Hochberg et al. |
| 2005/0102107 A1 | 5/2005 | Porikli |
| 2005/0159997 A1 | 7/2005 | John |
| 2005/0177351 A1 | 8/2005 | Goldberg et al. |
| 2005/0209732 A1 | 9/2005 | Audimoolam et al. |
| 2005/0249412 A1 | 11/2005 | Radhakrishnan et al. |
| 2006/0063156 A1 | 3/2006 | Willman et al. |
| 2006/0064181 A1 | 3/2006 | Kato |
| 2006/0085380 A1 | 4/2006 | Cote et al. |
| 2006/0112028 A1 | 5/2006 | Xiao et al. |
| 2006/0143081 A1 | 6/2006 | Argaiz |
| 2006/0241923 A1 | 10/2006 | Xu et al. |
| 2006/0247900 A1 | 11/2006 | Breocklebank |
| 2007/0162301 A1 | 7/2007 | Sussman et al. |
| 2007/0291958 A1 | 12/2007 | Jehan |
| 2008/0294651 A1 | 11/2008 | Masuyama et al. |
| 2009/0018996 A1 | 1/2009 | Hunt et al. |

NOTE: ALL ILLUSTRATIONS ARE SHOWN FOR A SINGLE TIME INSTANCE; SAME PROCESS GETS APPLIED TO EACH TIME INSTANCE

COMPUTER-IMPLEMENTED SYSTEMS AND METHODS FOR FORECAST RECONCILIATION

CROSS-REFERENCE TO RELATED APPLICATIONS

This application is a continuation of U.S. patent application Ser. No. 11/848,982, (entitled "Computer-Implemented Systems and Methods for Forecast Reconciliation" and filed on Aug. 31, 2007), which claims priority to and the benefit of U.S. Provisional Application No. 60/856,868, (entitled "Computer-Implemented Systems And Methods For Forecast Generation" and filed on Nov. 3, 2006), the entirety of both of which (including any and all figures) is incorporated herein by reference.

This application contains subject matter that may be considered related to subject matter disclosed in the following commonly owned United States patent applications: U.S. patent application Ser. No. 11/431,089 (entitled Computer-Implemented System And Method For Generating Forecasts and filed on May 9, 2006); U.S. patent application Ser. No. 11/431,116 (entitled Computer-Implemented Systems And Methods For Processing Time Series Data and filed on May 9, 2006); U.S. patent application Ser. No. 11/431,123 (entitled Computer-Implemented Systems And Methods For Storing Data Analysis Models and filed on May 9, 2006); U.S. patent application Ser. No. 11/431,127 (entitled Computer-Implemented Systems And Methods For Defining Events and filed on May 9, 2006). The entire disclosures (including any and all figures) of each of these applications are incorporated herein by reference.

TECHNICAL FIELD

This document relates generally to computer-implemented statistical analysis techniques and more particularly to reconciling forecasts.

BACKGROUND

Enterprises in various industries have their data organized hierarchically. For example, a retail organization may have its sales data organized by states, regions, counties, and cities. When the data are organized in a hierarchical fashion, there are often accounting constraints that link series at different levels of the hierarchy. As an illustration, the sales of a particular product by a retail company is the sum of the sales of the same product in all stores belonging to the company. However, imposing such constraints during the forecasting process can be difficult or impossible. Therefore, the series are often forecast independently at different levels so that the resulting forecasts do not abide by the constraints binding the original series.

SUMMARY

In accordance with the teachings provided herein, systems and methods for operation upon data processing devices are provided for performing statistical forecasts of data that are arranged in a plurality of dimensions. For example, a system and method can be configured to generate a forecast for a dimension based upon the data that is associated with the dimension. The generating step generates a plurality of forecasts for the dimensions such that the forecast of a first dimension is generated independently of other dimensions. The forecast of the first dimension affects the constraints that are imposed on the forecasts of other dimensions. Other constraints independent of the first dimension can be present. A reconciliation is performed between the forecast of the first dimension and the forecast of the other dimensions in order to determine how the other dimensions' forecasts are influenced by the first dimension's forecast through the constraints. After the reconciliation, reconciled forecasts that satisfy all constraints are provided for analysis, such as but not limited to for use by a decision process system (e.g., planning activities, resource allocation, manpower scheduling, distribution of resources, etc.).

DETAILED DESCRIPTION

Figure 1:
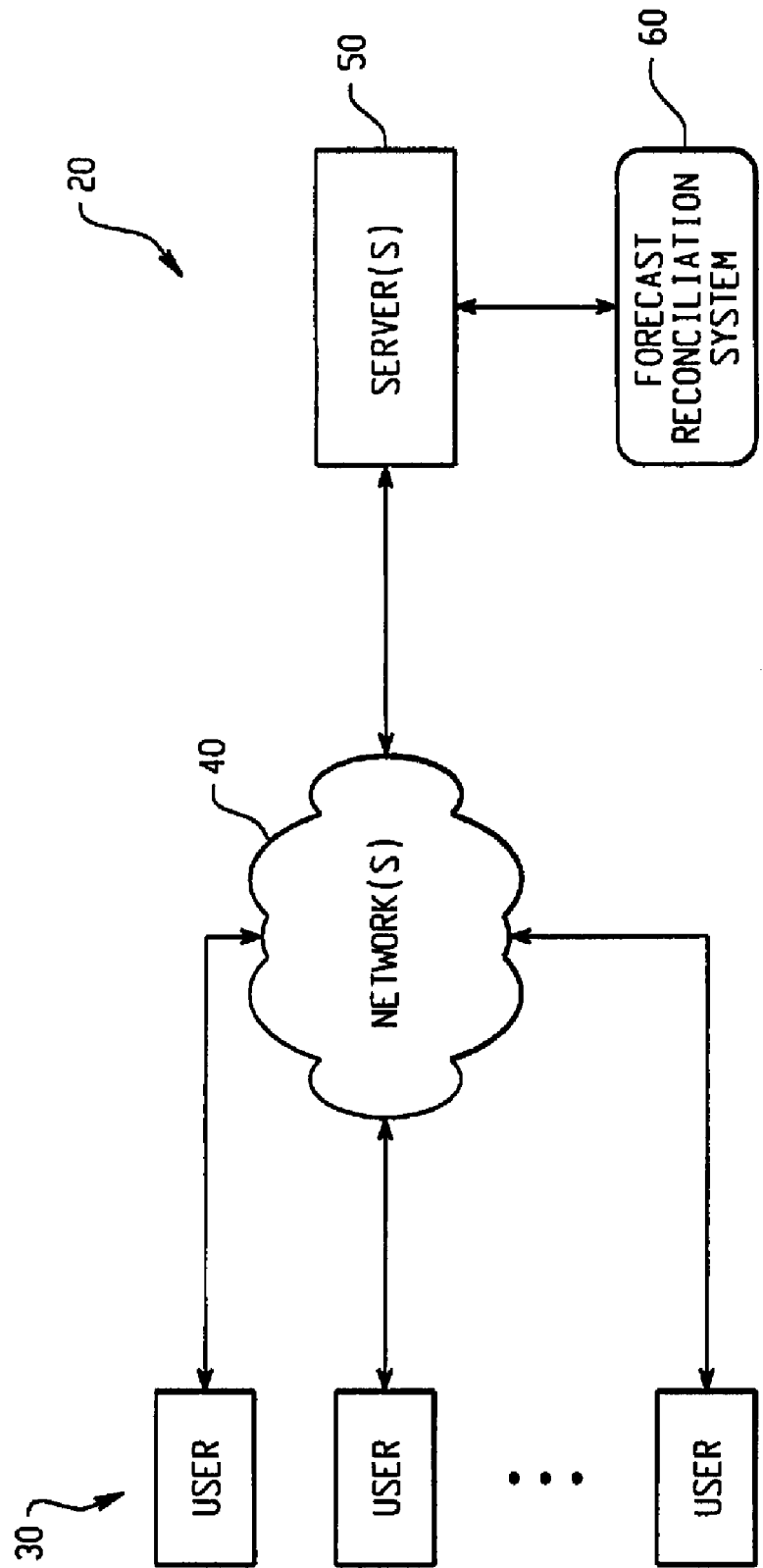
FIG. 1 is a block diagram depicting an environment wherein users can interact with a forecast reconciliation system.

FIG. 1 depicts at 20 an environment wherein users 30 can interact with a forecast reconciliation system 60 to reconcile multiple forecasts (e.g., predictions, etc.) that are at different data dimensions (e.g., different levels in a hierarchy). When the data are organized in different dimensions, there are often constraints that link series at the different dimensions. The forecast reconciliation system 60 addresses such constraints after the forecasting process. In this example, the reconciliation process is the after-the-fact process through which such constraints are enforced.

The users 30 can interact with the forecast reconciliation system 60 through a number of ways, such over one or more networks 40. Server(s) 50 accessible through the network(s) 40 can host the forecast reconciliation system 60. It should be understood that the forecast reconciliation system 60 could also be provided via different computer architectures, such as on a stand-alone computer for access by a user. The forecast reconciliation system 60 can be configured as an a web-based reporting and analysis tool that provides users flexibility and functionality for performing forecast-related reconciliation operations.

Figure 2:
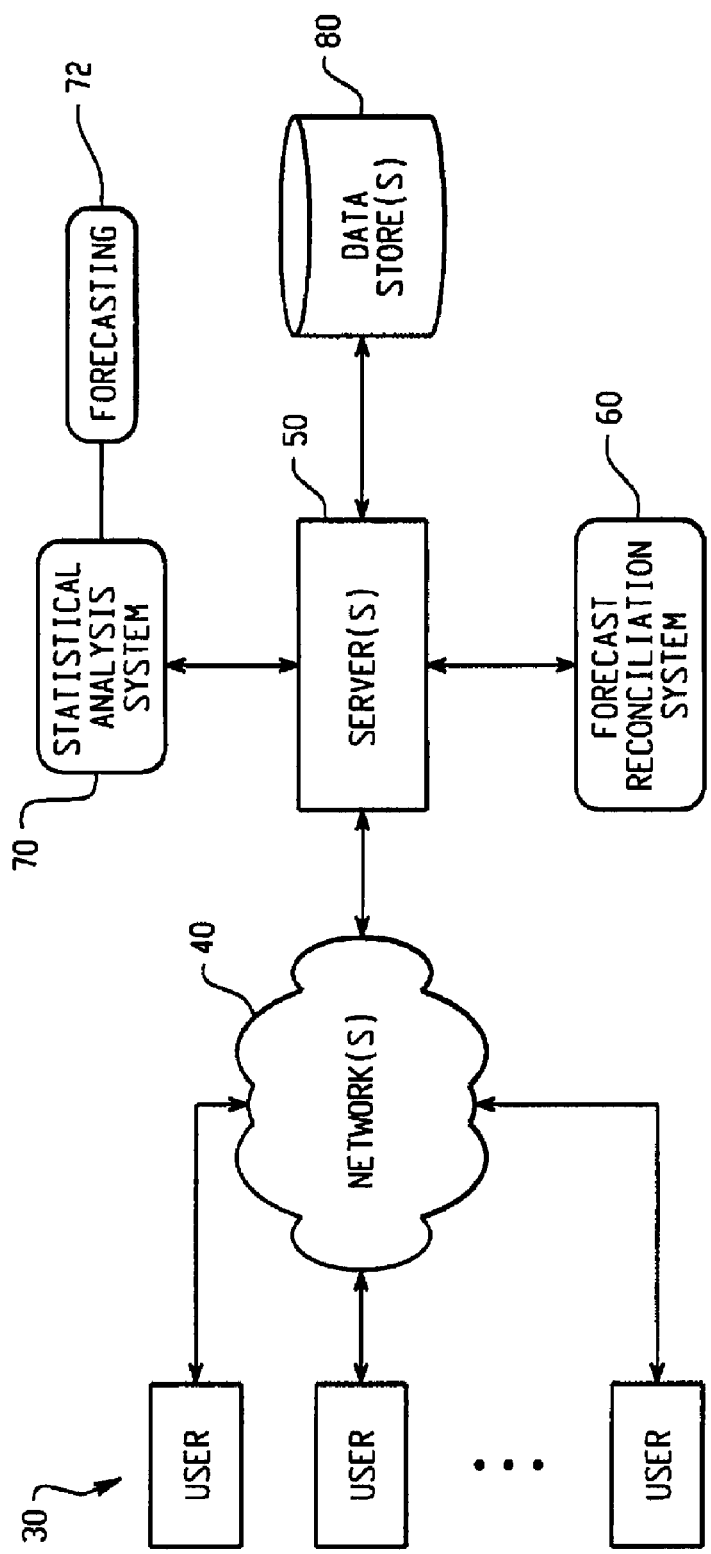
FIG. 2 is a block diagram depicting a forecast reconciliation system being used separately or in conjunction with a statistical analysis system.

FIG. 2 illustrates that the forecast reconciliation system 60 can be used separately or in conjunction with a statistical analysis system 70. This statistical analysis system 70 can include a forecasting process 72 in order to generate forecasts for the data that is organized in different levels or dimensions. Reconciliation of those forecasts can then be handled by the forecast reconciliation system 60. Data store(s) 80 can store the data to be forecasted as well as any intermediate data calculations and data results.

Figure 3:
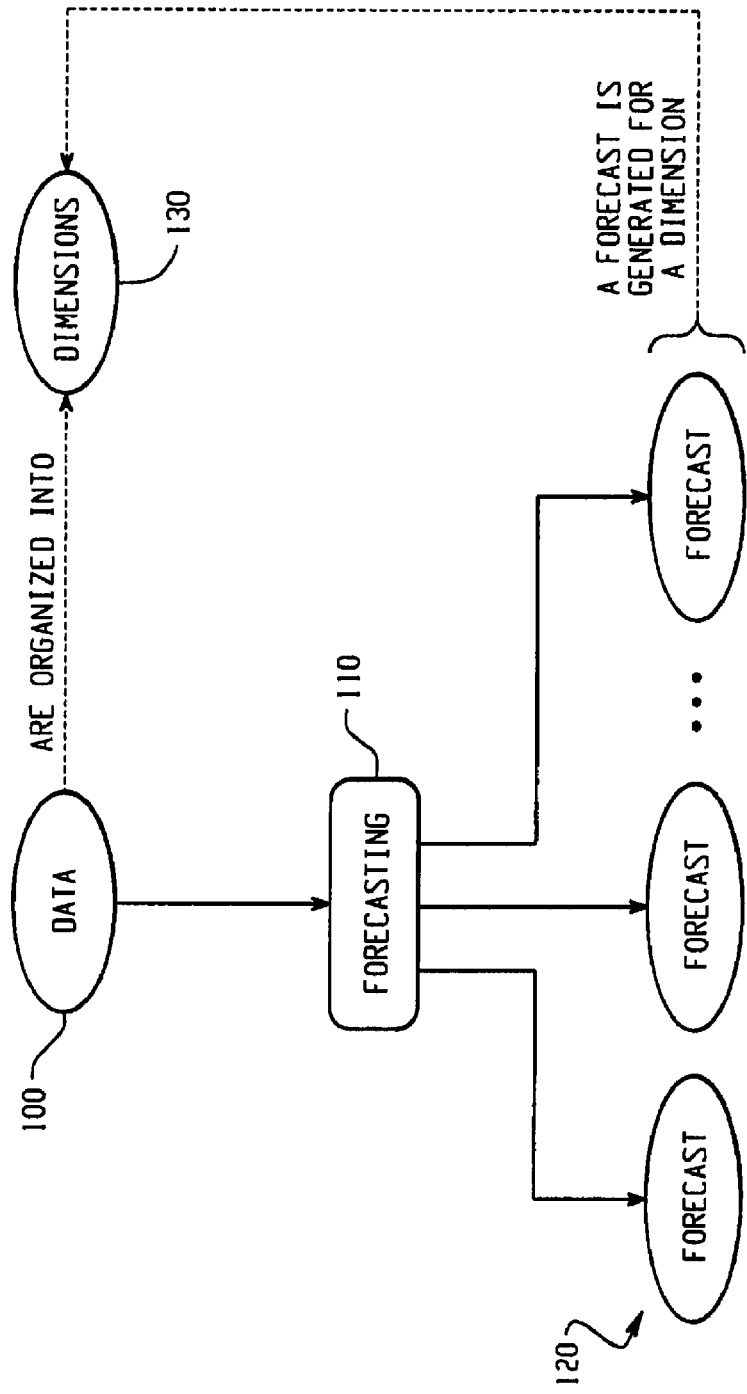
FIG. 3 is a block diagram depicting data being forecasted into different dimensions.

FIG. 3 illustrates that the data 100 to be forecasted via a forecasting process 110 is organized into different dimensions 130. As shown at 120, a forecast is generated for a dimension using the data 100.

Figure 4:
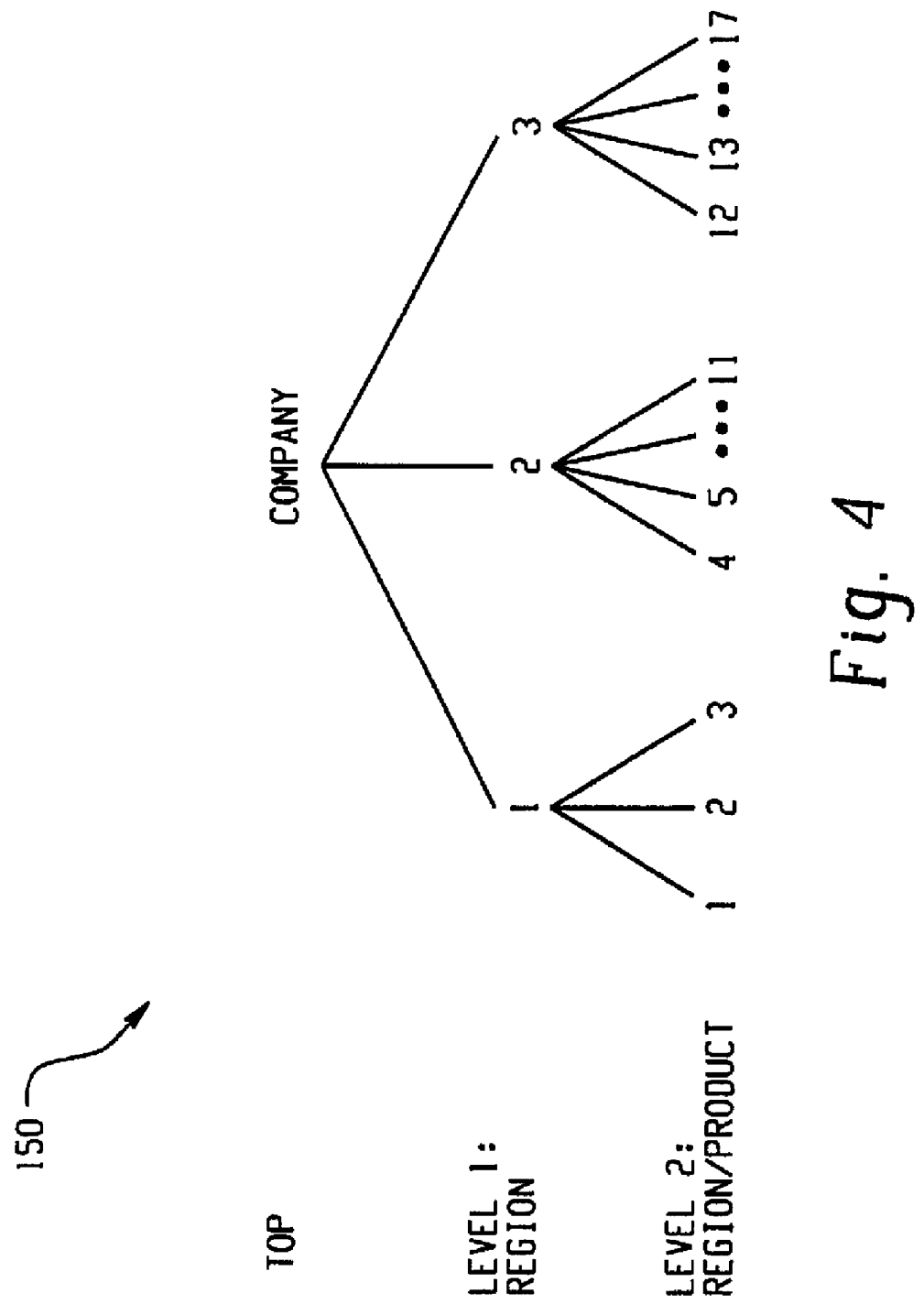
FIG. 4 shows an example of data being arranged in different dimensions.

FIG. 4 shows at 150 an example of data being arranged in different dimensions. In FIG. 4, data is arranged as a product hierarchy, geography hierarchy, etc. Forecasts for the dependent variable sale are generated first at level 2, region/product, and then at level 1, region. The separate forecasts are then reconciled by using a reconciliation process.

Figure 5:
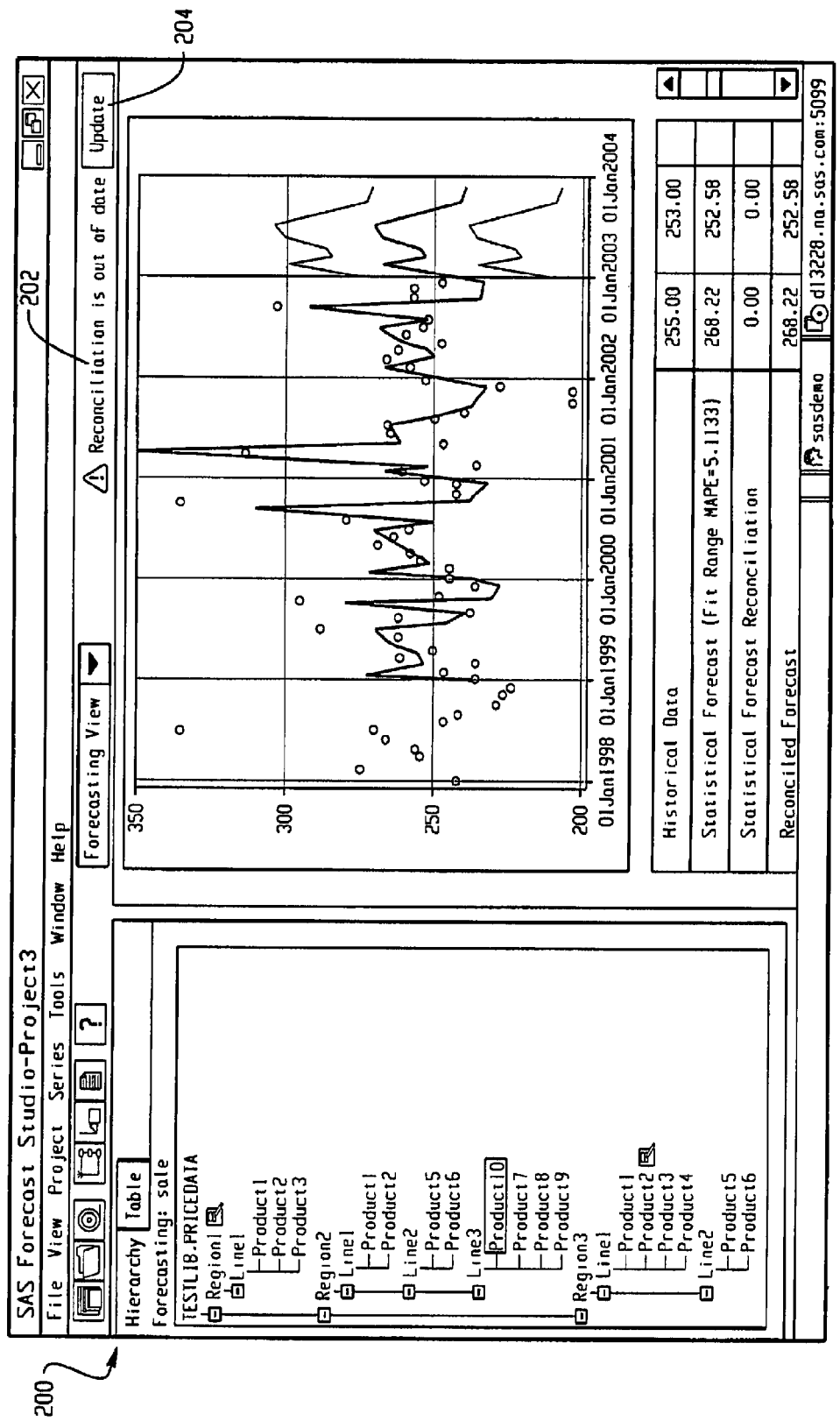
FIG. 5 is a graphical user interface wherein the data has been arranged by levels.

FIG. 5 depicts a graphical user interface at 200, wherein the data has been arranged by levels. For example, there is a geographical region level, a product line level, and a specific product level. The data for one of the levels is shown in the graph of the graphical user interface 200. Time series data is shown in the left portion of the graph, and forecasting is shown in the right portion of the graph.

Figure 6:
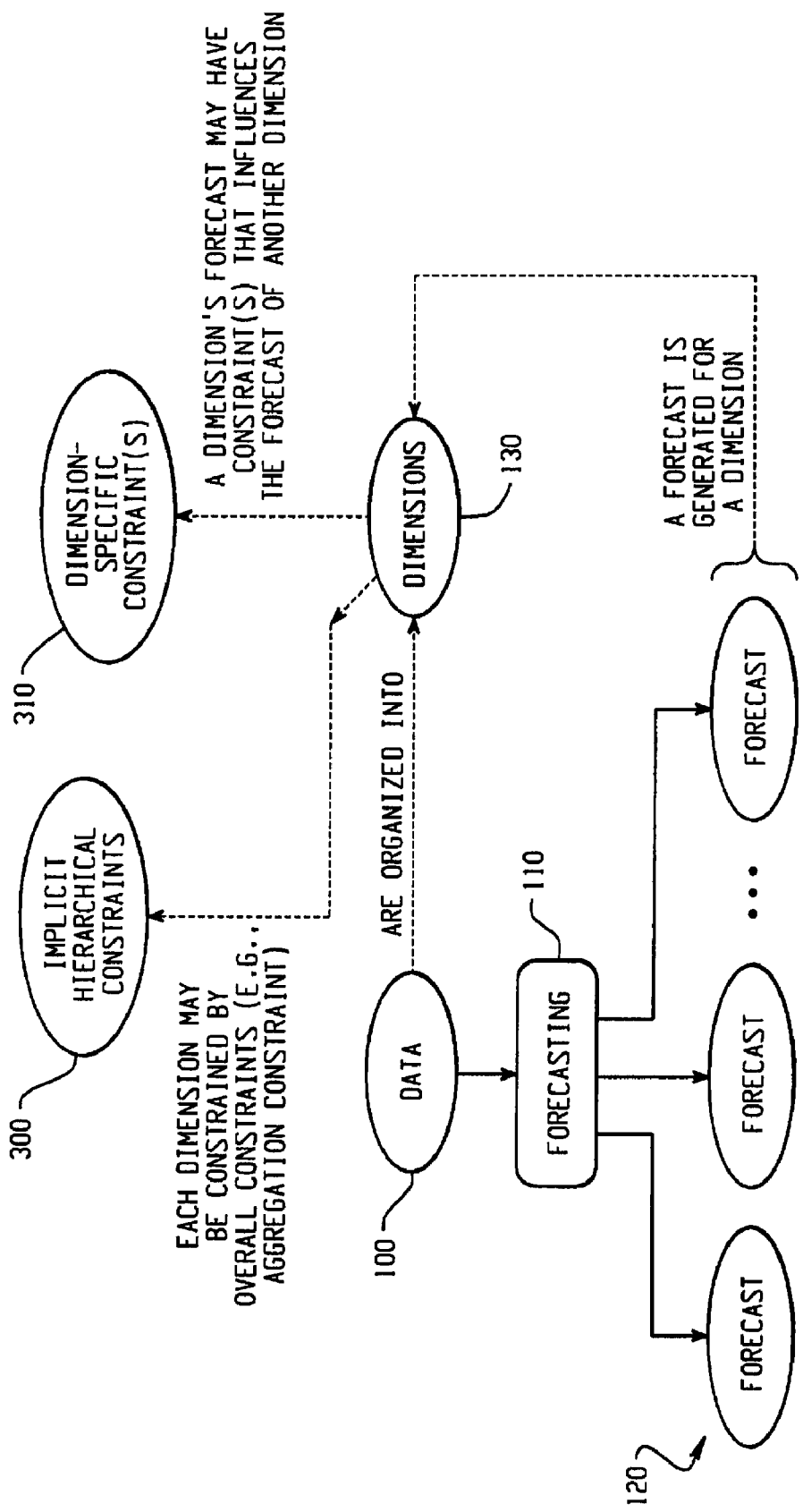
FIG. 6 is a block diagram depicting data being organized in different dimensions.

As shown in FIG. 6, when the data 100 are organized in different dimensions 130, there are often constraints (e.g., constraints 300 and 310) that link the forecasted series at the different dimensions. The forecast reconciliation system addresses such constraints. As an illustration of constraints, retailing companies have often organized their data in a hierarchy that is defined by the product characteristics (e.g., qualities, etc.) and by the geographical location of the stores. The hierarchy structure imposes accounting constraints on the series. The series at the parent node of the hierarchy are typically the sum or the average of the series at the child nodes. This accounting constraint can be termed the aggregation constraint and is an example of an explicit hierarchical constraint 300.

Figure 7:
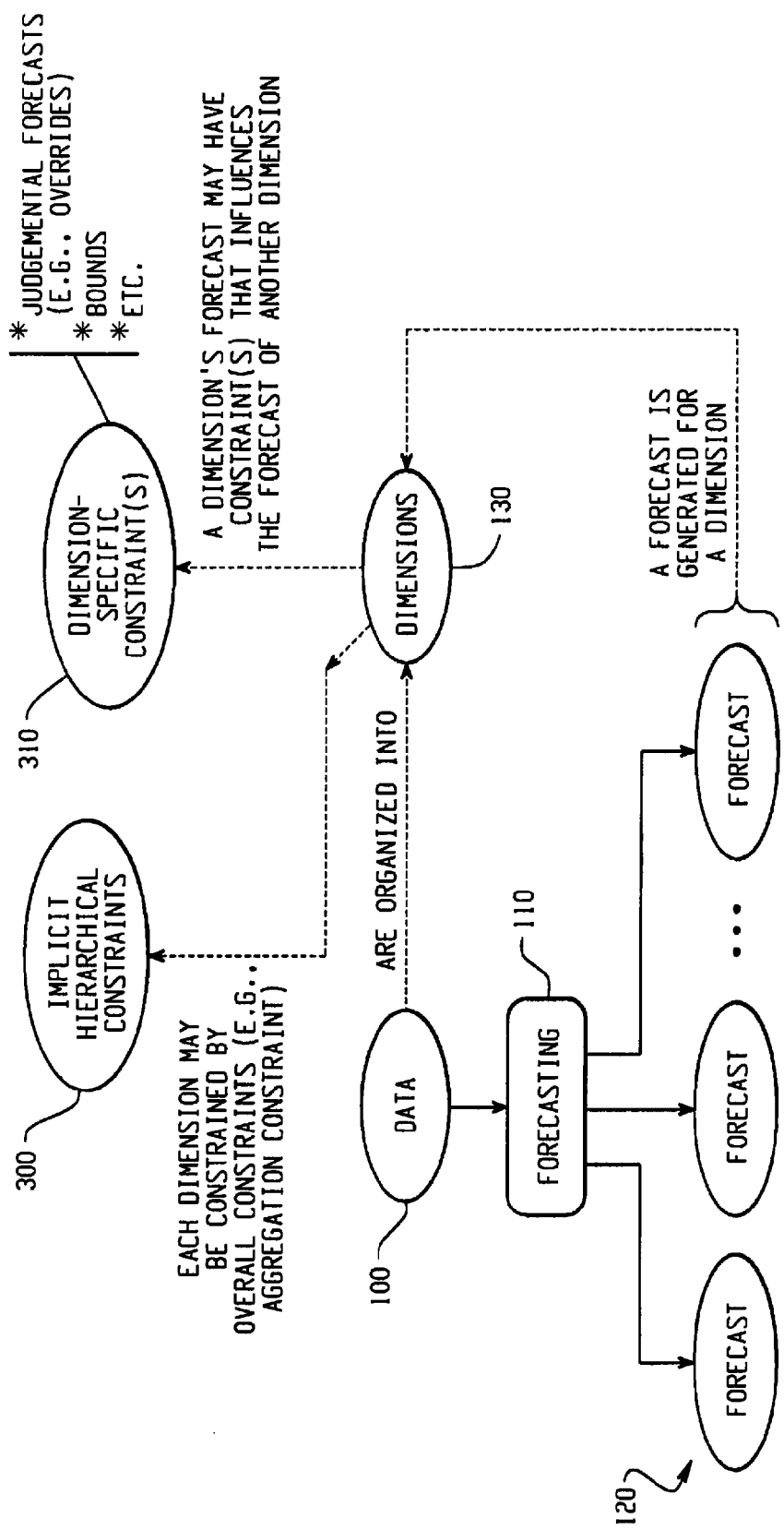
FIG. 7 is a block diagram depicting other constraints being imposed on final forecasts.

As illustrated in FIG. 7, other constraints may be imposed on the final forecasts 120. For example, if the data represent sales of some items, the series should be non-negative (assuming no returns). This is an example of a dimension-specific constraint 310. A constraint 310 has an effect across dimensions because of one or more constraints 300 with which it is associated. The analyst may also want to replace the statistical forecasts with judgmental forecasts (or overrides) that express some knowledge about the series that could not captured by the statistical forecast. For example, one item is out of stock and, therefore, the sales are known to be zero until the item is in stock again.

As further examples of constraints, judgmental forecasts that cannot be changed can be involved: e.g., $$\tilde{x}_2 = 300$$

Bounds: e.g., $$\tilde{x}_i \geq 0, \; i=1, \ldots, m$$

(where the "x" variables above with the "tilde" denote the reconciled forecasts)

In mathematical terms, these are constraints on the reconciled forecasts.

If it is known that one series is accurately predicted, the system can be configured to require that the reconciliation adjustment be less than for this series than for a series whose prediction is known unreliable. The system can also be configured to seamlessly integrate reconciliation of large hierarchies of statistical forecasts with judgmental forecasts. At the same time, the uncertainty about the statistical prediction can be used efficiently to determine the reconciliation adjustment.

Figure 8:
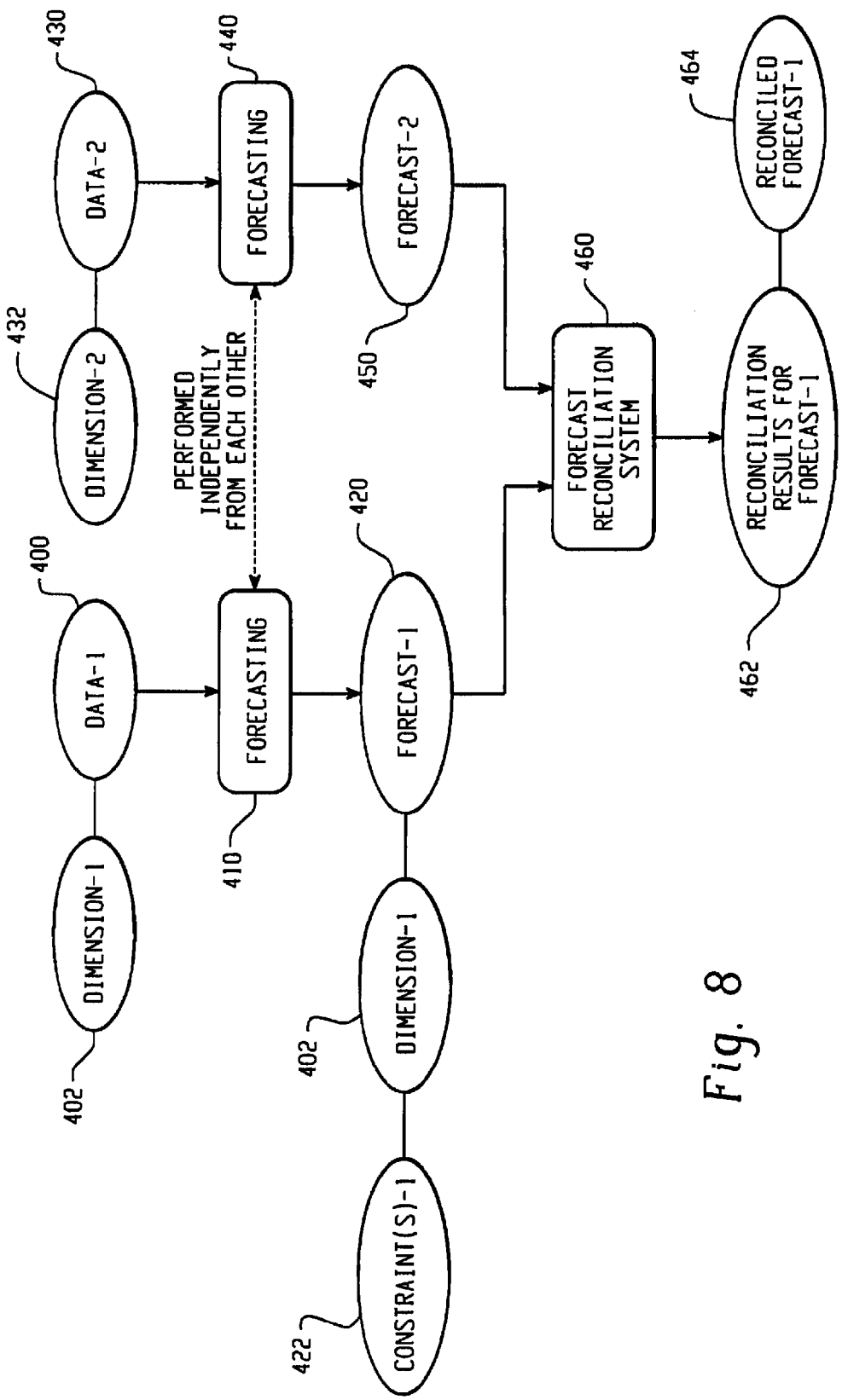
FIG. 8 is a block diagram depicting forecasting being performed independently for data that are associated with different dimensions.

FIG. 8 depicts forecasting (410, 440) being performed independently for data (400, 430) that are associated with different dimensions (402, 430). When forecasts (420, 450) are produced independently for different dimensions, the resulting forecasts may not respect the aggregation constraint, nor take into account the constraint (e.g., constraint 422 that is associated with dimension 402) posed by the judgmental forecasts or bounds.

As another example of the difficulties in independent forecasting, existing methods of reconciliation may either take into account only the aggregation constraint, but not additional constraints, or do not scale well in presence of large and complex hierarchies with overrides at different locations in the hierarchy.

For example, an aggregation constraint can be considered for two levels, at each node and fixed time t, by:

$$y := \sum_{i=1}^{m} x_i$$

The following problem arises if forecasts are generated independently at the two levels:

$$\hat{y} \neq \Sigma \hat{x}_i$$

The forecast reconciliation system 460 can be configured to address this, such as by being configured as an after-the-fact reconciliation process relative to the forecasting processes (410, 440).

In performing its reconciliation operations, the forecast reconciliation system 460 generates reconciliation results, such as reconciliation results for forecast 420. As an example of results 462, the forecast reconciliation system 460 can generate a new forecast 464 for data 400 that has been reconciled with respect to the constraint 422 that has been imposed on dimension 402.

Figure 9:
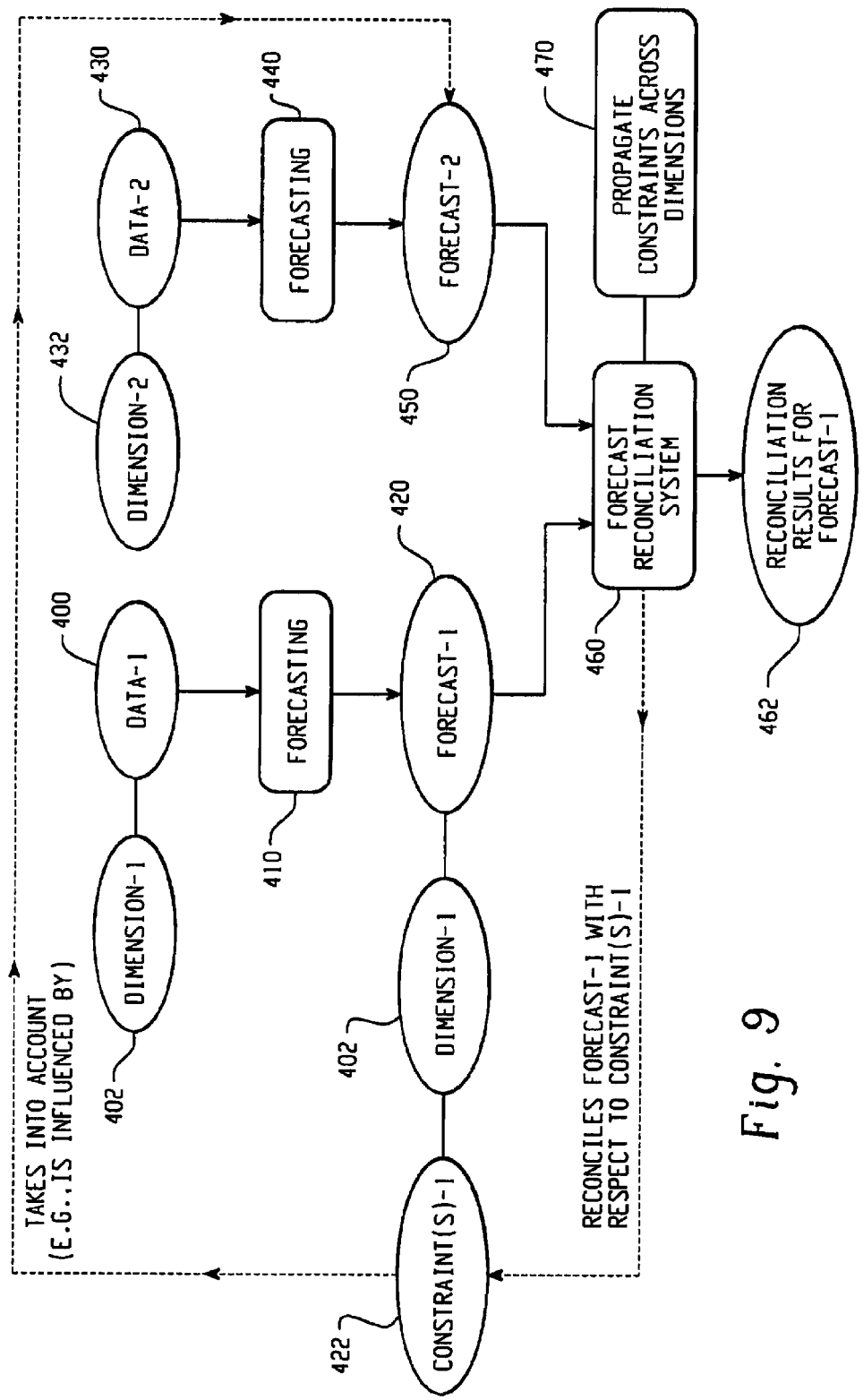
FIG. 9 is a block diagram depicting propagation of constraints.

The forecast reconciliation system 460 can perform the reconciliation process in different ways, such as propagating constraints (as shown at 470 in FIG. 9), reconciling the hierarchy at once, reconciling the hierarchy iteratively, etc. The propagation of constraints across dimensions 470 allows constraints such as constraint 422 to take it into account other forecasts, such as forecasts 450.

The architecture of the process can also be configured in different ways, such as a general framework for efficiently reconciling two levels of a hierarchy in the presence of bounds and equality constraints on the forecasts. This approach reconciles forecasts of time series data at two different levels of aggregation and can disaggregate forecasts from upper-level forecasts or aggregate forecasts from lower-level forecasts. Another example of an approach can include methods for reconciling a hierarchy in presence of overrides. In this approach, the user can choose whether the constraint implied by the judgmental forecasts should be influencing other levels of the hierarchy.

Figure 10:
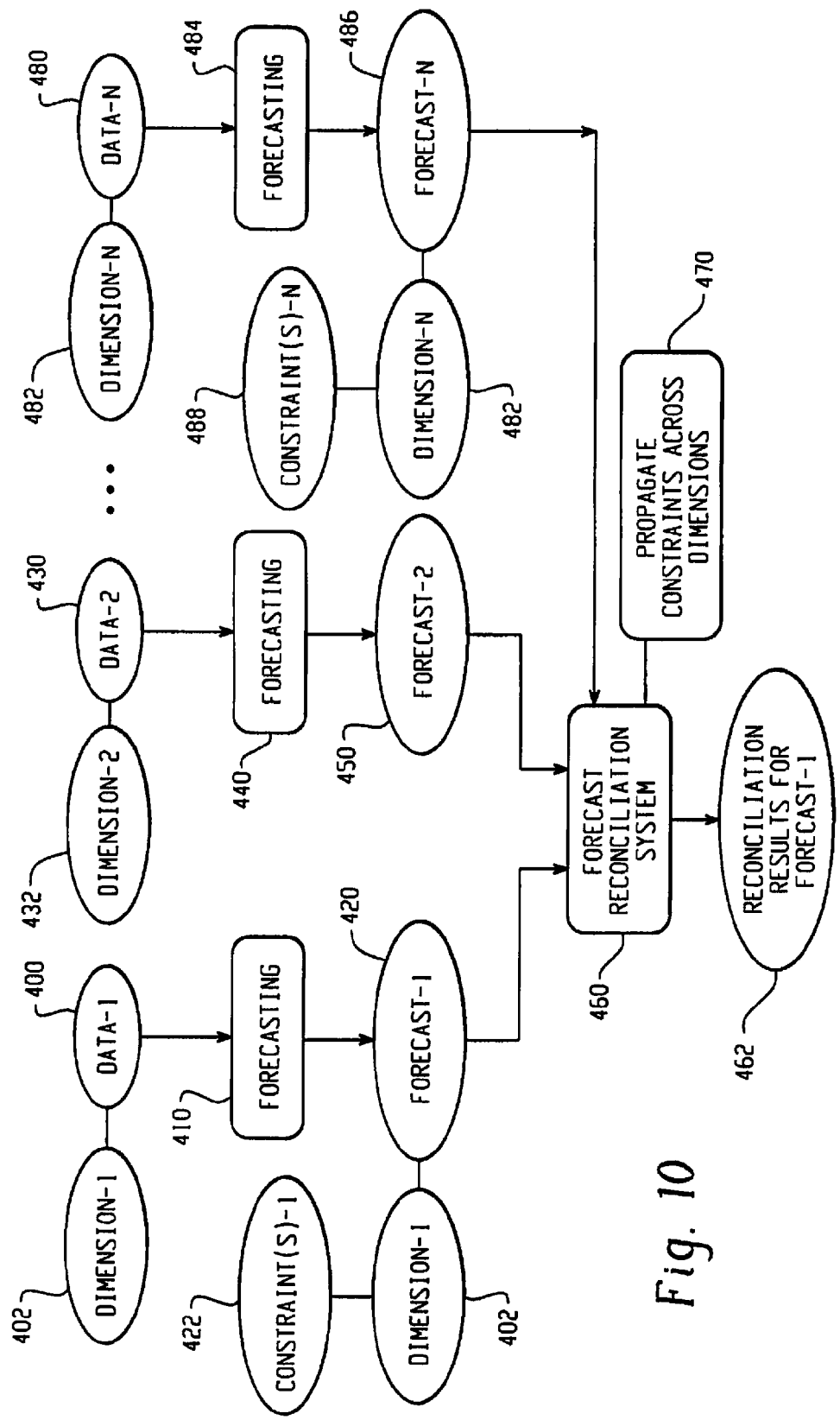
FIG. 10 is a block diagram depicting a forecast reconciliation system can process multiple dimensions.

It should be understood that a forecast reconciliation system can process many dimensions such as the additional dimensions 462 shown in FIG. 10. The forecast reconciliation system 460 also propagates any constraints (e.g., constraints 488) that are associated with the forecasts 486 of data 480 for the other dimensions 482. It should be understood that the forecasts for the other dimensions are also reconciled. In other words, if there are n dimensions, the system can be configured to produce n–1 reconciled forecasts.

Figure 11:
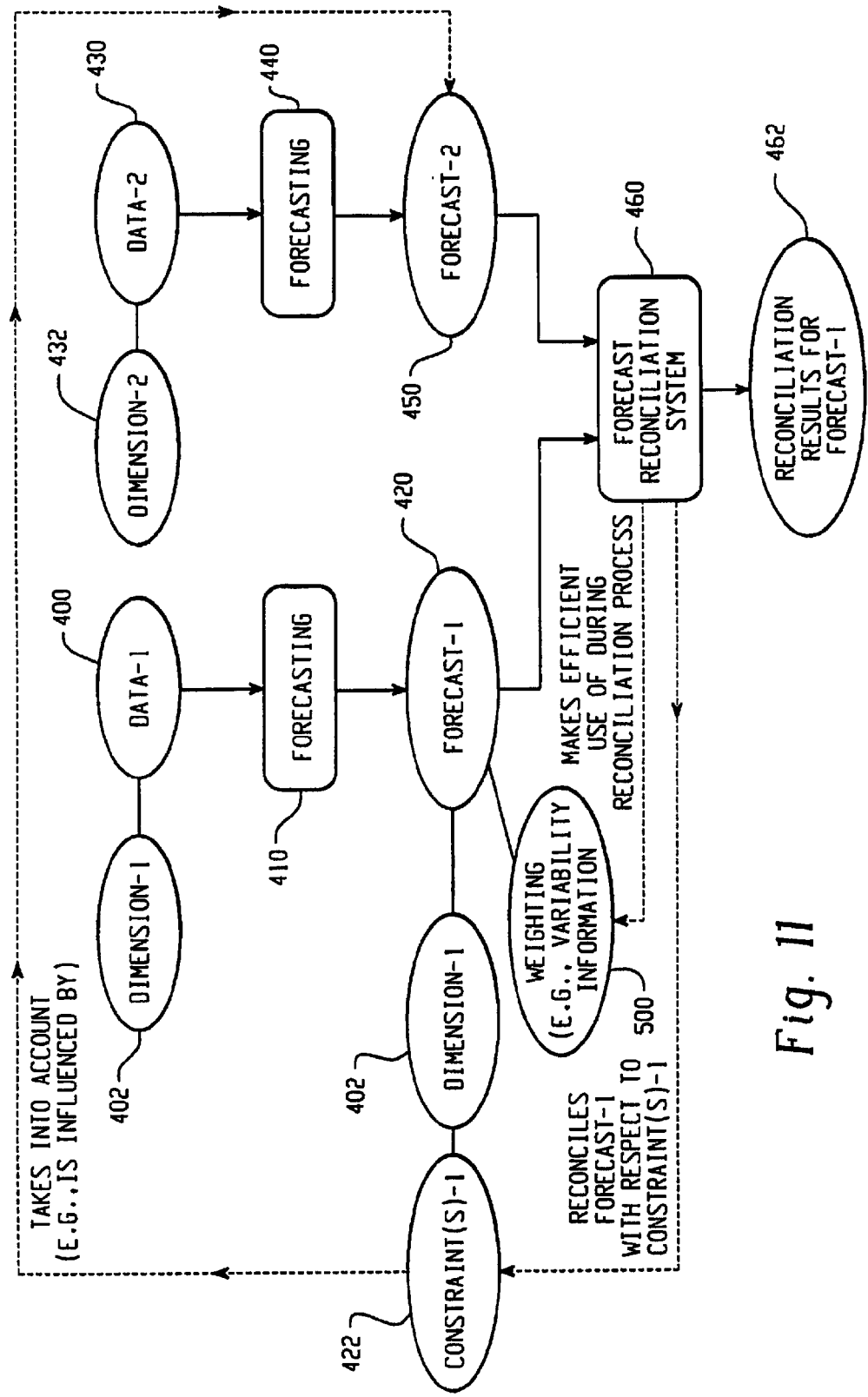
FIG. 11 is a block diagram depicting a forecast reconciliation system making use of weighting information associated with a forecast.
Figure 12:
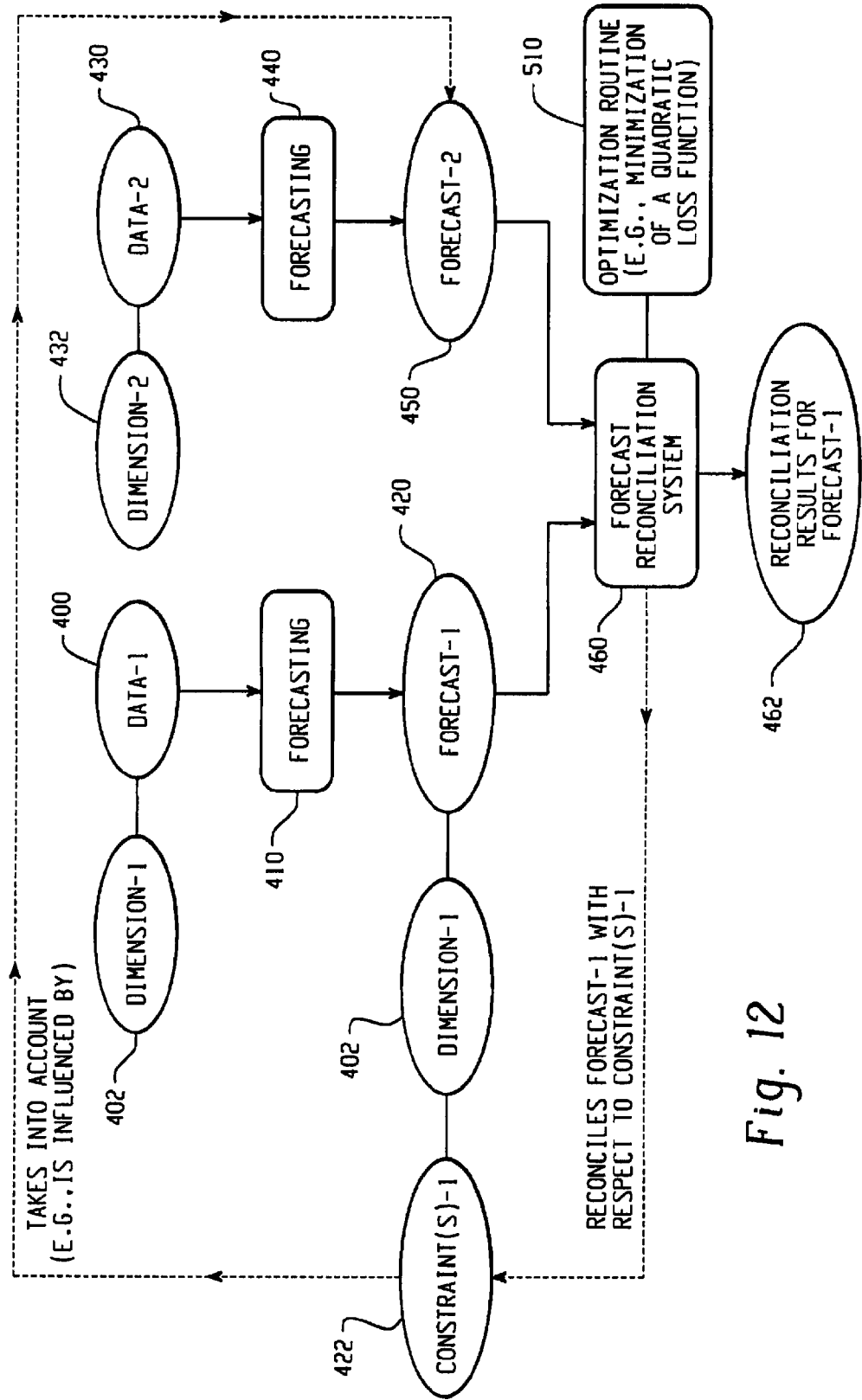
FIG. 12 is a block diagram depicting an optimization routine using forecast weighting information.

FIG. 11 illustrates that the forecast reconciliation system 460 can make efficient use of weighting information associated with forecast 420, such as by utilizing the variability information associated with forecast 420. FIG. 12 illustrates that an optimization routine 510 can make use of that forecast weighting information, such as by using the information while performing a minimization of a quadratic loss function.

Figure 13:
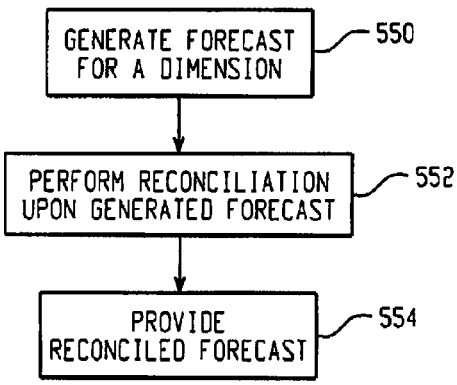
FIG. 13 is a flowchart for performing a reconciliation process.

FIG. 13 depicts a flowchart for performing a reconciliation process. At step 550 of the flowchart, a forecast is generated for a dimension. At step 552, reconciliation is performed upon the generated forecast, and step 554 provides the reconciled forecast.

Figure 14:
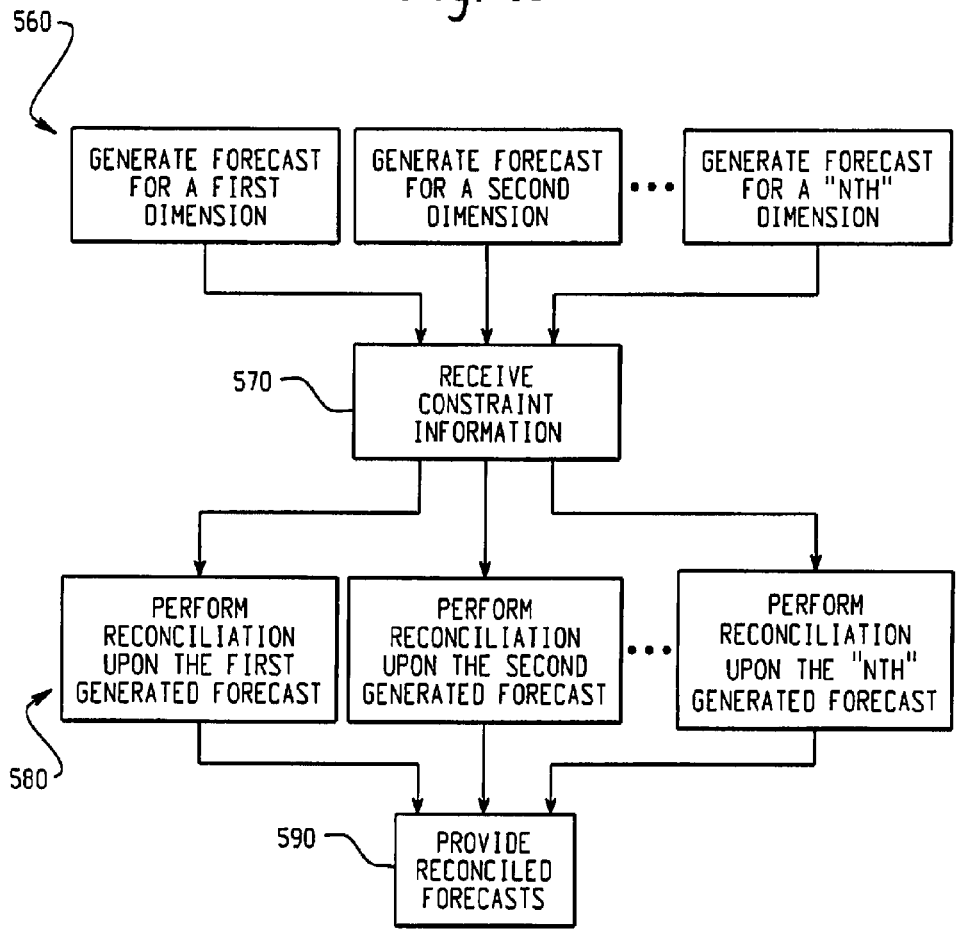
FIG. 14 is a flowchart depicting another example of an operational scenario for performing a reconciliation process.

FIG. 14 depicts another example of an operational scenario for performing a reconciliation process. The forecasting steps at 560 generate independently a forecast for the different dimensions. At step 570, constraint information is received so that reconciliation processes can be performed at steps 580. The reconciled forecasts are provided at step 590.

Figure 15:
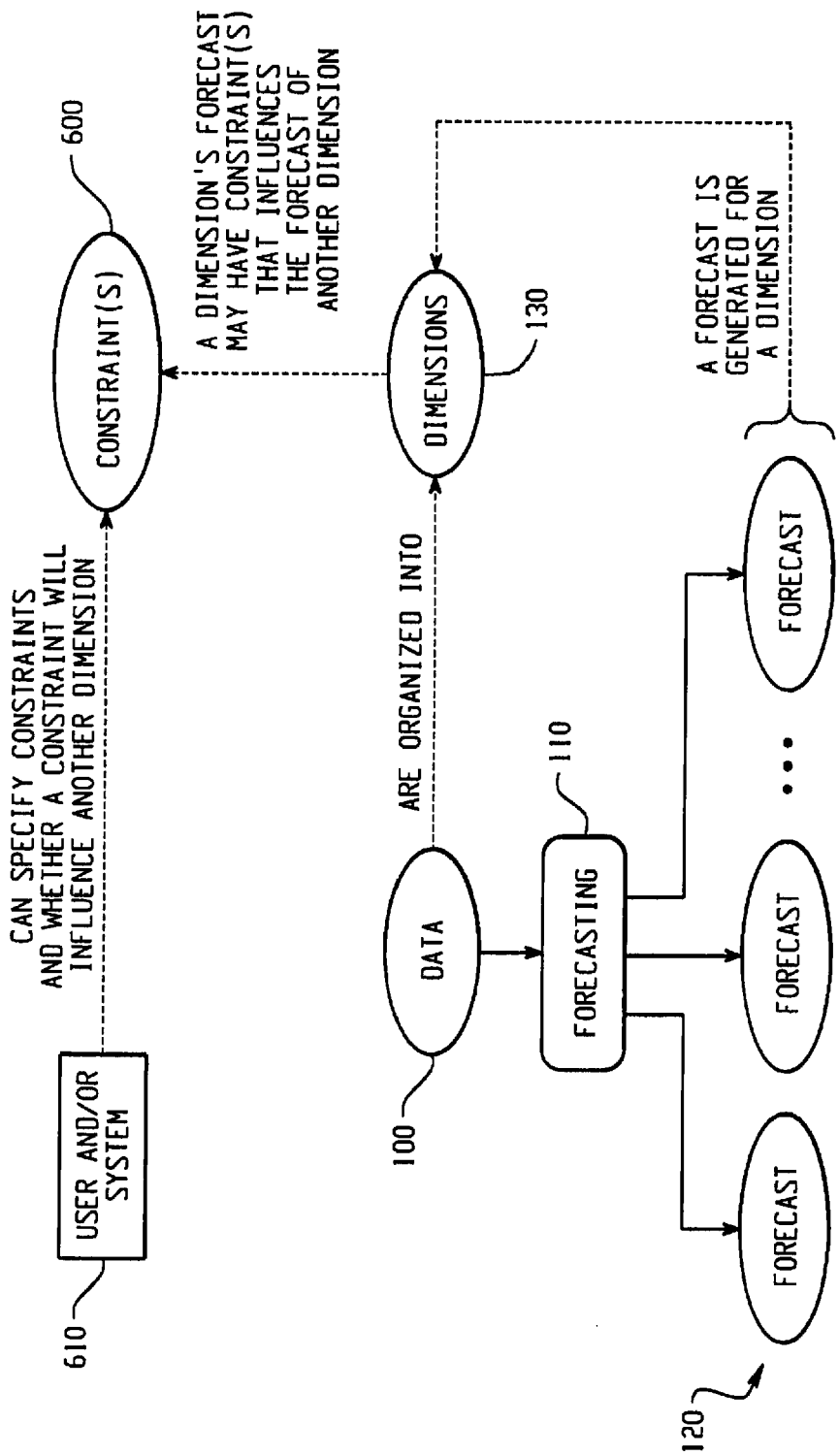
FIG. 15 is a block diagram depicting a user and/or system specifying constraints and whether a constraint will influence another dimension.

FIG. 15 illustrates that a user and/or system (e.g., a software application) 610 can specify constraints and whether a constraint will influence (e.g., affect) another dimension. For example, the user and/or system can specify the direction (e.g., an x-dimensional dimensional constraint) and the method of reconciliation, equality constraints, and bounds on the reconciled values at each point in time.

Options for how constraints are propagated through the hierarchy can be provided, such as:

1. No restriction (or Strict Reconciliation—SR). The constraints are propagated through the hierarchy until they can be satisfied.

2. Restrict to reconciliation direction (or Compliance to Direction—CD). The constraints are restricted to the node at which they are entered. This means that some nodes will be left unreconciled when the aggregation constraint cannot be satisfied.

Figure 16:
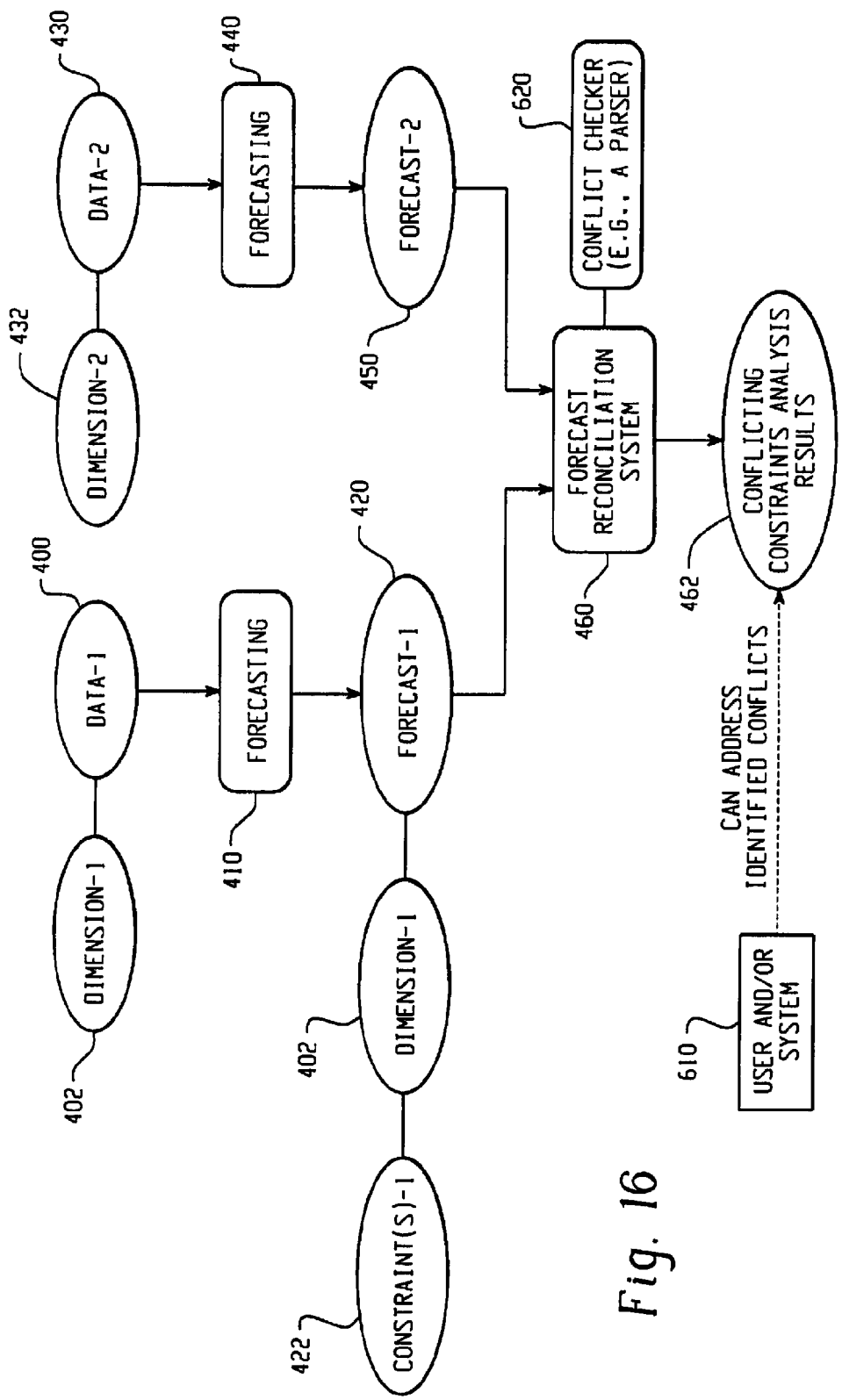
FIG. 16 is a block diagram depicting a user and/or system addressing conflicts that have been identified by a forecast reconciliation system.

FIG. 16 illustrates that a user and/or system 610 can address conflicts among constraints that have been identified by the forecast reconciliation system 460. The forecast reconciliation system 460 can use a conflict checker 620 (e.g., a parser) to perform such identification.

Figure 17:
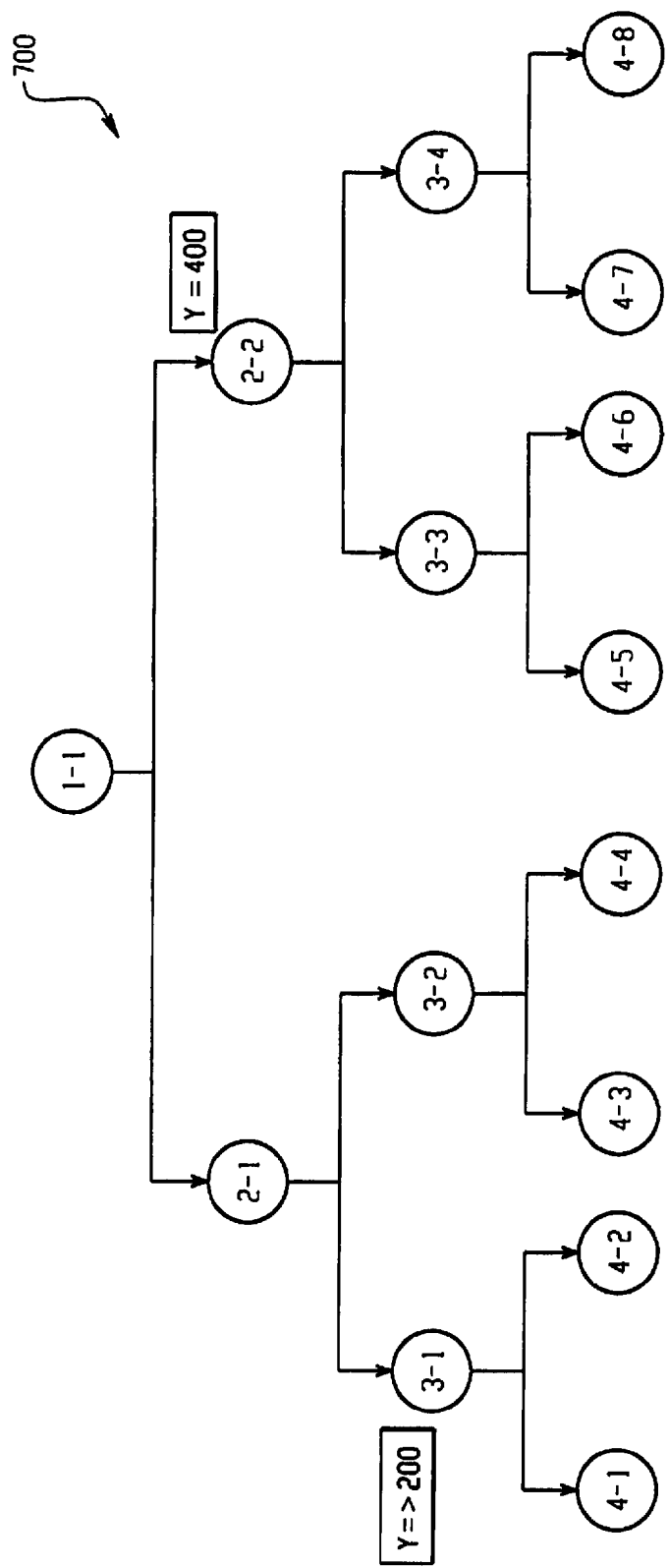
FIG. 17 depicts constraints being imposed at different levels within a hierarchy.

FIG. 17 illustrates at 700 that constraints can be imposed at different levels within a hierarchy. For example, node 2-2 is associated with a constraint that Y equals 400, while node 3-1 is associated with a constraint that Y is greater than or equal to 200.

Figure 18:
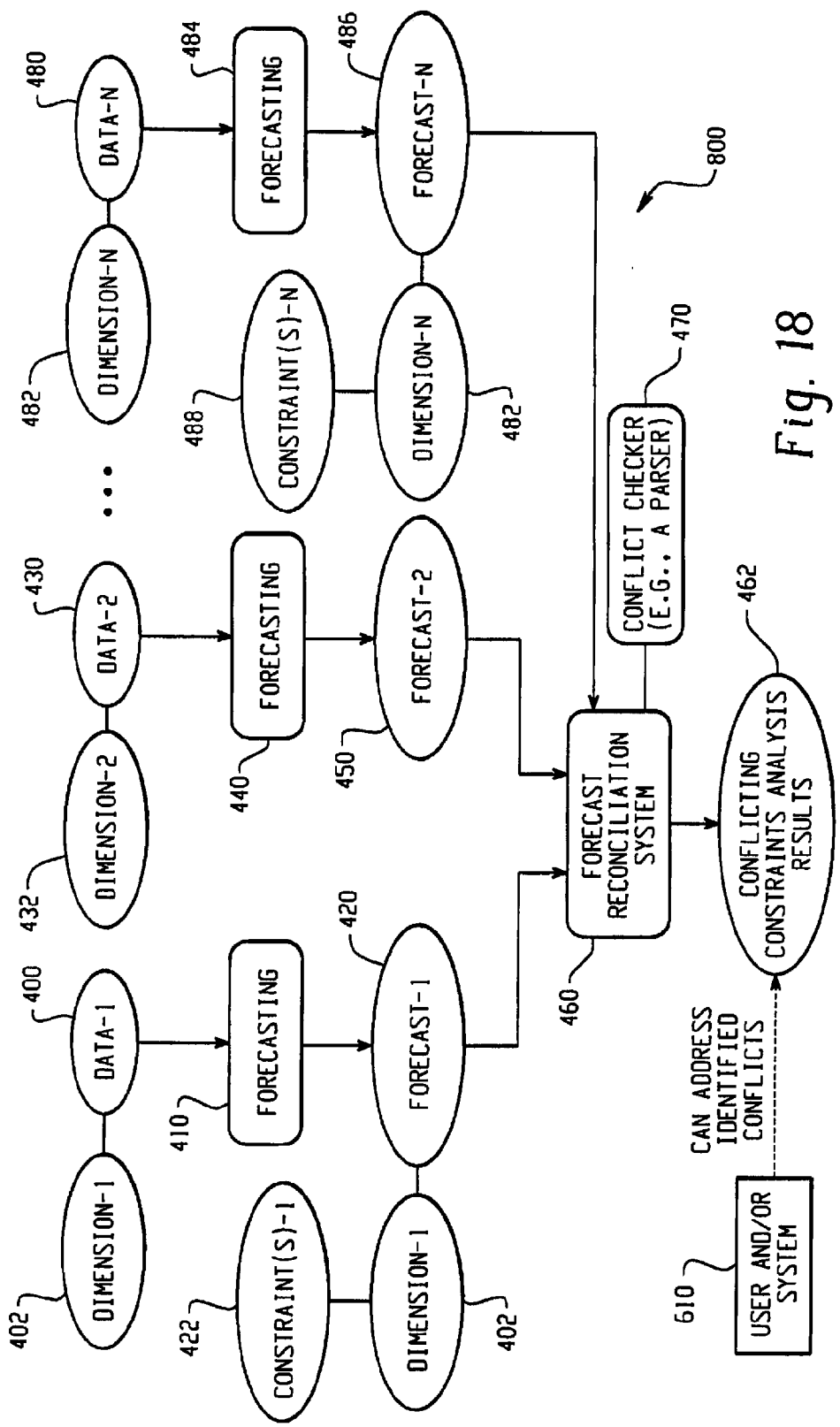
FIG. 18 is a block diagram depicting multiple dimensions being independently forecasted and reconciled by a forecast reconciliation system.

FIG. 18 shows at 800 that these multiple dimensions are independently forecasted and are reconciled by the forecast reconciliation system 460. The conflict checker 470 helps to identify conflicting constraints 462 which are surfaced to the user and/or system 610 so that the user and/or system 610 can address the identified conflicts.

Figure 19:
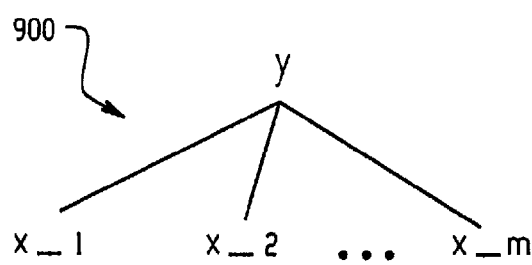
FIG. 19 depicts a hierarchy of two levels.

FIG. 19 shows at 900 a hierarchy of two levels, wherein y denotes the series at the parent node, and $x_i$ denotes the series at the child nodes. The "hat" denotes the statistical forecasts, while the "tilde" denotes the reconciled forecasts.

The reconciliation problem can be stated as follows: find reconciled values as close as possible to $\hat{x}_i$, such that the reconciled values satisfy all the constraints.

Formally, it can be restated as follows. Let $$\tilde{x} = [\tilde{x}_1, \tilde{x}_2, \ldots, \tilde{x}_m]'$$

Be the reconciled forecasts at the child nodes
Define $$\tilde{y} := \sum_{1}^{m} \tilde{x}_i$$

the reconciled forecasts at parent node.
Minimize a loss function $$l(\tilde{x}; \hat{x})$$

Subject to the linear constraints $$B\tilde{x} <\text{rel}> c$$

Where <rel> means one of the following relationships: $=, >=, <=$.

In general, this problem requires a non-linear optimizer to be solved.

Special cases of reconciliation constraints are:
1. Top-Down: $\Sigma \tilde{x}_i = \hat{y}$
2. Bottom-Up: $\tilde{x}_i = \hat{x}_i$ for all i. This implies that $\tilde{y} = \Sigma \hat{x}_i$.

A procedure (e.g., PROC HPFRECONCILE which is discussed herein) can be configured to assume a quadratic loss function $$l(\tilde{x};\hat{x})=(\tilde{x}-\hat{x})'A^{-1}(\tilde{x}-\hat{x})$$

and the constraints can be imposed only on singletons, that is, they are of the form x_i<rel>c_i.

One or more (as well as other) advantages can be realized:
1. The admissible region is compact.
2. The solution exists and is unique.
3. Allows the use of the very efficient quadratic iterative point algorithm (e.g., in the SAS library TKEIPQP which available from SAS Institute Inc. located in Cary, N.C.) when needed.
4. Gives intuitive closed-form solutions when A=I and there are no constraints other than the aggregation constraint. No optimizer is needed in this case.
5. The weighting matrix A allows the use of the covariance matrix as weights, thus making the reconciliation efficient (Generalized Least Square (GLS)).
6. Infeasible problems are easily detected.

Figure 20:
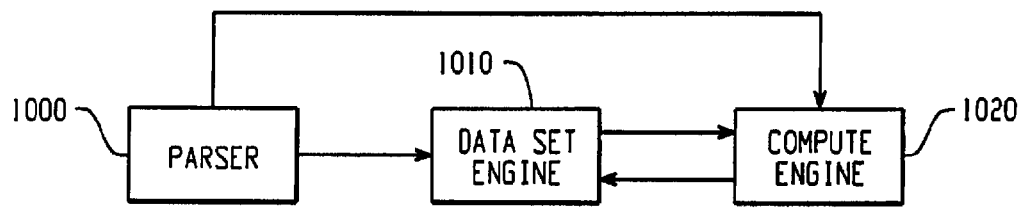
FIG. 20 depicts an architecture of a reconciliation system.

A reconciliation system can be configured in many different ways. An example of the architecture of a reconciliation system can be implemented by the components (1000, 1010, 1020) shown in FIG. 20.

1. The parser. The parser parses the proc options and passes them to the data set engine and compute engine
2. The data set engine. The purpose of the data set engine is to read the data sets of the forecasts at the two levels, synchronize the observations by node and time id, and pass the information to the compute engine. Once the compute engine returns the results, the data set engine writes them to the output data sets
3. The compute engine. The compute engine solves the reconciliation problem for a fixed time id. When a closed form solution is not available, the problem is solved numerically using the quadratic iterative point optimizer provided by the TKEIPQP extension which routine is provided by SAS Institute Inc. (located in Cary, N.C.).

As another illustration of a variation of a reconciliation system, enterprises in various industries can have their data organized hierarchically. For example, a retail organization may have its sales data organized by states, regions, counties, and cities. There are applications that need to process data from two levels of the hierarchy such that the data matches on a certain identifier that is present at both levels. For example, the regional level data for Northeast region needs to be matched with lower-level data for all the cities in the Northeast region in order to perform certain processing on the Northeast region. An example of such processing is reconciliation of forecasts from two levels of the hierarchy, where for a given time instance, the forecast values at two levels of the hierarchy need to be adjusted such that the values of the forecasts at the lower level satisfy a certain constraint with respect to the value of the forecast at the upper level.

The input data may be assumed to be organized such that all the data for a given level is present in a single data set. This data set is ordered by the entity attributes that identify distinct entities at that level. The data corresponding to each entity is assumed to be ordered by an instance attribute that identifies a specific instance of the data for that entity. The entity attributes are assumed to be organized hierarchically such that entity attributes of an upper level are a proper subset of the entity attributes of a lower level. This implies a containment relationship between entities from two levels. An entity at a lower level is said to be a sub-entity of an upper-level entity, if it has the same values for the upper-level entity attributes as those of the upper-level entity.

Given two such input data-sets, one from an upper level and one from a lower level of the same hierarchy, the problem is to match a particular data instance for an entity in the upper level with all such instances of its sub-entities at the lower level that have the same value for the instance attribute. This matched data can then be handed over to a processor that processes that particular instance of the upper- and lower-level entities.

The output resulting from the processor is also assumed to be stored in the same manner as the input. In particular, the output can be at either or both the levels of the hierarchy that were provided at the input. All the output instances at a given level will be stored in one data set. This data set is ordered in the same manner as the input data set; i.e., by entity and instance attributes.

Figure 21:
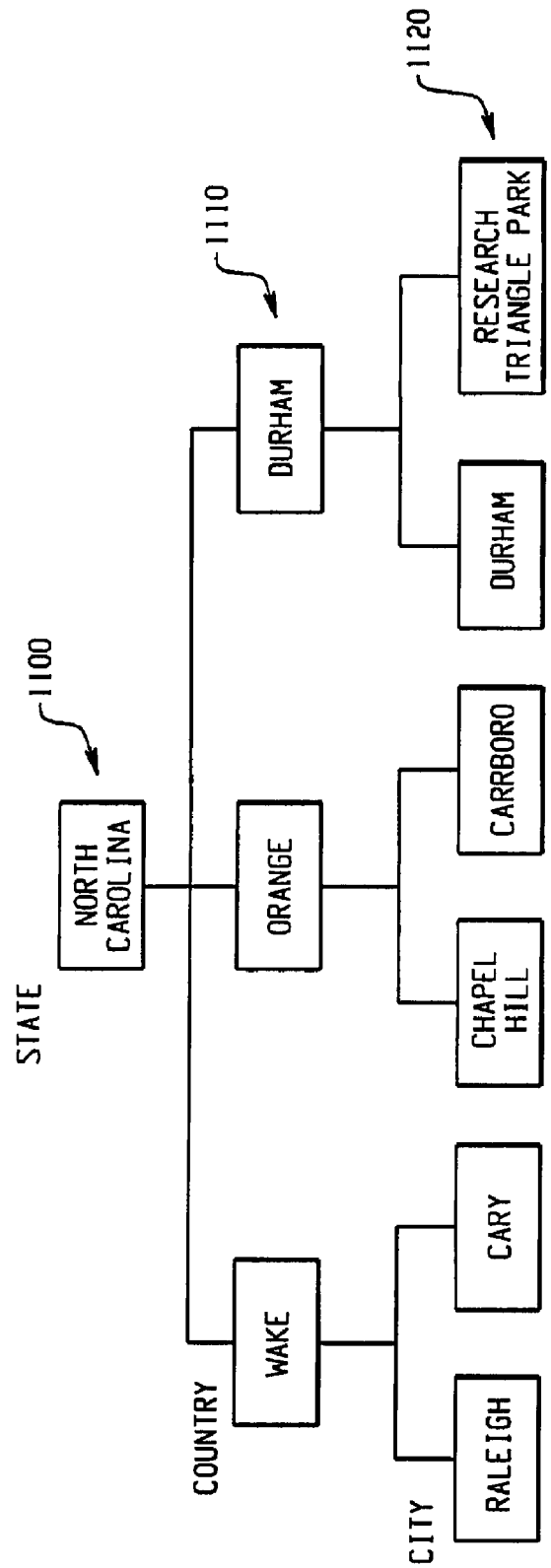
FIG. 21 depicts a three level hierarchy.

As an example, assume a three level hierarchy (at 1100, 1110, and 1120) as shown in FIG. 21. The entity attributes for top level are {State}, those for middle level are {State, County}, and those for the bottom level are {State, County, City}.

Table 1 and Table 2 below illustrate an example of the input data sets at State and County levels, respectively, assuming that instance attribute is Date and the instance data comprises Sales values.

TABLE 1

Example Input Data at State Level

| Instance Number | State | Date | Sales |
|---|---|---|---|
| 1 | NC | Jan. 01, 2006 | 300 |
| 2 | NC | Feb. 01, 2006 | 500 |
| 3 | NC | Mar. 01, 2006 | 400 |

TABLE 2

Example Input Data at County Level

| Instance Number | State | County | Date | Sales |
|---|---|---|---|---|
| 1 | NC | Wake | Jan. 01, 2006 | 100 |
| 2 | NC | Wake | Feb. 01, 2006 | 250 |
| 3 | NC | Wake | Mar. 01, 2006 | 200 |
| 4 | NC | Orange | Jan. 01, 2006 | 110 |
| 5 | NC | Orange | Feb. 01, 2006 | 100 |
| 6 | NC | Orange | Mar. 01, 2006 | 100 |
| 7 | NC | Durham | Jan. 01, 2006 | 75 |
| 8 | NC | Durham | Feb. 01, 2006 | 125 |
| 9 | NC | Durham | Mar. 01, 2006 | 109 |

Given this data, the system matches instance 1 from State-level data (Table 1) with instances 1, 4, and 7 from county-level data (Table 2), because they all have the same value of Jan. 1, 2006 for the instance attribute Date. The processor can then do processing on the Sales values in these instances. For example, if the processor is the reconciliation processor, it may adjust the Sales values for Date=Jan. 1, 2006 for County=Wake, County=Orange, and County=Durham to 105, 115, and 80, respectively, so that they add up to the Sales=300 value for State=NC on 01-01-2006. At the end of the processing, the output data-set at the county-level should list instances in the same order as the input dataset as illustrated in Table 3.

TABLE 3

Example Output Data at County Level

| Instance Number | State | County | Date | Sales |
|---|---|---|---|---|
| 1 | NC | Wake | Jan. 01, 2006 | 105 |
| 2 | NC | Wake | Feb. 01, 2006 | 258.3 |
| 3 | NC | Wake | Mar. 01, 2006 | 197 |
| 4 | NC | Orange | Jan. 01, 2006 | 115 |
| 5 | NC | Orange | Feb. 01, 2006 | 108.3 |
| 6 | NC | Orange | Mar. 01, 2006 | 97 |
| 7 | NC | Durham | Jan. 01, 2006 | 80 |
| 8 | NC | Durham | Feb. 01, 2006 | 133.4 |
| 9 | NC | Durham | Mar. 01, 2006 | 106 |

A reconciliation system can be configured for efficient, scalable instance matching of hierarchically organized datasets. Such a system can re-order the lower-level data set such that all instances with same value of the upper-level entity attributes and the instance attribute appear sequentially one after the other. Then, upper level and lower level data sets can be scanned sequentially to match the observations. The output data set gets created sequentially in this modified order. After the processing is done, the output data set needs to be re-ordered to the original order of the input data set. The loss of efficiency due to these pre- and post-ordering steps can become significant as the size of the lower level data set becomes large.

Figure 22:
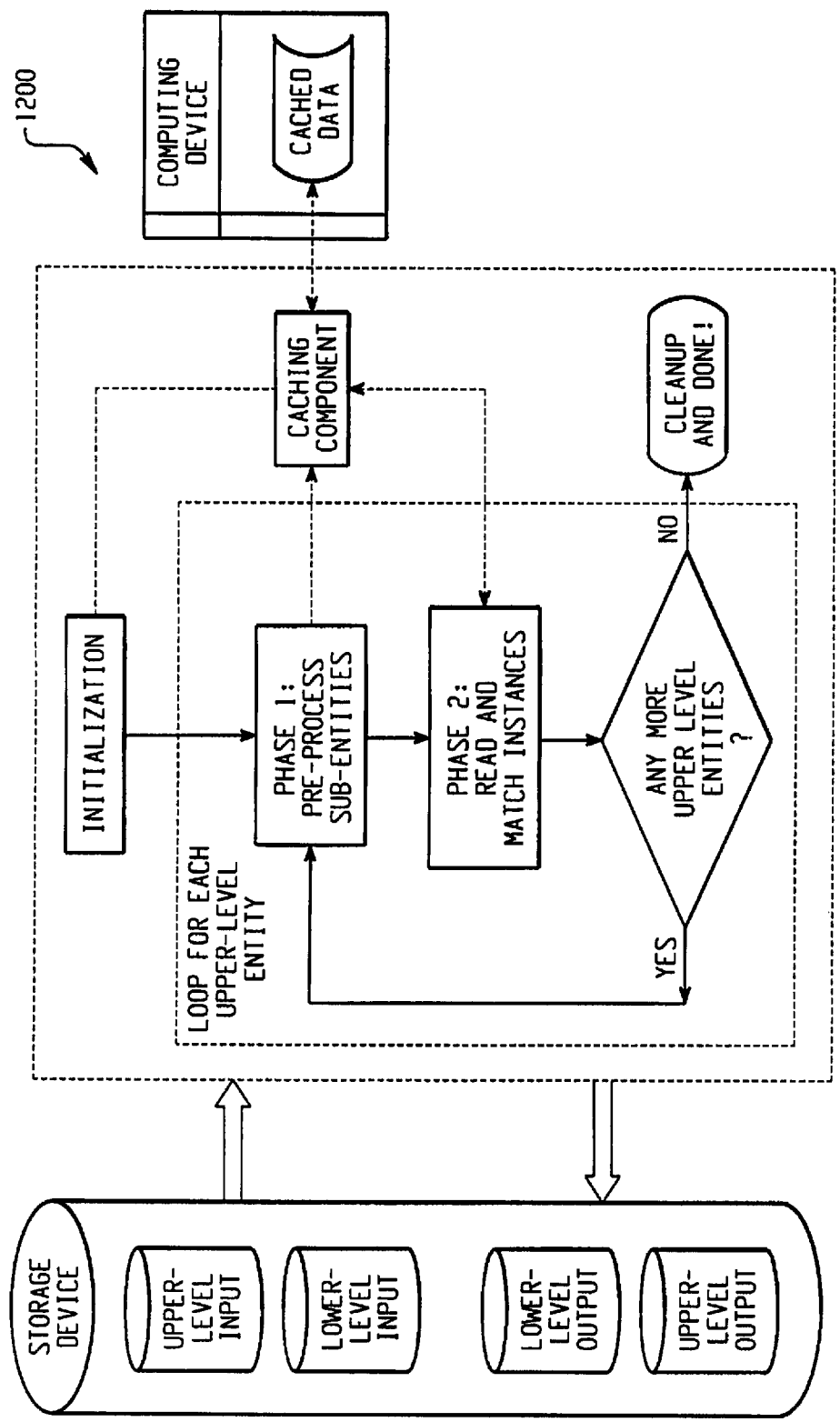
FIG. 22 depicting components and process flow of an engine for a hierarchical data set.

The system can avoid the need to explicitly re-order the input or output data sets. FIG. 22 illustrates at 1200 the components and process flow of an engine for a hierarchical data set.

Each step of the data engine is described below. After the initialization phase, for each entity in the upper level input data set, the engine scans the sub-entities in the lower level input data set in two phases. In the initialization phase, the engine initializes various data structures to store necessary data in the main memory of the computing device. It also creates the necessary structures required to read the input data from or write the output data to the storage device.

In the first phase, the engine sequentially scans the lower level input data in order to identify and store the locations of first instances for each of the sub-entities. The output data set at the lower level is also created simultaneously in the same order as the input data set. After this phase, output data set is essentially a copy of the input data set such that each instance is in the unprocessed state. The location of first instance of each sub-entity in the output data set is also identified and stored.

In the second phase, the engine accesses the instances of upper-level entity sequentially. The instances of lower-level sub-entities are accessed from the location pointers that were stored in the first phase. Location pointers of the sub-entities for which instance attribute matches with the instance attribute of the upper-level entity are advanced by one location. After this match is processed, the engine updates the output data set at the appropriate location pointer of each sub-entity, and changes the state of each updated instance from the unprocessed state to the processed state. Then, the engine reads the next instance from upper level data set, and tries to match the instances in lower level sub-entities from their current location pointers. The process continues until all instances of the upper level entity are exhausted. The engine utilizes the fact that the instances within each entity (at upper-level) and sub-entity (at lower-level) are ordered by instance attribute. So, it guarantees that all the matching instances will be found. This method of processing also allows the engine to account for the fact that instance attributes in upper-level entity and lower-level sub-entities may not be aligned at the beginning or end of the upper-level entity group.

Caching component: In the second phase, the engine processes the sub-entities one after the other for each value of the instance attribute, each time positioning the location pointer to the current pointer for that sub-entity. Given the ordering of the input data set, this positioning of location pointers amounts to a "random" access pattern of the lower-level data set. Depending on the latency and speed of accessing the data set from the device on which it is stored, this "random" access pattern may result in significant waiting periods, thus causing the engine to lose efficiency. This will be especially evident for large data sets. In order to alleviate this problem in the best possible manner, the engine implements a caching mechanism. It utilizes the fact that on modern day computing devices, it takes significantly less time to access data stored in the "main memory" of the computing device than the time to access data from the storage device such as disk drives. Here is a description of how each of the steps of the engine supports and utilizes the caching mechanism:

In the initialization phase, the engine identifies and reserves the amount of main memory available to be used as cache storage. Knowing this and the size of each instance data, the engine computes the maximum number of instances of each of the sub-entities that can be stored in the cache in order to minimize the number of visits to the storage device to read lower-level input data or write lower-level output data.

In the first phase, while sequentially reading the lower-level input data, the engine stores the instance data for sub-entities in this cache. If the entire instance data for a sub-entity does not fit in the cache, the engine stores the location pointer of the first instance of the sub-entity that could not be cached.

In the second phase, the instance data for sub-entities is read from the cache. If the cache for a particular sub-entity is exhausted, it is immediately filled by sequentially scanning the lower-level data set from the location pointer stored along with that sub-entity's cache. After reading the maximum number of instances, the location pointer is updated to point to the first un-cached instance.

With the use of this two-phase approach in conjunction with the caching mechanism, the hierarchical data set engine can scale well to efficiently handle large sizes of lower-level data sets.

Figure 23:
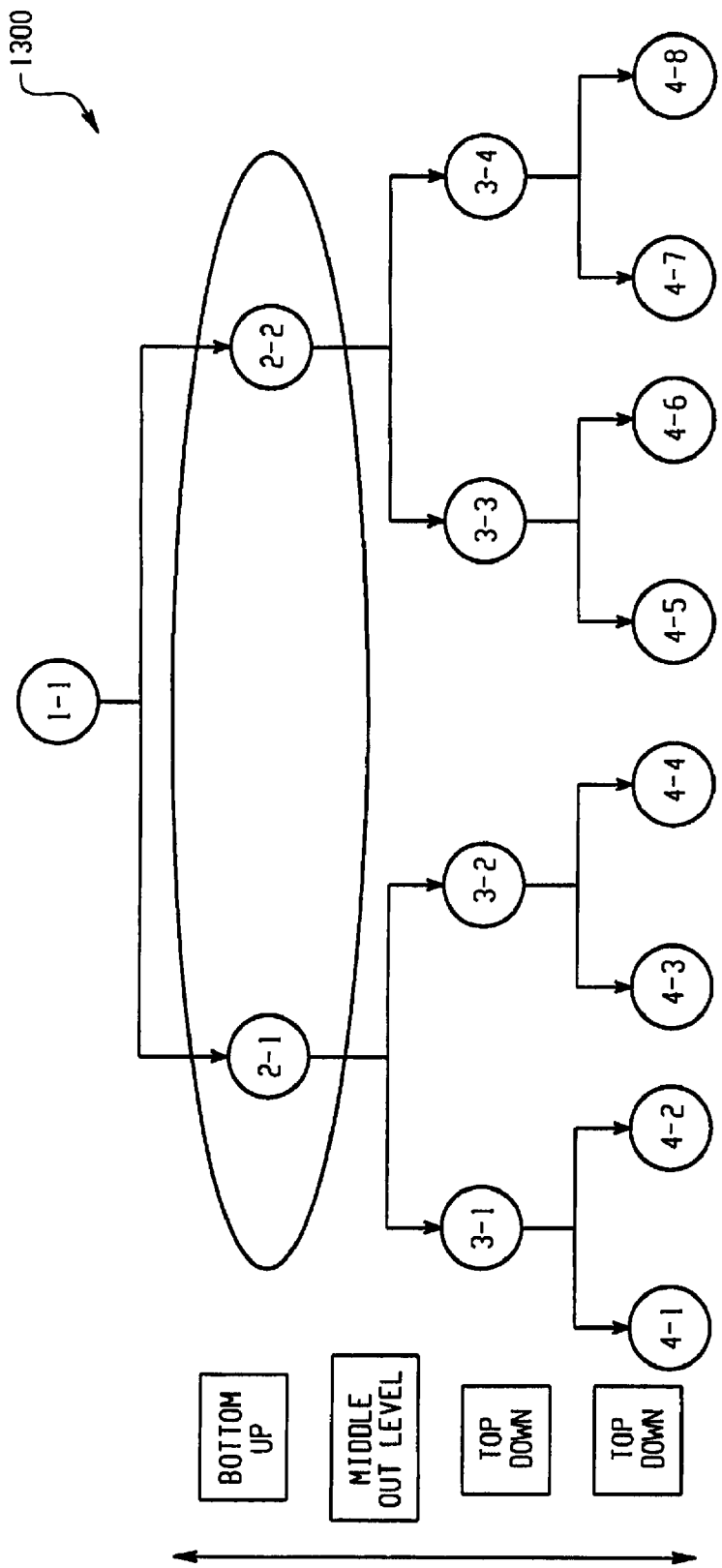
FIG. 23 depicts different approaches that a server can reconcile a hierarchy of forecasts
Figure 24:
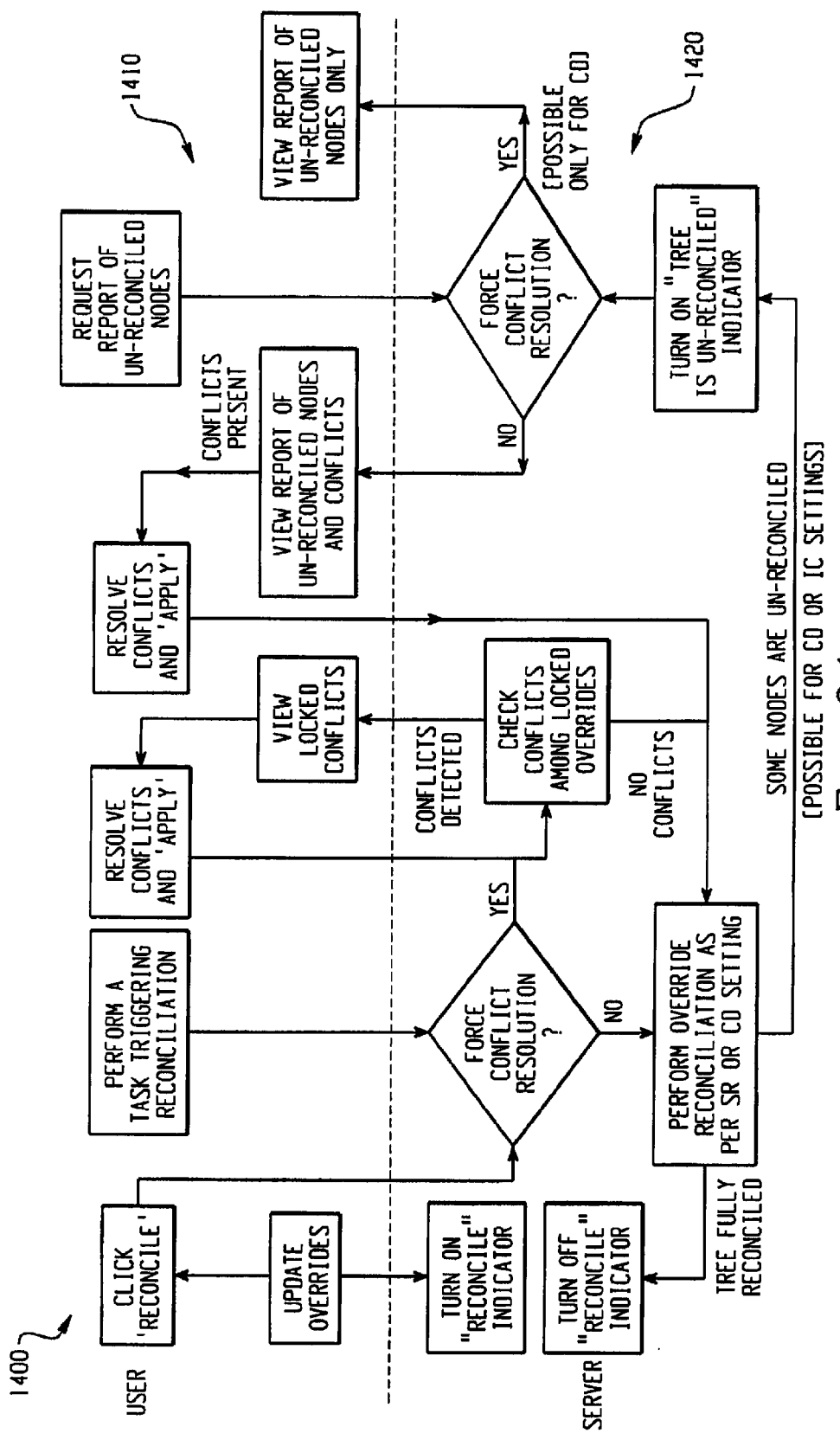
FIG. 24 is a flowchart depicting an operational scenario for handling overrides.

FIG. 23 shows at 1300 different approaches that a server can reconcile forecasts in the presence of overrides, such as by reconciling recursively two levels at a time. Examples of reconciliation directions include:
1. Bottom Up
2. Top Down
3. Middle Out Above the middle-out level, forecasts are reconciled in a bottom-up fashion. Below the middle-out level, forecasts are reconciled in a top-down fashion FIG. 24 illustrates at 1400 an operational scenario for handling overrides (e.g., an override is a replacement value that you specify in place of a forecasted value). It is noted that how the override is handled depends on whether you have forecasted your data hierarchically. If you have forecasted your data hierarchically, then the override is an adjustment that is done with respect to the reconciled statistical forecast. If you have not forecasted your data hierarchically, then the override is an adjustment that is done with respect to the statistical forecast. You can specify overrides for future values.

Examples of overrides include locked overrides and unlocked overrides. A locked override is a user-supplied value for a forecast that is honored when the hierarchy is reconciled. When you specify a locked override, the system changes the final forecast to the override value. An unlocked override is a user-supplied value for a fore-cast that acts as a guideline for the final forecast value. The system might not honor this override value.

With reference to FIG. 24, operations designed by reference numeral 1410 are related to the user and operations designated by reference number 1420 are related to the server. It should be understood with respect to the processing flow of FIG. 24 (and similar to the other processing flows described herein) the steps and the order of the steps in the flowchart may be altered, modified, removed and/or augmented and still achieve the desired outcome. For example, an override scenario could also proceed as follows:

1. You add an override by clicking the reconcile button. A "Reconciliation is out of date" message appears at the top of the Forecasting View (such as shown on FIG. 5 at 202).

2. To update overrides for a forecast hierarchy, you click Update to reconcile the hierarchy (such as shown on FIG. 5 at 204). The system checks for conflicts in the locked overrides.

3. If no conflicts are detected, the system performs an override reconciliation.

4. If conflicts are detected, the Override Conflicts dialog box opens. You view and resolve any conflicts. In this scenario, the system does not reconcile the hierarchy till all the conflicts are resolved and unreconciled nodes occur if you selected Resolve Conflicts implied by reconciliation method option as an advanced reconciliation option. If you also selected the No Restriction option, then resolving any override conflicts will eliminate the unreconciled nodes. However, if you selected the Restrict to direction implied by reconciliation method option, then resolving all the override conflicts might reduce, but not necessarily eliminate, the number of unreconciled nodes.

If you selected the Ignore Conflicts option instead, then this message does not appear.

If you selected the Ignore Conflicts option as the advanced reconciliation option, then the system uses the following process:

1. You add an override. A "Reconciliation is out of date" message appears at the top of the Forecasting View.

2. You click Update to reconcile the hierarchy. The system tries to reconcile the hierarchy. During the reconciliation, one of the following events occurs:
  the hierarchy is fully reconciled, and the reconciliation message in the Forecasting View disappears.
  the systems cannot reconcile the hierarchy. A message about un-reconciled nodes appears in the Forecasting View. The Reconciliation Failure Report lists the unreconciled nodes and any conflicts if they were detected but ignored because of the Ignore Conflicts option.

The scenario can be expanded such that you can specify overrides for future values. You enter overrides for the time ID values in the horizon. The horizon is determined by the value that you specify for the End date option in the Options dialog box and the end date for the series. The end date for the series is the largest time ID with a non-missing value for the dependent variable. If you specify an end date (that is not the default value of the End date option), then the start of the horizon is affected as follows:
  If the end date that you specify is after the end date for the series, then the horizon is not affected by the end date that you specified. You can enter overrides for those time ID values that occur one interval after the end date for the series.
  If the end date that you specify is earlier than the end date of the series, then the horizon starts one interval after the value that you specified for the end date. However, if you specify an end date that is not in the in-put data set, then the horizon is the first value in the data set that is one interval after the specified end date. For example, in your input data set, the interval of the time ID values is month, and the dates for the time ID values are the first of the month. If you specified Nov. 5, 2005, as the end date, then the horizon starts at Jan. 1, 2006. However, if you specified Nov. 1, 2005, as the end date, then the horizon starts at Dec. 1, 2005.

You cannot add overrides when the value for the Horizon option is less than the number of the Out of Sample range option. You cannot edit the time ID values in the horizon from the data table, and the Override Calculator is not available if this condition is met. If you specified any overrides before this condition was met, then these previous overrides are not removed. The override icons are still visible in the Hierarchy tab. If you make any additional changes to the values of the fore-casting options that remove this condition, then these overrides will become visible in the Forecasting View.

You can add an override in the following ways:
  By typing the override value in the Overrides row of the data table. You can use this method when you want to override a single value. For more information, see "Add Overrides in the Forecasting View" on page 124.
  By using the Override Calculator. This method is good if you want to create overrides for several time periods. For more information, see "Add Overrides by Using the Override Calculator" on page 125.

For each override, you can specify whether the override is locked or unlocked. This locking determines how the system treats the override during the reconciliation process.

To create an override by using the Override Calculator, the following steps can be used:

1. In the data table in the Forecasting View, select the cells in the Overrides row for the time periods that you want to override, and click the appropriate option.

2. Specify the changes to make to the selected values. You can choose from the following options:
  Select the Adjust the reconciled statistical forecast option to base the override values on the specified increase or decrease of the reconciled statistical forecast.
  If you did not forecast your data hierarchically or there is no reconciliation forecast available, then the Adjust the statistical forecast option is available. You can select this option to base the override values on the specified increase or decrease of the statistical forecast.
  Using the drop-down lists and text box, specify the number of units or percentage to increase or decrease the current value. In the first drop-down list, select Increase or Decrease. In the text box, specify the value and in the second drop-down list, specify whether this value is in units or percent.
  For example, you want to create an override that is 10% greater than the reconciled statistical forecast. In the first drop-down list, select Increase. In the text box, type 10, and in the second drop-down list, select %. The override values are 10% greater than the reconciled statistical forecast.
  Select Set to a fixed value if you want to apply a single override value to all the selected periods. Specify this override value in the text box. How the override value is applied depends on the option that you choose. You can choose from the following options:
  Split this value equally
  Split this value proportional to reconciled statistical forecast Note: If you did not forecast your data hierarchically or there is no reconciliation forecast available, then the Split this value proportional to statistical forecast option is available.

3. Click Apply to apply the override.

Overrides can be locked on an individual basis or all of the overrides can collectively be locked. From the Forecasting View, you can add notes to a series. You might want to add a note when you specify an override for a forecast.

Figure 25:
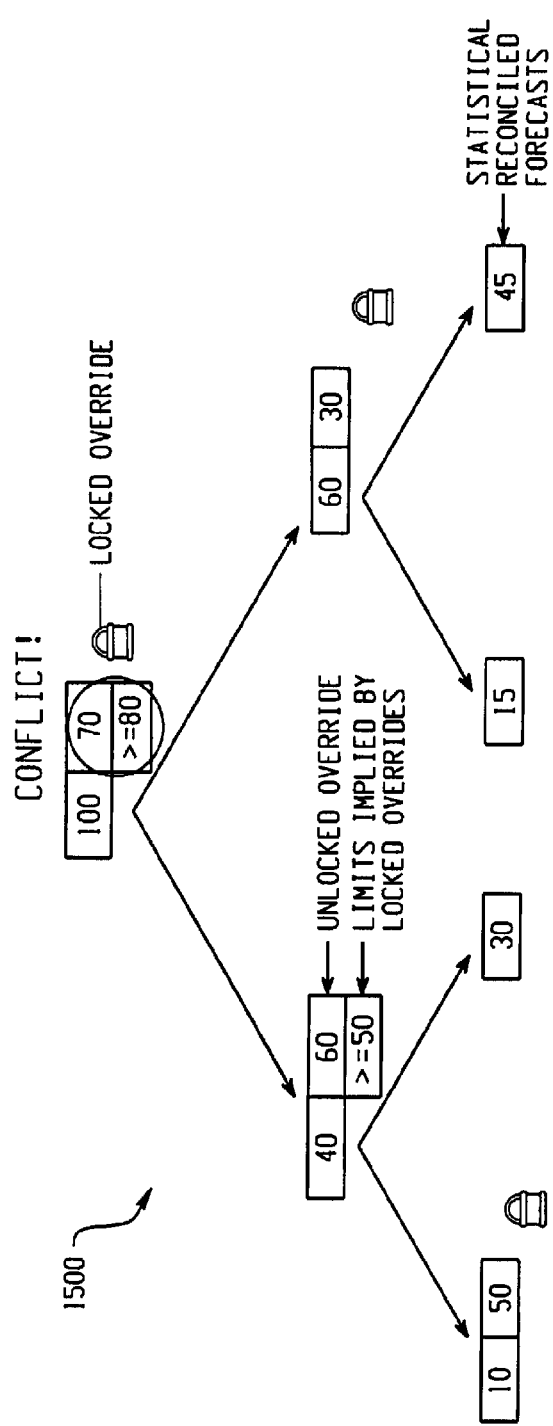
FIG. 25 depicts an example of a conflict among user-defined constraints (locked overrides).

The system can be configured to address override conflicts. An override conflict is a condition that occurs when a locked override for a given time interval violates the limits implied by locked overrides at the same time interval but in lower levels of the hierarchy. FIG. 25 at 1500 shows an example of this conflict. In FIG. 25, a conflict exists because the locked override's value of "70" for a given time interval conflicts with the limits implied by the locked overrides at the same time interval but in lower levels of the hierarchy (e.g., ">=80").

Since override conflicts can arise among overrides at different levels, the system can offer options for conflict resolution, such as requiring that conflicts be resolved prior to reconciliation and ignoring conflicts. This can mean that some nodes will be left unreconciled in case of conflicts.

The system can detect conflicts between locked overrides. If a conflict occurs, then this conflict appears in the Override Conflicts dialog box. To resolve conflicts, from a user interface, you can select a date. The interface lists by date all the locked overrides that have conflicts. The interface shows the conflict for the date that you selected. To resolve a conflict, you can do the following in the Parent and Children node hierarchy tables:

Clear the check boxes for the overrides that can be unlocked.

Change the override value in the table.

If there are still conflicts, the interface does not close. You might need to select another date from the interface. If there are no more conflicts, then the system attempts to reconcile the hierarchy. After this reconciliation has completed, a message confirming this appears. If you add an override to data that you choose to forecast hierarchically, then you reconcile the hierarchy in order for the system to calculate the final forecast.

You might want to specify the reconciliation options for any overrides that you have specified.

To specify the reconciliation options for overrides, you can use the following steps:

1. You can specify the reconciliation options in the following ways:

If you are creating a project, then you can specify these options from the Configure the Hierarchy step in the New Project Wizard.

If you have already created the project, then you can modify the hierarchy settings by selecting→Hierarchy Settings. The Hierarchy Settings dialog box opens. This dialog box has the same options that are available from the Configure the Hierarchy step in the New Project Wizard.

2. In the New Project Wizard or Hierarchy Settings dialog box, click Advanced. The Advanced Reconciliation Settings dialog box opens.

3. Select the method to use when resolving conflicts between locked overrides. You can choose from the following options:

Require that conflicts be resolved before reconciliation does not reconcile the hierarchy till all of the override conflicts are resolved.

Ignore conflicts (unresolved conflicts will result in unreconciled nodes) tries to reconcile the hierarchy without checking for the conflicts. If the system finds a conflict for a locked override, then the node that contains that override is not reconciled. This option is useful for reconciling overrides in batch mode.

4. Specify whether to restrict the direction of the reconciliation. You can choose from the following options:

No restriction reconciles all of the forecasts in the hierarchy regardless of the reconciliation method that you have specified. This option might involve an implicit top-down pass as part of a bottom-up reconciliation method, or it might involve an implicit bottom-up pass as part of a top-down reconciliation method. If you select this option, then the forecasts at the reconciliation level could change.

Restrict to direction implied by reconciliation method (may result in unreconciled nodes) can result in reconciliation failures in the hierarchy. The forecasts at the reconciliation level do not change unless they are explicitly overriden. Both locked and unlocked overrides at the reconciliation level are honored.

From the Advanced Reconciliation Settings dialog box, you can specify how you want to resolve conflicts between locked overrides and specify whether to restrict the direction of the reconciliation. Depending on the combination of options that you select, your results will be slightly different.

The following table explains the possible combinations that you can select and the events that result:

| Resolve Conflicts | Reconciliation direction | Result |
|---|---|---|
| Require that conflicts be resolved before reconciliation | No restriction | When you click Update in the Forecasting View, the system determines if there are any conflicts. If conflicts exist, the Override Conflicts dialog box opens. In this dialog box, you have the following options: You can close this dialog box, in which case the hierarchy remains unreconciled. You can resolve any conflicts, in which case the system reconciles the hierarchy when you close this dialog box. |
| Ignore conflicts | No restriction | When you click Reconcile in the Forecasting View, the system determines if there are any conflicts. However, because you selected the Ignore conflicts option, the Override Conflicts dialog box does not open if conflicts are detected. Instead the Reconciliation Failure Report opens. This report lists the override conflicts and the reconciliation failures. The relationship between the conflicts and the reconciliation failures is one-to-one. (For every conflict, there should be a reconciliation failure.) You might select these options if you want to reconcile the hierarchy as best as possible, but still allow a few conflicts. |

-continued

| Resolve Conflicts | Reconciliation direction | Result |
|---|---|---|
| Require that conflicts be resolved before reconciliation | Restrict direction | When you click Update in the Forecasting View, the system determines if there are any conflicts. If conflicts exist, the Override Conflicts dialog box opens. In this dialog box, you have the following options: You can close this dialog box, in which case the hierarchy remains unreconciled. You can resolve any conflicts, in which case the system reconciles the hierarchy when you close this dialog box. However, there could be reconciliation failures even if the override conflicts are resolved. In general, an override conflict implies a reconciliation failure, but failures are not always due to over-ride conflicts. Therefore, resolving override conflicts reduces the number of reconciliation failures, but might not eliminate all of the failures. If additional failures exist, then the Reconciliation Failure Report opens and shows the reconciliation failures. |
| Ignore conflicts | Restrict direction | When you click Reconcile in the Forecasting View, the system determines if there are any conflicts. However, because you selected the Ignore conflicts option, the Override Conflicts dialog box does not open if conflicts are detected. Instead the Reconciliation Failure Report opens. This report lists the override conflicts and the reconciliation failures. The relationship between the conflicts and the reconciliation failures is not necessarily one-to-one. Additional reconciliation failures might have occurred. You might want to select these options if you want the system to reconcile the hierarchy with restrictions but without intervention. |

If you have unreconciled nodes in the hierarchy, then a warning message appears in the interface. Click Report to open the Reconciliation Failure Report.

This report can contain the following tabs: Override Conflict; and Unreconciled Nodes.

The Override Conflicts tab shows the conflicts between overrides that were detected before reconciliation. By resolving these conflicts and reconciling the hierarchy again, you reduce the number of reconciliation failures that the system detects. The relationship between the number of override conflicts and the number of un-reconciled nodes depends on how you set up your hierarchy.

The Unreconciled Nodes tab shows the nodes in the hierarchy that could not be reconciled. The table that appears on this tab displays the following information:

The time period for the unreconciled node.

The name of the node.

The final forecast of the unreconciled node. This forecast could have been set by a locked override.

Any limits that were implied by a locked override. The unreconciled node could violate this limit. This information is available if you selected the Ignore conflicts and the No restriction options when you configured the hierarchy.

The final forecast of the unreconciled node based on the final forecasts of the nodes in the lower levels of the hierarchy.

The following examples show how the system reconciles the hierarchy based on the reconciliation options that you choose. These examples assume that you have created a hierarchy for Region>Product Category>Product Line. The following table shows the possible values for each level:

| Level in the hierarchy | Possible values |
|---|---|
| Region | Southeast |
| Product Category | Toys |
| | Clothes |
| Product Line | Trains |
| | Dolls |
| | Games |
| | Shirts |
| | Pants |

The examples use the following assumptions:

The data in these examples is for a single time period. This period is December 2008.

Forecast Proportions is selected as the disaggregation method.

Sum of Values is selected as the aggregation method.

The Allow negative forecasts option is not checked in the Forecast panel of the Options dialog box.

The following is an example of a top-down method of reconciliation with no conflicts.

This example also shows how the system honors locked overrides and how unlocked overrides that are not in the highest level of the hierarchy are used.

Figure 26:
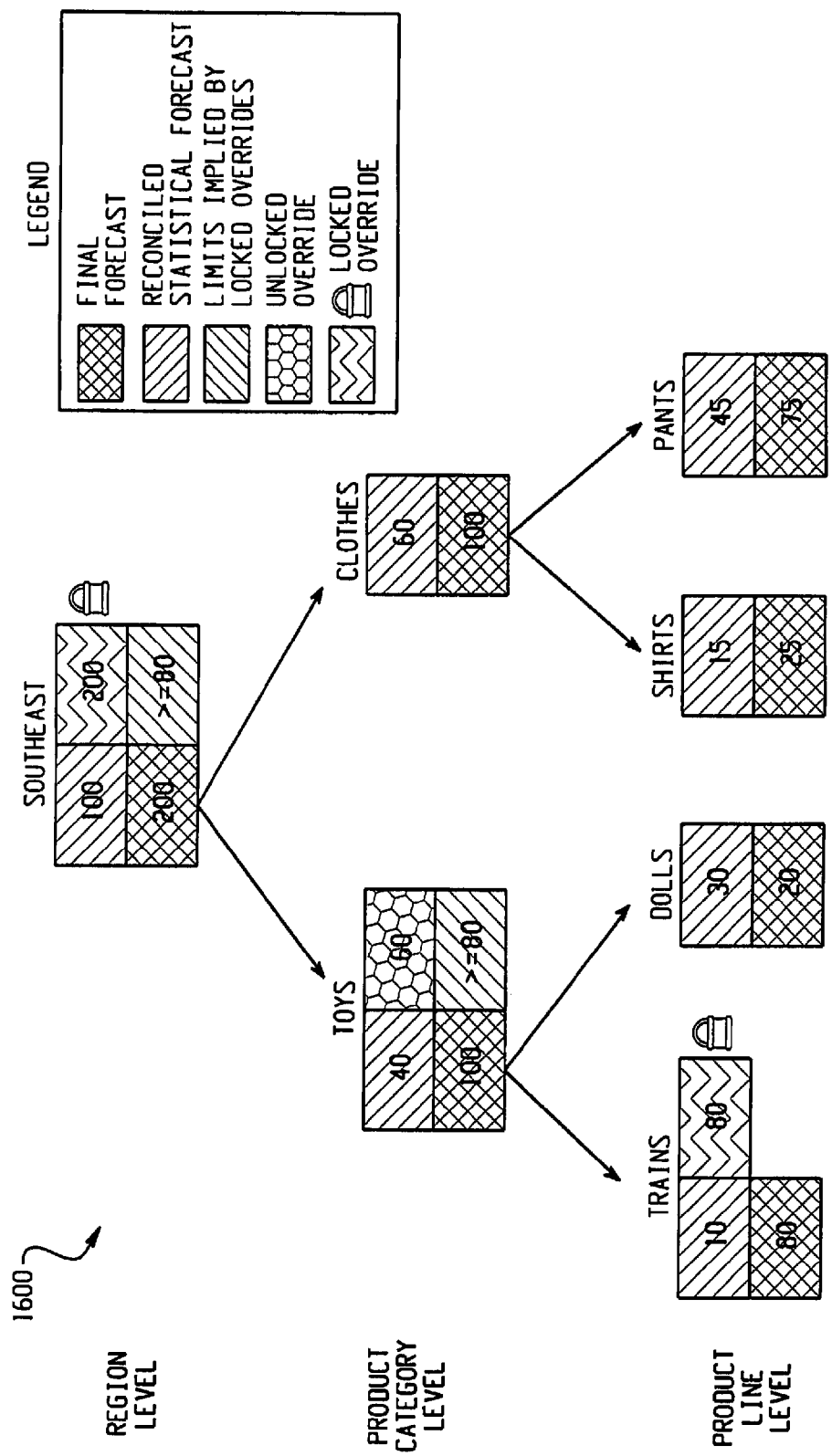
FIG. 26 depicts how a system reconciles a hierarchy for a fixed time.

In this example, the following options were used when you set up the hierarchy:

Top Down as the reconciliation method either No restriction or Restrict to direction implied by reconciliation method as the restriction on the reconciliation direction You also specified the following overrides for the December 2008 time period:

200 as a locked override for the Southeast node in the Region level 60 as an unlocked override for the Toys node of the Product Category level 80 as a locked override for the Trains node in the Product Line level FIG. 26 shows at 1600 how the system reconciles the hierarchy for the December 2008 time interval.

The following explains the reconciliation process for each level of the hierarchy:

Region: Because you selected top-down as the reconciliation method, the system starts reconciling the hierarchy at the highest level in the hierarchy. In this example, the highest level is the Region level.

The reconciled statistical forecast for the Southeast node was 100; however, you specified 200 as a locked override for this level. The system honors this locked override, and consequently, the final forecast for the Southeast node is 200.

Product Category: In the Product Category level, there are 2 nodes—the Toys node and the Clothes node.

For the Toys node, you specified an unlocked override of 60. The system does not honor the value of this unlocked override. Instead, the system uses the proportions to determine the final forecasts. The unlocked override that you specified for the Toys node is used instead of the reconciled statistical forecast to determine the final forecast.

The unlocked override for the Toys node is 60, and the reconciled statistical forecast for the Clothes node is 60. Because these values are equal, the final forecast for the Southeast node (200) is divided equally between the 2 nodes, so the final forecast for both the Toys and Clothes nodes is 100.

Product Line: In the Product Line level, there are 4 nodes. The 2 nodes below the Toys node are the Trains and Dolls nodes. The 2 nodes below the Clothes node are the Shirts and Pants nodes.

For the nodes under the Toys node, you specified 80 as a locked override for the Trains node. The system honors this value, so the final forecast for the Trains node is 80. Because the final forecast of the Toys node is 100, the final forecast of the Dolls node is set to 20.

In the nodes under the Clothes node, you did not specify any overrides for either node. Therefore, the system uses the proportions of the reconciled statistical forecasts to determine the final forecast for each node.

In this example, the reconciled statistical forecast for the Shirts node is 25% of the reconciled statistical forecast for the Clothes node, and the reconciled statistical forecast for the Pants node is 75% of the Clothes node. Therefore, the final forecast for the Shirts node is 25% of the final forecast for the Clothes node (or 0.25× 100=25), and the final forecast for the Pants node is 75% of the final forecast for the Clothes node (or 0.75×100=75).

Figure 27:
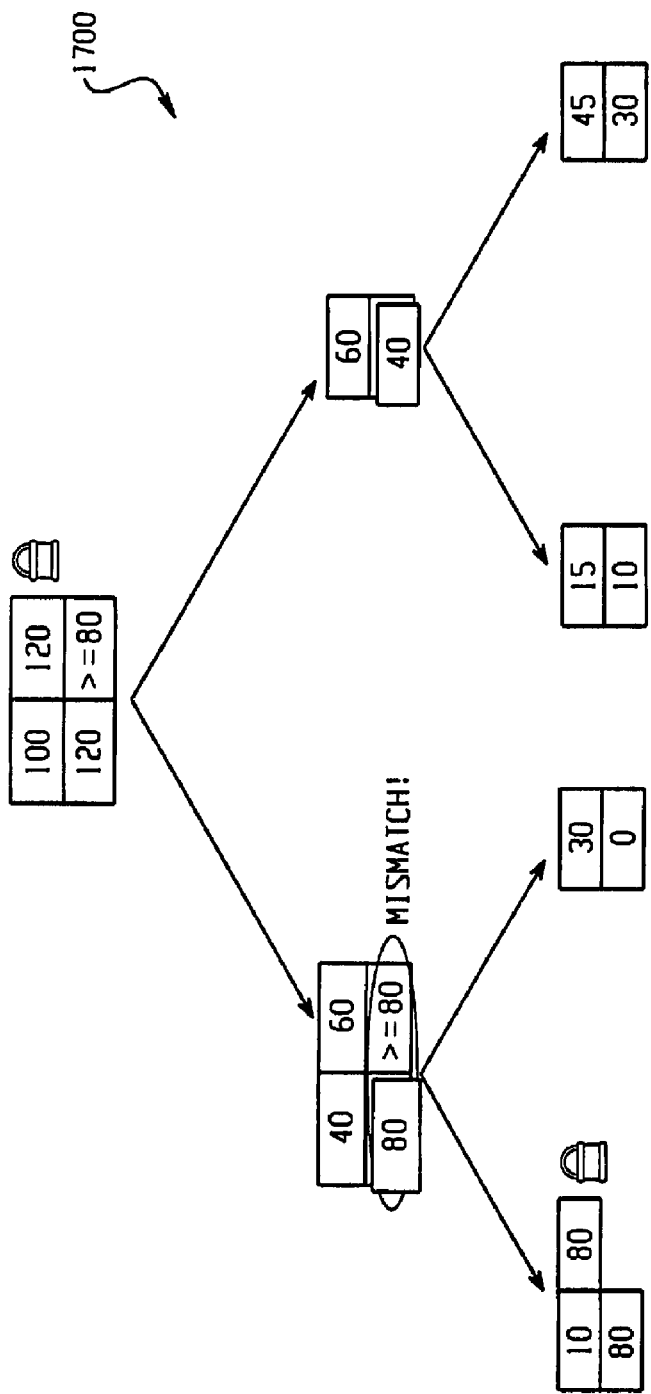
FIG. 27 depicts an illustration of a top-down reconciliation.

FIG. 27 provides at 1700 an illustration of a top-down reconciliation. The example also shows how using the proportions that were calculated from an unlocked override could violate the limit that is implied by a locked override as well as how the system uses an implicit bottom-up pass to reconcile the hierarchy.

In this example, you specified the following options when you set up the hierarchy:

Top Down as the reconciliation method
  No restriction as the restriction on the reconciliation direction You also specified the following overrides for the December 2008 time period:

120 as a locked override for the Southeast node in the Region level
  60 as an unlocked override for the Toys node of the Product Category level
  80 as a locked override for the Trains node in the Product Line level FIG. 27 shows how the system reconciles the hierarchy for the December 2008 time interval. As shown in this figure, unlocked override at middle-level is not allowed to change proportions. If it is allowed to, then the implied limit imposed by locked override below gets violated.

The following explains the reconciliation process for each level of the hierarchy:

Because you selected top-down as the reconciliation method, the system starts reconciling the hierarchy at the highest level in the hierarchy. In this example, the highest level is the Region level. The reconciled statistical forecast for the Southeast node is 100; however, you specified 120 as a locked override for this level. The system honors this override, and consequently, the final forecast for the Southeast node is 120.

Product Category: In the Product Category level, there are 2 nodes—the Toys node and the Clothes node.

For the Toys node, you specified an unlocked override of 60. The system does not honor the value of this unlocked override. Instead, the system uses the proportions to determine the final forecasts. The unlocked override that you specified for the Toys node is used instead of the reconciled statistical forecast to determine the final forecast.

The unlocked override for the Toys node is 60, and the reconciled statistical forecast for the Clothes node is 60. Because these values are equal, the final forecast for the Southeast node (120) is divided equally between the 2 nodes, so the final forecast for both the Toys and Clothes nodes is 60.

Now, you have a limit violation. The final forecast of 60 for the Toys node violates the limit implied by the locked override that you specified for the Trains node in the Product Line level. This limit states that the final forecast for the Toys node must be greater than or equal to 80. Therefore, the system cannot use the proportion that was implied by the unlocked override to determine the final forecast.

Because you selected No restriction as the restriction on the reconciliation direction, the system sets the final forecast of the Toys node to 80. Because this implied limit was aggregated from a bottom-up approach, this operation is an example of an "implicit" bottom-up method of reconciliation as part of the top-down method of reconciliation.

Because the final forecast of the Southeast node is 120, the final forecast of the Clothes node is 40 (or 120– 80).

Product Line: In the Product Line level, there are 4 nodes. The 2 nodes below the Toys node are the Trains and Dolls nodes. The 2 nodes below the Clothes node are the Shirts and Pants nodes.

In the branch of the hierarchy below the Toys node, you specified 80 as a locked override for the Trains node. The system honors this value, and the final forecast for the Trains node is 80. Because the final forecast for the Toys node is 80, the final forecast for the Dolls node is 0 (or 80–80).

In the branch of the hierarchy below the Clothes node, you did not specify overrides for either of the nodes in the Product Line level. The system uses the proportions of the reconciled statistical forecasts to determine the final forecast for each node.

In this example, the reconciled statistical forecast for the Shirts node is 25% of the reconciled statistical forecast for the Clothes node, and the reconciled statistical forecast for the Pants node is 75% of the Clothes node. Therefore, the final forecast for the Shirts node is 25% of the final forecast for the Clothes node (or 0.25× 40=10). The final forecast for the Pants node is 75% of the final forecast for the Clothes node (or 0.75×40=30).

Figure 28:
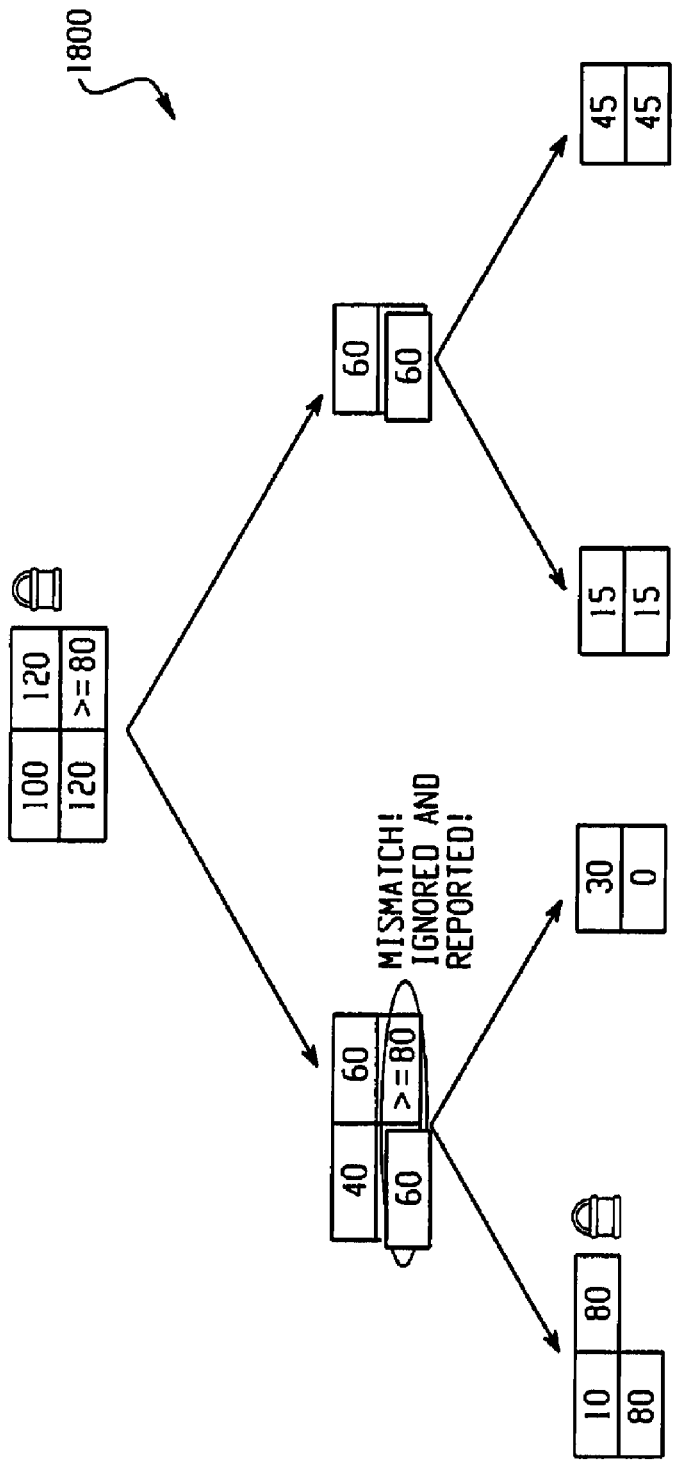
FIG. 28 depicts how the system tries to reconcile a hierarchy using a top-down method of reconciliation in presence of unresolved conflicts.

FIG. 28 illustrates at 1800 how the system tries to reconcile a hierarchy using the top-down method of reconciliation as well as how a node could remain unreconciled because you choose to restrict the direction of the reconciliation process when you set up the hierarchy.

In this example, you specified the following options when you set up the hierarchy:
  Top Down as the reconciliation method
  Restrict to direction implied by reconciliation method as the restriction on the reconciliation direction You also specified the following overrides for the December 2008 time period:
  120 as a locked override for the Southeast node in the Region level
  60 as an unlocked override for the Toys node of the Product Category level
  80 as a locked override for the Trains node in the Product Line level FIG. 28 shows how the system reconciles the hierarchy for the December 2008 time interval. The following explains the reconciliation process for each level of the hierarchy:
  Region: Because you selected top-down as the reconciliation method, the system starts reconciling the hierarchy at the highest level in the hierarchy. In this example, the highest level is the Region level.
  The reconciled statistical forecast for the Southeast node was 100; however, you specified 200 as a locked override for this level. The system honors this locked override, and consequently, the final forecast for the Southeast node is 200.
    Product Category: In the Product Category level, there are 2 nodes—the Toys node and the Clothes node.
      For the Toys node, you specified an unlocked override of 60. The system does not honor the value of this unlocked override. Instead, the system uses the proportions to determine the final forecasts. The unlocked override that you specified for the Toys node is used instead of the reconciled statistical forecast to determine the final forecast.
      The unlocked override for the Toys node is 60, and the reconciled statistical forecast for the Clothes node is 60. Because these values are equal, the final forecast for the Southeast node (120) is divided equally between the 2 nodes, so the final forecast for both the Toys and Clothes nodes is 60.
      Now, you have a limit violation. The final forecast of 60 for the Toys node violates the limits implied by the locked override. This limit states that the final forecast for the Toys node must be greater than or equal to 80. However, when you set up the hierarchy, you chose to restrict the direction of the reconciliation, so unlike in the previous example, the system does not use the bottom-up method of reconciliation to reconcile the Toys node. Instead, the final forecasts for the Toys and Clothes nodes remain at 60, and the Toys node appears as an unreconciled node in the Reconciliation Failure Report.
    Product Line: In the Product Line level, there are 4 nodes. The 2 nodes below the Toys node are the Trains and Dolls nodes. The 2 nodes below the Clothes node are the Shirts and Pants nodes.
      In the branch of the hierarchy below the Toys node, you specified 80 as a locked override for the Trains node. The system honors this value, and the final forecast for Trains is 80. Because the final forecast for the Toys node is 60, there is not enough left to allocate to the Dolls node, so the final forecast for the Dolls node is set to 0.
      In the branch of the hierarchy below the Clothes node, you did not specify overrides for either of the nodes. Therefore, the system uses the proportions of the reconciled statistical forecasts to determine the final forecast for each node.
      In this example, the reconciled statistical forecast for the Shirts node is 25% of the reconciled statistical forecast for the Clothes node, and the reconciled statistical forecast for the Pants node is 75% of the Clothes node. Therefore, the final forecast for the Shirts node is 25% of the final forecast for the Clothes node (or 0.25× 60=15), and the final forecast for the Pants node is 75% of the final forecast for the Clothes node (or 0.75×60=45).

Figure 29:
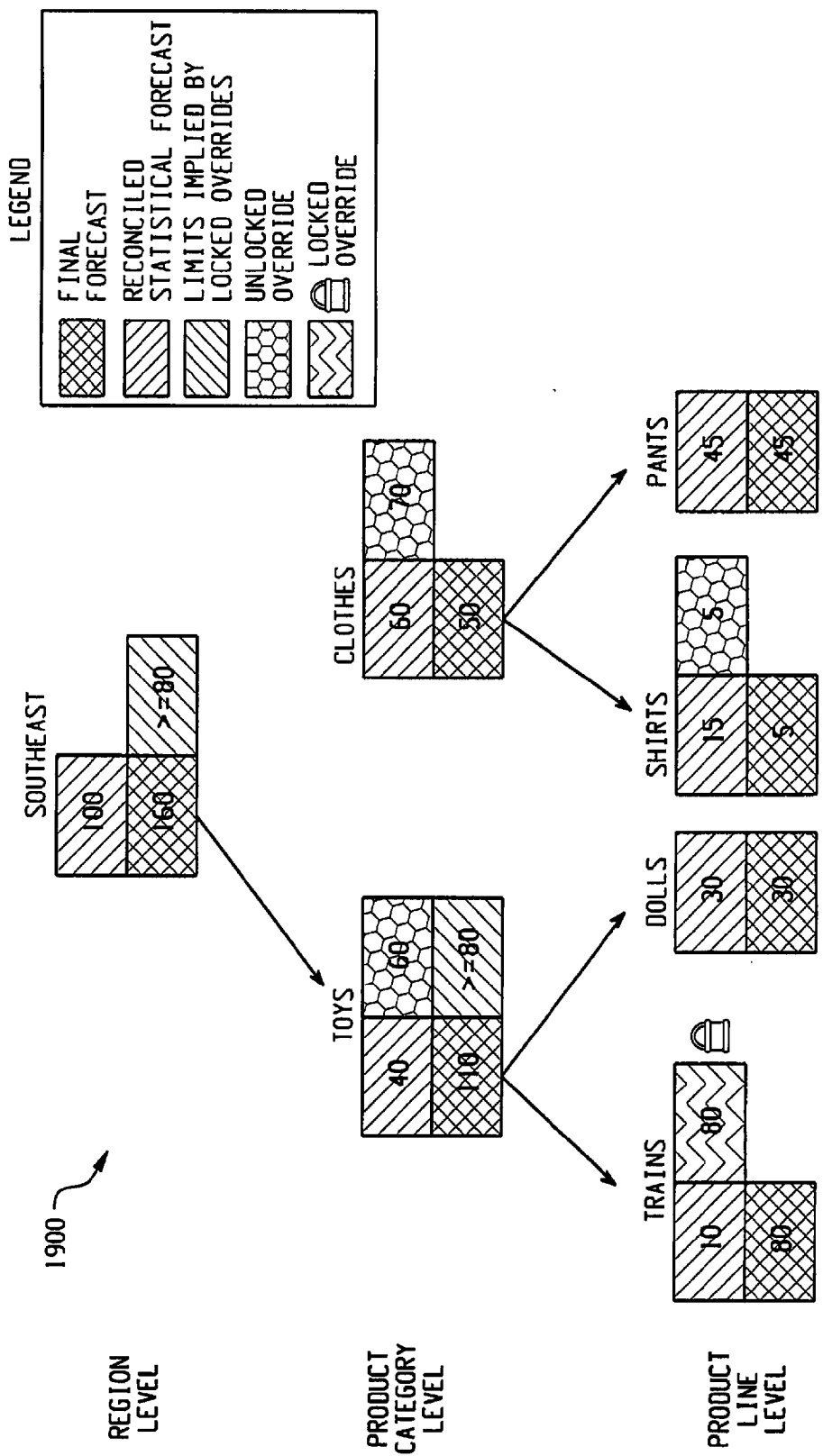
FIG. 29 depicts an example of a bottom-up method of reconciliation with locked and unlocked overrides in the lowest level.

FIG. 29 shows at 1900 an example of a bottom-up method of reconciliation with locked and unlocked overrides in the lowest level. More specifically, the example illustrates:
  how the system reconciles a hierarchy using the bottom-up method of reconciliation
  how locked overrides have a direct impact on the final forecasts in the higher levels of the hierarchy
  how an unlocked override has no effect on the final forecast unless it is in the lowest level of the hierarchy In this example, you specified the following options when you set up the hierarchy:
  Bottom Up as the reconciliation method
  either No restriction or Restrict to direction implied by reconciliation method as the restrictions on the reconciliation direction You also specified the following overrides for the December 2008 time period:
  60 as an unlocked override for the Toys node of the Product Category level
  70 as an unlocked override for the Clothes node of the Product Category level
  80 as a locked override for the Trains node in the Product Line level
  5 as an unlocked override for the Shirts node in the Product Line level FIG. 29 shows how the system reconciles the hierarchy for the December 2008 time interval and is explained as follows:
  Region: Because you selected Bottom Up as the reconciliation method, the system starts reconciling the hierarchy at the lowest level in the hierarchy. In this example, the lowest level is the Product Line level.
    In the Product Line level, there are 4 nodes. The 2 nodes below the Toys node are the Trains and Dolls nodes. The 2 nodes below the Clothes node are the Shirts and Pants nodes.
    In the branch of the hierarchy below the Toys node, you specified 80 as a locked override for the Trains node. The system honors this value, and the final forecast for Trains is 80. Because you are using the bottom-up method of reconciliation, the final forecast for the Dolls node is equal to the reconciled statistical forecast of 30.
    In the branch of the hierarchy below the Clothes node, you specified an unlocked override of 5 for the Shirts node. Because you selected the bottom-up method of reconciliation, the system honors this unlocked override. Therefore, the final forecast for the Shirts node is 5. You did not specify an override for the Pants node, so the final forecast matches the reconciled statistical forecast of 45.

Product Category: In the Product Category level, there are 2 nodes—the Toys node and the Clothes node.
   The system uses the final forecasts of the nodes at the lower level to determine the final forecast for the nodes at the Product Category level.
   For the Toys node, the final forecast for the Trains node (80) is added to the final forecast for the Dolls node (30), and so the final forecast for the Toys node is 110. Note that the unlocked override of 60 for the Toys node has no effect.
   For the Clothes node, the final forecast for the Shirts node (5) is added to the final forecast for the Pants node (45), so the final forecast for the Clothes node is 50. Again, the system does not honor the unlocked override that you specified for the Clothes node.

Region: The values of the final forecasts for the nodes in the Product Category level determine the final forecast for the Southeast node. The combination of the final forecasts for the Toys node and the Clothes node equals 160, so the final forecast for the Southeast node is 160.

Figure 30:
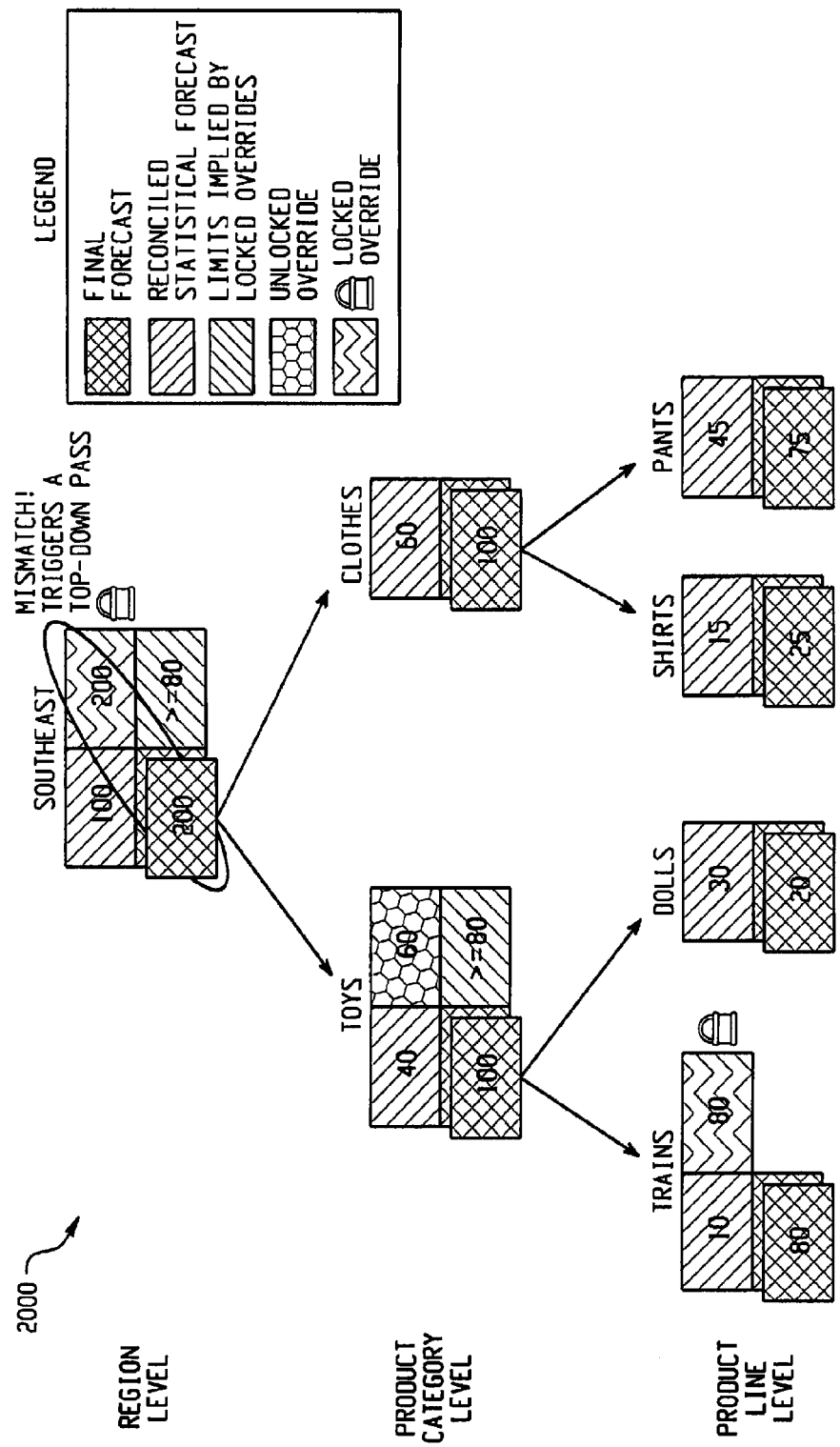
FIG. 30 depicts an implicit top-down reconciliation process in the bottom-up method of reconciliation.

FIG. 30 illustrates at 2000 an implicit top-down reconciliation process in the bottom-up method of reconciliation. More specifically, the example shows the following:
   how the system tries to reconcile a hierarchy using the bottom-up method of reconciliation
   how a mismatch can result at a higher level of the hierarchy, if you specified a locked override at that level
   how the system uses an implicit top-down pass to reconcile the hierarchy In this example, you specified the following options when you set up the hierarchy:
   Bottom Up as the reconciliation method
   No restriction as the restriction on the reconciliation direction You also specified the following overrides for the December 2008 time period:
   200 as a locked override for the Southeast node in the Region level
   60 as an unlocked override for the Toys node of the Product Category level 80 as a locked override for the Trains node in the Product Line level FIG. 30 shows how the system reconciles the hierarchy for the December 2008 time interval and is explained as follows:
   Product Line: Because you selected Bottom Up as the reconciliation method, the system starts reconciling the hierarchy at the lowest level in the hierarchy. In this example, the lowest level is the Product Line level.
      In the Product Line level, there are 4 nodes. The 2 nodes below the Toys node are the Trains and Dolls nodes. The 2 nodes below the Clothes node are the Shirts and Pants nodes.
      In the branch of the hierarchy below the Toys node, you specified 80 as a locked override for the Trains node. The system honors this value, and the final forecast for the Trains node is set to 80. Because you are using the bottom-up method of reconciliation, the final forecast for the Dolls node is equal to the reconciled statistical forecast of 30.
      In the branch of the hierarchy below the Clothes node, the final forecasts equal the reconciled statistical forecasts. Therefore, the final forecast for the Shirts node is 15, and the final forecast for the Pants node is 45.
   Product Category: In the Product Category level, there are 2 nodes—the Toys node and the Clothes node.
      The system uses the final forecasts of the nodes at the lower level to determine the final forecast for the nodes at the Product Category level.
      For the Toys node, the final forecast for the Trains node (80) is added to the final forecast for the Dolls node (30), and so the final forecast for the Toys node is 110.
      For the Clothes node, the final forecast for the Shirts node (15) is added to the final forecast for the Pants node (45), so the final forecast for the Clothes node is 60.
   Region: For the Southeast node, you specified a locked override of 200. However, the combination of the final forecasts of the nodes in the Product Category level equal 170, and consequently, there is a mismatch between the final forecast and the locked override that you specified for the Southeast node.
      Because you selected the No restriction option as the restrictions to the reconciliation direction, the system performs an implicit top-down pass of the hierarchy to reconcile the hierarchy.

The following explains the implicit top-down reconciliation process for each level of the hierarchy:
   Region: Because the system is now performing an implicit top-down reconciliation, it replaces the final forecast of 170 that was calculated by the bottom-up method of reconciliation with the 200 that you specified as the locked override.
   Product Category: You specified an unlocked override of 60 for the Toys node. The system uses this unlocked override to determine the proportions during the implicit top-down pass.
      The unlocked override that you specified for the Toys node is 60, and the final forecast for the Clothes node is 60. Because these nodes are equal, the system divides the 200 value from the Southeast node equally between these 2 nodes, so the final forecast for both the Clothes and Toys nodes is 100.
   Product Line: In the branch of the hierarchy below the Toys node, you specified a locked override of 80 for the Trains node. The system honors this locked override, and the final forecast for the Trains node is set to 80. Because the final forecast for the Toys node is 100, the final forecast for the Dolls node is 100−80=20.
      In the branch of the hierarchy below the Clothes node, you did not specify a locked override for either of the nodes. Therefore, the system uses the proportions of the reconciled statistical forecasts to determine the final forecast for each node.
      In this example, the reconciled statistical forecast for the Shirts node is 25% of the reconciled statistical forecast for the Clothes node, and the reconciled statistical forecast for the Pants node is 75% of the Clothes node. Therefore, the final forecast for the Shirts node is 25% of the final forecast for the Clothes node (or 0.25×100=25), and the final forecast for the Pants node is 75% of the final forecast for the Clothes node (or 0.75×100=75).

Figure 31:
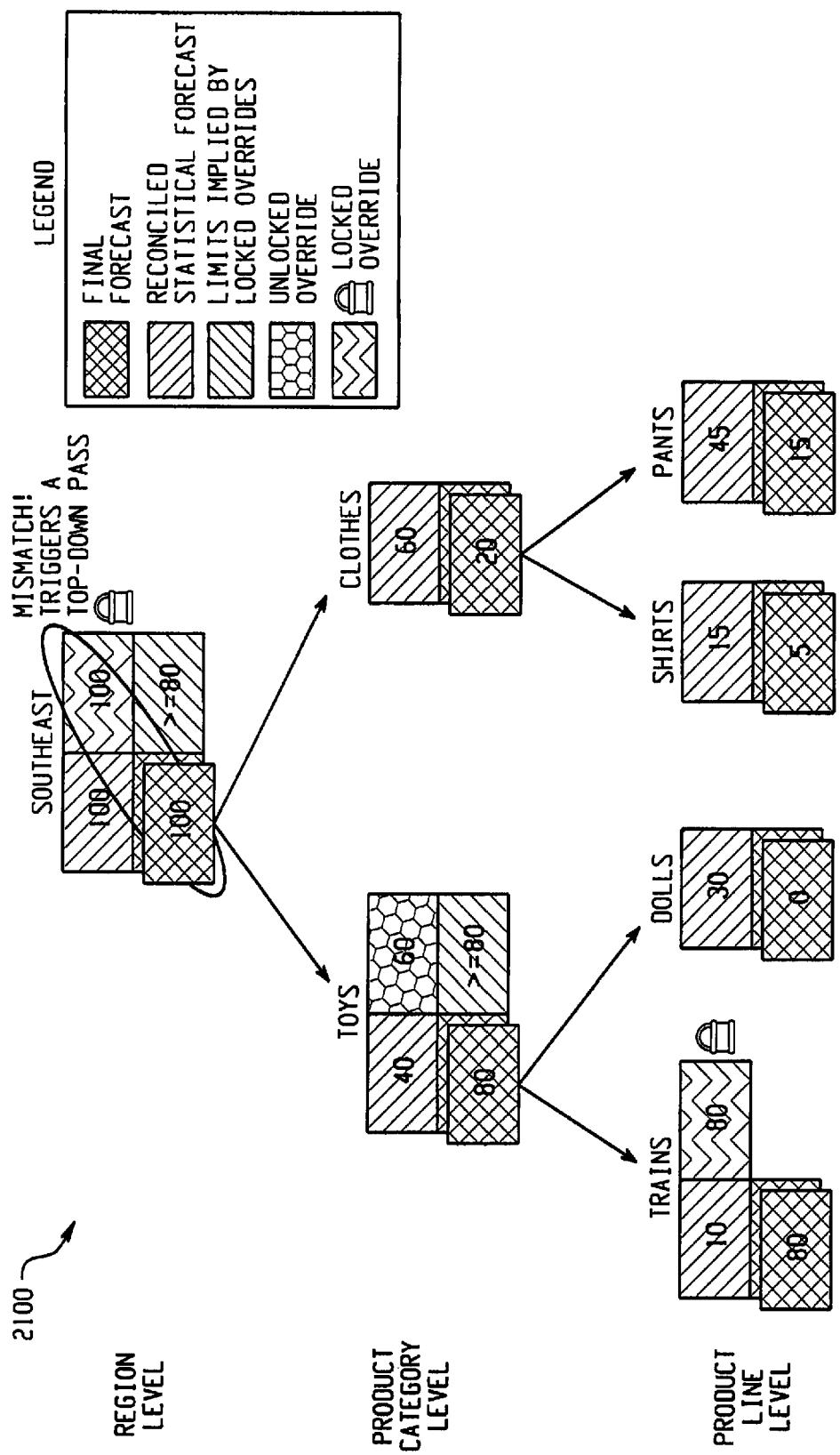
FIG. 31 depicts implied limits having precedence over an unlocked override.

FIG. 31 illustrates at 2100 implied limits having precedence over an unlocked override. More specifically, this example shows the following:
   how the system tries to reconcile a hierarchy using the bottom-up method of reconciliation
   how a mismatch can result at a higher level of the hierarchy if you specified a locked override at that level

- how the system uses an implicit top-down pass to reconcile the hierarchy
- how an implied limit at the middle level can have precedence over an unlocked override In this example, you specified the following options when you set up the hierarchy:
- Bottom Up as the reconciliation method
- No restriction as the restriction on the reconciliation direction You also specified the following overrides for the December 2008 time period:
- 100 as a locked override for the Southeast node in the Region level
- 60 as an unlocked override for the Toys node of the Product Category level
- 80 as a locked override for the Trains node in the Product Line level Note: In addition to these settings, there are several assumptions about the data and option settings that are common to all the examples. To view these assumptions, see "Overview of the Examples" on page 134.

FIG. 31 shows how the system reconciles the hierarchy for the December 2008 time interval and is explained as follows:

Product Line: Because you selected Bottom Up as the reconciliation method, the system starts reconciling the hierarchy at the lowest level in the hierarchy. In this example, the lowest level is the Product Line level.
- In the Product Line level, there are 4 nodes. The 2 nodes below the Toys node are the Trains and Dolls nodes. The 2 nodes below the Clothes node are the Shirts and Pants nodes.
- In the branch of the hierarchy below the Toys node, you specified 80 as a locked override for the Trains node. The system honors this value, and the final forecast for the Trains node is set to 80. Because you are using the bottom-up method of reconciliation, the final forecast for the Dolls node is equal to the reconciled statistical forecast of 30.
- In the branch of the hierarchy below the Clothes node, the final forecasts equal the reconciled statistical forecasts. Therefore, the final forecast for the Shirts node is 15, and the final forecast for the Pants node is 45.

Product Category: In the Product Category level, there are 2 nodes—the Toys node and the Clothes node.
- The system uses the final forecasts of the nodes at the lower level to determine the final forecast for the nodes at the Product Category level.
- For the Toys node, the final forecast for the Trains node (80) is added to the final forecast for the Dolls node (30), and so the final forecast for the Toys node is 110.
- For the Clothes node, the final forecast for the Shirts node (15) is added to the final forecast for the Pants node (45), so the final forecast for the Clothes node is 60.

Region: For the Southeast node, you specified a locked override of 100. However, the combination of the final forecasts for the nodes in the Product Category level equals 170, and consequently, there is a mismatch between the final forecast and the locked override that you specified for the Southeast node.
- Because you selected the No restriction option as the restriction on the reconciliation direction, the system performs an implicit top-down pass to reconcile the hierarchy.

The following explains the implicit top-down reconciliation process for each level of the hierarchy:

Region: Because the system is now performing an implicit top-down reconciliation, it replaces the final forecast of 170 that was calculated by the bottom-up method of reconciliation with the 100 that you specified as the locked override.

Product Category: You specified an unlocked override of 60 for the Toys node. However, you specified a locked override of 80 for the Trains node in the Product Category level. This implies that the value of the Toys node must be greater than or equal to 80. In this case, the implied limit has precedence over the unlocked override in determining the proportions during the implicit top-down pass.
- The implied limit for the Toys node is 80% of the final forecast for the Southeast node. Therefore, the final forecast for the Toys node is 80 (or 0.80×100=80), and the final forecast for the Clothes node is 20 (or 0.20×100=20).

Product Line: In the branch of the hierarchy below the Toys node, you specified a locked override of 80 for the Trains node. The system honors this locked override, and the final forecast for the Trains node is set to 80. Because the final forecast for the Toys node is 80, the final forecast for the Dolls node is set to 0.
- In the branch of the hierarchy below the Clothes node, you did not specify a locked override for either of the nodes. Therefore, the system uses the proportions of the reconciled statistical forecasts to determine the final forecast for each node.
- In this example, the reconciled statistical forecast for the Shirts node is 25% of the reconciled statistical forecast for the Clothes node, and the reconciled statistical forecast for the Pants node is 75% of the Clothes node. Therefore, the final forecast for the Shirts node is 25% of the final forecast for the Clothes node (or 0.25×20=5), and the final forecast for the Pants node is 75% of the final forecast for the Clothes node (or 0.75×20=15).

Figure 32:
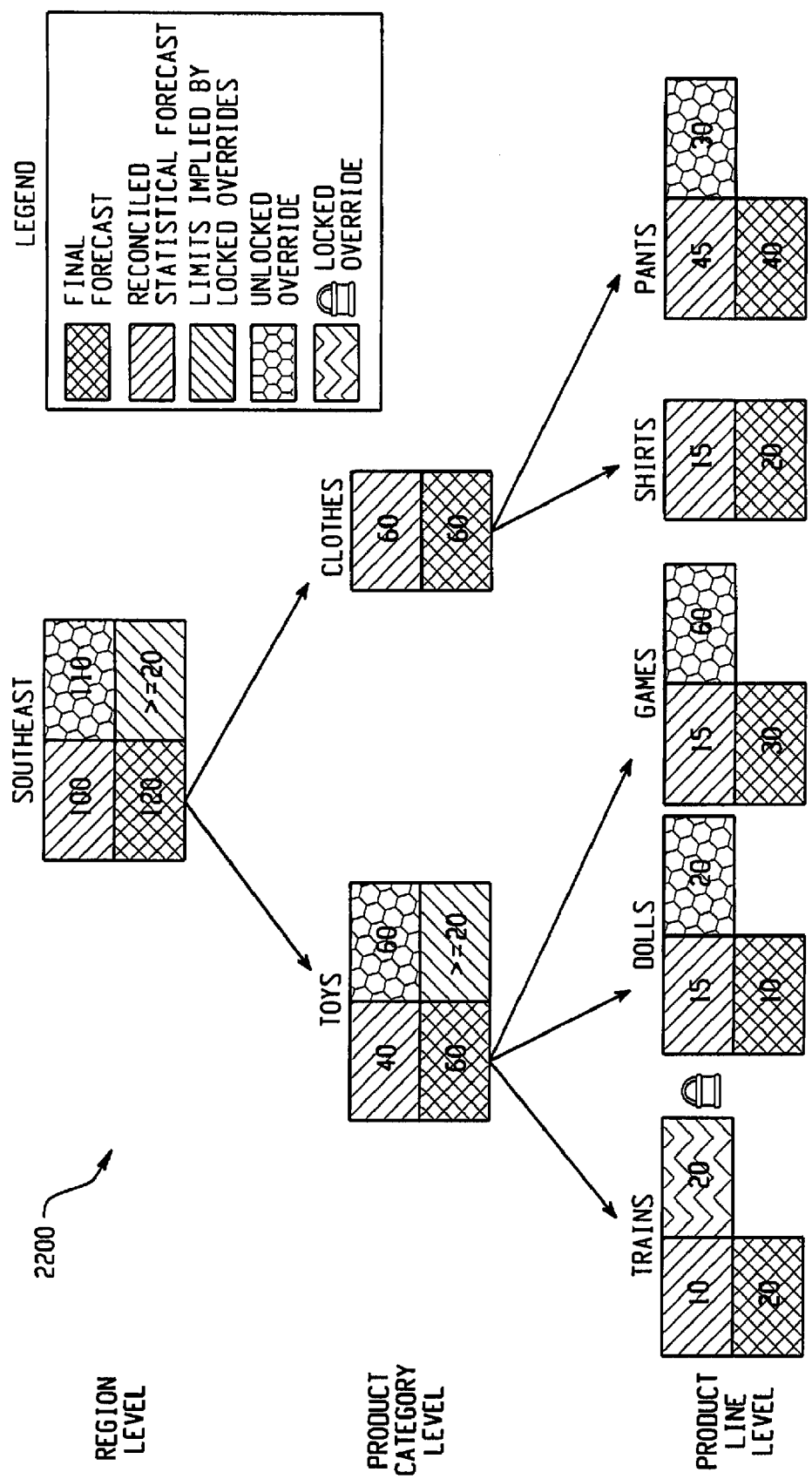
FIG. 32 depicts an example of a middle-out method of reconciliation with no conflicts.

FIG. 32 provides at 2200 an example of a middle-out method of reconciliation with no conflicts. More specifically, the example shows the following:
- how the system reconciles a hierarchy using the middle-out method of reconciliation
- how the forecasts at the middle level are unchanged because they do not violate the limits implied by a locked override in a lower level of the hierarchy, and there is no locked override in a higher level of the hierarchy In this example, you specified the following options when you created the hierarchy:
- Middle Out as the reconciliation method
- either No restriction or Restrict to direction implied by reconciliation method as the restriction on the reconciliation direction You also specified the following overrides for the December 2008 time period:
- 60 as an unlocked override for the Toys node of the Product Category level
- 20 as a locked override for the Trains node in the Product Line level FIG. 32 shows how the system reconciles the hierarchy for the December 2008 time interval.

The following explains the reconciliation process for each level of the hierarchy:

Product Category: Because you selected the middle-out method of reconciliation, the system starts reconciling the hierarchy at the Product Category level.
   In the Product Category level, there are 2 nodes—the Toys node and the Clothes node.
   For the Toys node, you specified an unlocked override of 60. Because the system is starting the reconciliation at this level, this unlocked override is honored, so the final forecast for the Toys node is 60.
   For the Clothes node, the final forecast is equal to the reconciled statistical forecast of 60.

Region: the system calculates the final forecast for the Southeast node by using the bottom-up method of reconciliation.
   The values of the final forecasts for the nodes in the Product Category level determine the final forecast for the Southeast node. The combination of the final forecasts for the Toys node and the Clothes node equals 120, so the final forecast for the Southeast node is 120.

Product Line: the system calculates the final forecast for the nodes in the lowest level in the hierarchy by using the top-down method of reconciliation. In the Product Line level, there are 5 nodes. The 3 nodes below the Toys node are the Trains, Dolls, and Games nodes. The 2 nodes below the Clothes node are the Shirts and Pants nodes.
   For the branch of the hierarchy below the Toys node, you specified a locked override of 20 for the Trains node. The system honors locked overrides, so the final forecast for the Trains node is 20.
   Because the system is using the top-down method of reconciliation for this level of the hierarchy, the unlocked overrides that you specified for the Dolls and Games nodes do not match the final forecasts. However, these unlocked overrides are used to determine the proportions for the final forecasts.
   The final forecast for the Toys node is 60; however, the final fore-cast for the Trains node is 20, which means that the combined final forecasts for the Dolls and Games nodes must equal 40. The values of these nodes are calculated by using the following proportions:
   For the Dolls node, you specified an unlocked override of 20. The total of the unlocked overrides for the Dolls and Games nodes is 20+60=80. Because the proportion of the Dolls node is 20/80=25% of this total value, the final forecast for the Dolls node is 25% of the final forecast for the Toys node. Therefore, the final forecast for the Dolls node is 40×0.25=10.
   For the Games node, you specified an unlocked override of 60. Because the proportion of the Games node is 60/80=75% of this total value, the final forecast for the Games node is 75% of the final forecast for the Toys node. Therefore, the final forecast for the Games node is 40×0.75=30.
   For the branch of the hierarchy below the Clothes node, you specified an unlocked override of 30 for the Pants node. When calculating the proportions, the system uses this un-locked override instead of the reconciled statistical forecast.
   Using the unlocked override for the Pants node, the total for the Shirts and Pants nodes is 15+30=45. The values of these nodes are calculated using the following proportions:
   Because the Shirt node is 15/45=33.3% of this total value, the final forecast for the Shirts node is 33.3% of the final forecast for the Clothes node. Therefore, the final forecast for the Shirts node is 60×0.333=20.
   Because the Pants node is 30/45=66.6% of this total value, the final forecast for the Pants node is 66.6% of the final forecast for the Clothes node. Therefore, the final forecast for the Pants node is 60×0.666=40.

Figure 33:
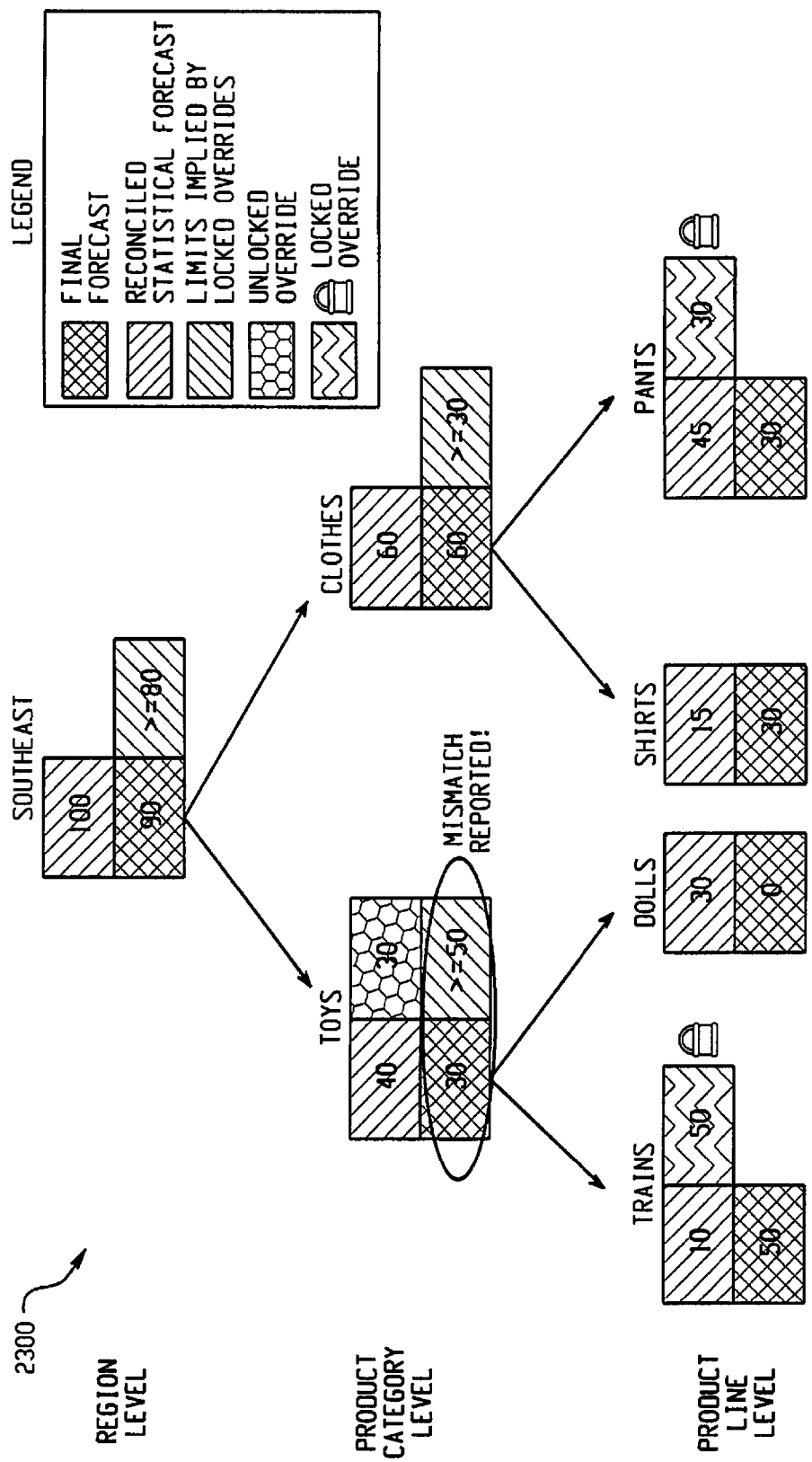
FIG. 33 depicts an example of a middle-out method of reconciliation with an unreconciled node.

FIG. 33 shows at 2300 an example of a middle-out method of reconciliation with an unreconciled node. More specifically, this example shows the following:
   How the system reconciles a hierarchy using the middle-out method of reconciliation.
   How selecting the Restrict to direction implied by reconciliation method option will honor all overrides, including unlocked overrides. As this example shows, this restriction on reconciliation direction could result in unreconciled nodes.

In this example, you specified the following options when you set up the hierarchy:
   Middle Out as the reconciliation method
   Restrict to direction implied by reconciliation method as the restriction on the reconciliation direction You also specified the following overrides for the December 2008 time period:
   30 as an unlocked override for the Toys node of the Product Category level
   50 as a locked override for the Trains node in the Product Line level
   30 as a locked override for the Pants node in the Product Line level FIG. 33 shows how the system reconciles the hierarchy for the December 2008 time interval and is explained as follows:

Product Category: Because you selected the middle-out method of reconciliation, the system starts reconciling the hierarchy at the Product Category level.
   In the Product Category level, there are 2 nodes—the Toys node and the Clothes node.
   For the Toys node, you specified an unlocked override of 30. Because you selected the Restrict to direction implied by reconciliation method option, the system honors this unlocked override, and the final forecast for the Toys node is set to 30. However, the limits that are implied by the locked override in the lowest level indicate that the final forecast must be greater than 50. The system leaves this node unreconciled, and this conflict is reported in the Reconciliation Failure Report.
   For the Clothes node, the final forecast is equal to the reconciled statistical forecast of 60. Because 60 is greater than the limits that are implied by a locked override in the lower level of the hierarchy, there are no unreconciled nodes in this branch of the hierarchy.

Region: the system calculates the final forecast for the Southeast node by using the bottom-up method of reconciliation.
   Because you had a conflict in the Toys node in the Product Category level of the hierarchy, the system uses the limit that is implied by the locked override in the Trains node to deter-mine the final forecast for the Southeast node. The final forecast for the Toys node (30) and the Clothes node (60) are combined to create the final forecast for the Southeast node, so the final forecast for the Southeast node is 90.

Product Line: the system calculates the final forecast for the nodes in the lowest level in the hierarchy by using the top-down method of reconciliation.

In the Product Line level, there are 4 nodes. The 2 nodes below the Toys node are the Trains and Dolls nodes. The 2 nodes below the Clothes node are the Shirts and Pants nodes.

For the branch of the hierarchy below the Toys node, you specified a locked override of 50 for the Trains node. The system honors locked overrides, so the final forecast for the Trains node is 50. Because the final forecast for the Toys node is 30, there is not enough left to allocate to the Dolls node, so the final forecast for the Dolls node is set to 0.

For the branch of the hierarchy below the Clothes node, you specified a locked override of 30 for the Pants node. The system honors locked overrides, so the final forecast for the Pants node is 30. Because the final forecast for the Clothes node is 60, the final forecast for the Shirts node is 60−30=30.

Figure 34:
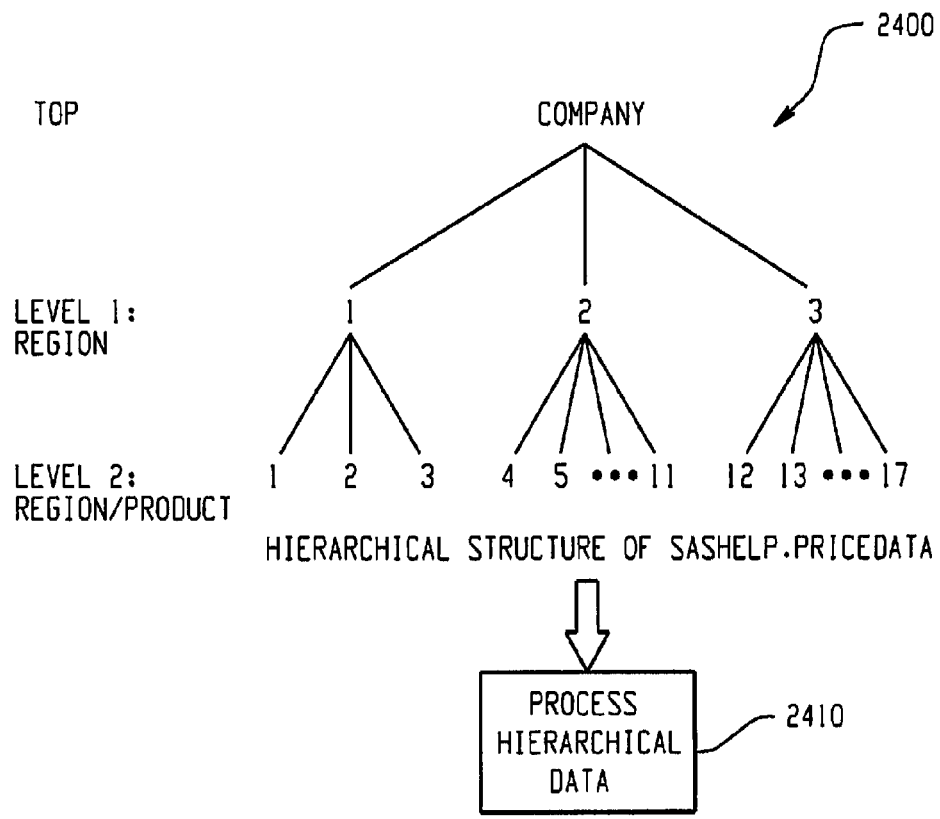
FIG. 34 depicts a hierarchical structure of region and product data being processed by a software program.

The following examples show how software can be constructed to handle reconciliation. FIG. 34 shows at 2400 a hierarchical structure of region and product data being processed by software instructions 2410. With reference to FIG. 34, forecasts are generated for the dependent variable sale first at level 2, region/product, and then at level 1, region. The separate forecasts are then reconciled in a bottom-up manner by using a reconciliation process via software instructions as follows.

More specifically, the software instructions are configured for forecasting a series at a particular level (i.e., region/product) and for forecasting the aggregated series at a higher level (e.g., region). The forecasts are then reconciled in a bottom up manner. This example uses several procedures (e.g., HPFENGINE and HPFDIAGNOSE) which are available from SAS Institute Inc. The software instructions in the example are as follows:

```
/*
/ Forecast series at level 2 (region/product);
/--------------------------------------------------------------------------*/
*Step 1: model selection;
proc hpfdiagnose data=sashelp.pricedata
    outest=lv12est
    model repository=work.mycat
    prefilter=both
    criterion=mape;
    id date interval=month;
    by region product;
    forecast sale;
    input price;
run;
*Step 2: estimation and forecasting ;
proc hpfengine data=sashelp.pricedata inest=lv12est
    out=_null_ outest=lv12fest
    modelrepository=work.mycat outfor=lv12for;
    id date interval=month;
    by region product;
    forecast sale / task=select ;
    stochastic price;
run;
/*
/ Forecast aggregated series at level 1 (region);
/--------------------------------------------------------------------------*/
*Step 1: model selection;
proc hpfdiagnose data=sashelp.pricedata
    outest=lv11est
    modelrepository=work.mycat
    prefilter=both
    criterion=mape;
    id date interval=month notsorted;
    by region;
    forecast sale / accumulate=total;
    input price / accumulate=average;
run;
*Step 2: estimation and forecasting;
proc hpfengine data=sashelp.pricedata inest=lv11est
    out=_null_ outest=lv11fest
    modelrepository=work.mycat outfor=lv11for;
    id date interval=month notsorted;
    by region;
    forecast sale / task=select accumulate=total;
    stochastic price / accumulate=average;
run;
/*
/ Reconcile forecasts bottom up with default settings;
/--------------------------------------------------------------------------*/
proc hpfreconcile disaggdata=lv12for aggdata=lv11for
        direction=BU
        outfor=lv11recfor;
    id date interval=month;
    by region product;
run;
```

The syntax used for the software instructions in the above example (and for use with the systems and methods disclosed herein) is provided below.

The HPFRECONCILE procedure can be specified by the following statements:

```
PROC HPFRECONCILE < options > ;
    BY variables < / option > ;
    AGGBY variables < / option > ;
    ID variable INTERVAL=interval < / options > ;
    DISAGGDATA < options > ;
    AGGDATA < options > ;
```

Functional Summary

The statements and options used with the HPFRECONCILE procedure are summarized in the following table.

| Description | Statement | Option |
|---|---|---|
| Statements | | |
| Specify the AGGBY variables | AGGBY | |
| Specify the BY variables | BY | |
| Specify the time ID variable | ID | |
| specify custom variable names for the DISAGGDATA = data set | DISAGGDATA | |
| specify custom variable names for the AGGDATA = data set | AGGDATA | |
| Data Set Options | | |
| specify the disaggregated input data set (child level in the hierarchy) | HPFRECONCILE | DISAGGDATA= |

| Description | Statement | Option |
|---|---|---|
| specify the aggregated input data set (parent level in the hierarchy) | HPFRECONCILE | AGGDATA= |
| Specify the output data set | HPFRECONCILE | OUTFOR= |
| specify the data set that contains the constraints on the reconciled forecasts | HPFRECONCILE | CONSTRAINT= |
| specify that the user-specified constraints be forced on the reconciled prediction when the aggregation constraint cannot be satisfied | HPFRECONCILE | FORCECONSTRAINT |
| specify that the OUTFOR = data sets contain the RECDIFF variable | HPFRECONCILE | RECDIFF |
| specify the name of the variable that contains the actual values in the DISAGGDATA = data set | DISAGGDATA | ACTUAL= |
| specify the name of the variable that contains the actual values in the AGGDATA = data set | AGGDATA | PREDICT= |
| specify the name of the variable that contains the predicted values in the DISAGGDATA = data set | DISAGGDATA | ACTUAL= |
| specify the name of the variable that contains the predicted values in the AGGDATA = data set | AGGDATA | PREDICT= |
| specify the name of the variable that contains the lower confidence limit in the DISAGGDATA = data set | DISAGGDATA | LOWER= |
| specify the name of the variable that contains the lower confidence limit in the AGGDATA = data set | AGGDATA | LOWER= |
| specify the name of the variable that contains the upper confidence limit in the DISAGGDATA = data set | DISAGGDATA | UPPER= |
| specify the name of the variable that contains the upper confidence limit in the AGGDATA = data set | AGGDATA | UPPER= |
| specify the name of the variable that contains the prediction error in the DISAGGDATA = data set | DISAGGDATA | ERROR= |
| specify the name of the variable that contains the prediction error in the AGGDATA = data set | AGGDATA | ERROR= |
| specify the name of the variable that contains the standard error in the DISAGGDATA = dataset | DISAGGDATA | STD= |
| specify the name of the variable that contains the standard error in the AGGDATA = data set | AGGDATA | STD= |
| Error Message Options | | |
| specify the resolution of error and warning messages | HPFRECONCILE | ERRORTRACE= |
| Analysis Options | | |
| Specify the aggregation method | HPFRECONCILE | AGGREGATE= |
| Specify the confidence level | HPFRECONCILE | ALPHA= |
| specify the method of computing confidence limits | HPFRECONCILE | CLMETHOD= |
| Specify the reconciliation direction | HPFRECONCILE | DIRECTION= |
| Specify the ending time ID value | ID | END= |
| Specify the frequency | ID | INTERVAL= |
| Specify the disaggregation function | HPFRECONCILE | DISAGGREGATION= |
| specify that only the prediction is to be reconciled | HPFRECONCILE | PREDICTONLY |
| specify the method of computing standard errors | HPFRECONCILE | STDMETHOD= |
| specify boundaries for the standard error | HPFRECONCILE | STDDIFBD= |
| Specify the starting time ID value | ID | START= |
| specify that the loss function be weighted by the inverse of the prediction variances | HPFRECONCILE | WEIGHTED |

PROC HPFRECONCILE Statement
  PROC HPFRECONCILE options;
  The following options can be used in the PROC HPFRECONCILE statement.
Options Related to the Input Data Sets
  DISAGGDATA|DATA=SAS-data-set
    specifies the name of the SAS data set containing the forecast of the disaggregated time series data. Typically, the DISAGGDATA= data set is generated by the OUTFOR=statement of the HPFENGINE procedure.
    If the DISAGGDATA=data set is not specified, the data set opened last is used. The dimensions of the DISAGGDATA=data set are greater than the dimensions of the AGGDATA=data set. The DISAGGDATA=data set is to be sorted by the BY variables and by the ID variable when the latter is specified.
  AGGDATA=SAS-data-set
    specifies the name of the SAS data set containing the forecasts of the aggregated time series data. Typically, the AGGDATA=data set is generated by the OUTFOR=statement of the HPFENGINE procedure. If the AGGDATA=data set is not specified, only bottom-up reconciliation is allowed.
    The AGGDATA data set contains a proper subset, possibly empty, of the BY variables present in the DISAGGDATA data set. Such BY variables are called AGGBY variables. The AGGDATA=data sets are sorted by the AGGBY variables and by the ID variable when the latter is specified.

CONSTRAINT=SAS-data-set
specifies the name of the SAS data set containing the constraints for the reconciled series. See "CONSTRAINT=Data Set" for more details.

Options Related to the Output Data Sets
OUTFOR=SAS-data-set
specifies the name of the output SAS data set that will contain the reconciled values.
OUTRECFAIL=SAS-data-set
specifies the name of the SAS data set containing a summary of the nodes for which reconciliation failed.
FORCECONSTRAINT
specifies whether the user-specified constraints should be forced on the PREDICT variable in the OUTFOR=data set when the problem is infeasible because the constraints are incompatible with the aggregation constraint. The default is to leave the input unmodified.
RECDIFF
If the RECDIFF option is specified, the OUTFOR=data sets will contain a variable named RECDIFF that is the difference between the reconciled forecasts and the original forecasts.

Options Related to Error Messages
ERRORTRACE=option
specifies the resolution at which the error and warning messages should be printed to the log.
The following values are allowed:

| DATA | Messages are printed only one time at the end of the procedure run. |
| AGGBY | Messages are printed for each AGGBY group. |
| ID | Messages are printed for each ID value. |

The default is ERRORTRACE=DATA.

Options Related to the Analysis
AGGREGATE=TOTAL|AVERAGE
specifies whether the dependent variable in the AGGDATA=data set is the total sum or the average of the dependent variable in the DISAGGDATA=data set. The default is AGGREGATE=TOTAL.
ALPHA=n
specifies the level of the confidence limits when CLMETHOD=GAUSSIAN. The ALPHA=value must be between 0 and 1. When you specify ALPHA=, the upper and lower confidence limits will have a 1—confidence level. The default is ALPHA=0.05, which produces 95% confidence intervals. ALPHA values are rounded to the nearest hundredth.
CLMETHOD=option
specifies the method used to compute confidence limits for the reconciled forecasts.
The following methods are provided:

| GAUSSIAN | The confidence intervals are computed assuming that the forecasts are approximately Gaussian. |
| SHIFT | The confidence intervals are computed by recentering the original confidence intervals around the new forecasts. |

The default value is CLMETHOD=SHIFT.
DIRECTION=Reconciliation-Direction
specifies the reconciliation direction. The following reconciliation values are allowed:

| BU | Bottom-up reconciliation. |
| TD | Top-down reconciliation. |

If the AGGDATA=data set is not specified, only DIRECTION=BU is allowed.
The default value is DIRECTION=BU.
DISAGGREGATION=DIFFERENCE|PROPORTIONAL
specifies the type of loss function for top-down reconciliation.
DISAGGREGATION=PROPORTIONAL is available only when all the forecasts at a given ID value share the same sign.
The default value is DISAGGREGATION=DIFFERENCE.
PREDICTONLY
specifies that only the predicted value is to be reconciled.
SIGN=option
specifies the sign constraint on the reconciled series. Valid values are as follows: NONNEGATIVE|POSITIVE if the output series are supposed to be nonnegative. NONPOSITIVE|NEGATIVE if the output series are supposed to be nonpositive.
STDMETHOD=option
specifies the method used to compute standard errors for the reconciled forecasts. The following methods are provided:

| UNCHANGED | Reconciled standard errors are the original standard errors. |
| AGG | Reconciled standard errors are proportional to the original aggregated standard errors. |
| DISAGG | Reconciled standard errors are proportional to the original disaggregated standard errors. |

The default values are STDMETHOD=DISAGG for top-down reconciliation and STDMETHOD=AGG for bottom-up reconciliation. However, if the AGGDATA=data set is not specified for bottom-up reconciliation, then STDMETHOD=DISAGG is the default.
STDDIFBD=n
specifies a positive number that defines boundaries for the percentage difference between the original standard error and the reconciled standard error. If the percentage difference is greater than the values specified in the STDDIFBD=option, the reconciled standard error will be equal to the boundary value. For example, if STDDIFBD=0.3, the reconciled standard errors will be within a 30% band of the original standard errors.
The default value is STDDIFBD=0.25.
WEIGHTED
specifies that the loss function for top-down reconciliation be weighted by the inverse of the variance of the statistical forecasts.

By Statement

BY variables <NOTSORTED>;
The BY statement defines separate groups of observations for the DISAGGDATA=data set. BY variables can be either character or numeric.
All BY variables must exist in the DISAGGDATA=data set. Conversely, only a subset, or none, of the BY variables must be present in the AGGDATA=data set. The BY variables that are present in the AGGDATA=data set are called AGGBY variables. PROC HPFRECONCILE finds the AGGBY variables by comparing the variables in the BY statement with the variables in the AGGDATA=data set. The AGGBY groups follows the same sorting order in both the DISAGGDATA=and the AGGDATA=data sets. However, some groups can be missing from either data set if the NOTSORTED option is not specified. When the NOTSORTED option is specified, all AGGBY groups must be present in both data sets and must follow the same order. See the AGGBY statement for more details.

AGGBY Statement

AGGBY variables;
When DIRECTION=BU and the AGGDATA=data set is not specified, the AGGBY statement can be used to specify the BY variables in the OUTFOR=data set.
If the AGGDATA=data set is specified, the AGGBY statement is ignored.

ID Statement

ID variable INTERVAL=interval </options>;
The ID statement names a numeric variable that identifies observations in the input and output data sets. The ID variable's values are assumed to be date, time, or datetime values. In addition, the ID statement specifies the frequency associated with the time series. If the ID statement is specified, the INTERVAL=option is also to be specified. If an ID statement is not specified, the observation number, with respect to the BY group, is used as the time ID. If the ID statement is specified, the ID variable is present and has the same frequency in both the DISAGGDATA=data set and the AGGDATA=data set. The following options can be used with the ID statement.
IRREGULAR Option
specifies whether to allow for irregularities in the ID variable frequency. By default, irregularities are not allowed. That is, all ID values corresponding to the INTERVAL=frequency are present between the START=and END=values in both AGGDATA=and DISAGGDATA=data sets.
END=Option
specifies a date, datetime, or time value that represents the date at which the reconciliation should end. If the largest time ID variable value is less than the END=value, this option has no effect.
INTERVAL=Interval
specifies the frequency of the input time series. The frequency is the same for all input data sets. For example, if the input data sets consist of quarterly observations, then INTERVAL=QTR should be used. See the SAS/ETS User's Guide for the intervals that can be specified.
START=Option
specifies a SAS date, datetime, or time value that represents the time ID value at which the reconciliation should begin. This option can be used to limit the reconciliation process only to future forecasts—that is, forecasts that are outside the historical period—and reduce the computational burden. For example, START="&sysdate"D uses the automatic macro variable SYSDATE to start the reconciliation at the current date.

Disaggdata Statement

Figure 35:
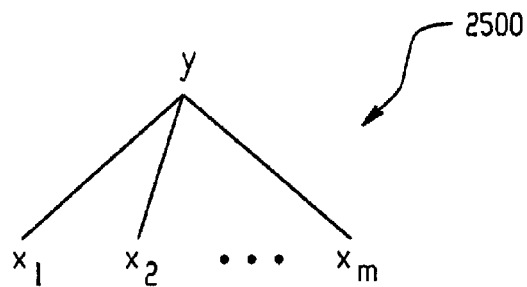
FIG. 35 depicts a two-level hierarchical structure.

DISAGGDATA <options>;
The DISAGGDATA statement enables the user to specify custom names for forecasting variables in the DISAGGDATA=data set. The default names are ACTUAL, PREDICT, LOWER, UPPER, ERROR, and STD.
The following options are available:
ACTUAL=variable-name
PREDICT=variable-name
LOWER=variable-name
UPPER=variable-name
ERROR=variable-name
STD=variable-name AGGDATA Statement AGGDATA <options>;
The AGGDATA statement enables the user to specify custom names for forecasting variables in the DISAGGDATA=data set. The default names are ACTUAL, PREDICT, LOWER, UPPER, ERROR, and STD.
The following options are available:
ACTUAL=variable-name
PREDICT=variable-name
LOWER=variable-name
UPPER=variable-name
ERROR=variable-name
STD=variable-name
Assume a two-level hierarchical structure as depicted at 2600 in FIG. 35. Let $y_t$ be the values of the parent series at time t, and let $$x_t = [x_{1,t}, x_{2,t}, \ldots, x_{m,t}]^t$$

be the vector child series at time t, t=1, . . . , T. As usual, indicate by $\hat{y}_t$ and $\hat{x}_t$ the pre-reconciliation statistical model forecasts of $y_t$ and $x_t$, respectively, and denote by $$\hat{\sigma}_t = [\hat{\sigma}_{1,t}, \hat{\sigma}_{2,t}, \ldots, \hat{\sigma}_{m,t}]^t$$

the vector of prediction standard error for $\hat{x}_t$. Denote by $\hat{\Sigma}$ the diagonal matrix whose main diagonal is $\hat{\sigma}^2$. Let $\tilde{y}_t$ and $\tilde{x}_t$ indicate instead the reconciled values. The number of child series m can vary with t; however, for simplicity, it is considered fixed in the following discussion. At each time t, the values of the series $x_{i,t}$, i=1 . . . , m, and $y_t$ are bound by an aggregation constraint. By default, the constraint is assumed to be $$y_t = \sum_{i=1}^{m} x_{i,t},$$

which corresponds to the AGGREGATE=TOTAL option of the PROC HPFRECONCILE statement. If instead the option AGGREGATE=AVERAGE is specified, the constraint is $$y_t = \frac{1}{m} \sum_{i=1}^{m} x_{i,t}.$$

For example, if the $x_i$'s are the sales at store level for a retail company, then $y_t$ can be either the total sales at company level or the average sales per store.

If you need to have forecasts at both levels of the hierarchy, it is often more convenient to produce statistical forecasts separately for each series. However, the resulting forecasts do not abide by the aggregation constraint that binds the original series. The after-the-fact process through which the statistical forecasts are modified to enforce the aggregation constraint is called reconciliation.

By determining whether the upper-level forecasts or the lower-level forecasts are adjusted to meet the aggregation constraint, you can distinguish between bottom-up (BU) and top-down (TD) reconciliation.

Additionally, PROC HPFRECONCILE enables you to impose constraints on the individual reconciled forecasts. For example, you can require that $\tilde{x}_1=10$ and $\tilde{x}_2 15$.

The goal of top-down (TD) reconciliation is to adjust the statistical forecasts $x_{i,t}$ to obtain new series $\{x_{i,t}\}$ of reconciled forecasts so that the sum of the reconciled forecasts at each fixed time t is equal to $\hat{y}_t$, and satisfies the constraints that you specify in the CONSTRAINT= data set.

The problem can be restated as follows: minimize with respect to $\hat{x}$ a quadratic loss function $$L(\tilde{x}_t;\hat{x}_t)$$

subject to the following constraints:
1. the top-down constraint $$\sum_{i=1}^{m} \tilde{x}_{i,t} = \hat{y}_t$$

2. the equality constraints $$\tilde{x}_{i,t} = e_{i,t}\, i \in E_t$$

3. the lower bounds $$\tilde{x}_{i,t} \geq l_{i,t}\, i \in L_t$$

4. the upper bounds $$\tilde{x}_{i,t} \leq u_{i,t}\, i \in U_t$$

where $E_t$, $L_t$, and $U_t$ are subsets of $\{1, 2, \ldots, m\}$.

When needed, PROC HPFRECONCILE uses an iterative interior-point algorithm to solve the quadratic optimization problem.

The loss function takes the following functional forms:

$$L(\tilde{x}_t;\hat{x}_t)=(\tilde{x}_t-\hat{x}_t)'W^{-1}(\tilde{x}_t-\hat{x}_t) \text{ when DISAGGREGATION=}$$

Difference

When DISAGGREGATION=PROPORTIONAL, the loss function is $$L(\tilde{x}_t;\hat{x}_t)=(\tilde{x}_t-\hat{x}_t)'\hat{X}^{-1/2}W^{-1}\hat{X}^{-1/2}(\tilde{x}_t-\hat{x}_t)$$

where W is a positive semidefinite matrix of weights independent of $\hat{x}_t$, and $\hat{X}^{-1/2}$ is a diagonal matrix with the square root of $\hat{x}_t$ on the main diagonal.

Note that the loss function when DISAGGREGATION=DIFFERENCE is defined for any value of $\hat{x}_t$.

On the other hand, when DISAGGREGATION=PROPORTIONS, the loss function is defined only when all $\hat{x}_{i,t}$ are strictly positive. However, the solutions can be extended to the cases where they are all nonnegative or they are all nonpositive by letting $\tilde{x}_{i,t}=0$ when $\hat{x}_{i,t}=0$. PROC HPFRECONCILE checks whether the signs of all forecasts at any given time t are concordant. If they are not, it uses DISAGGREGATION=DIFFERENCE for only those time ID values. In such a case, the _RECONSTATUS_ variable indicates for which observations the loss function used in the reconciliation process was different from the one that you specified in the PROC HPFRECONCILE statement. You can also use the ERRORTRACE=ID option to print a message to the log for each ID value for which the forecasts were not reconciled according to your specification.

The case where $$\sum_{j=1}^{m} \hat{x}_{j,t},$$

and DISAGGREGATION=PROPORTIONS is handled by setting $$\tilde{x}_{i,t} = \frac{\hat{y}_t}{m}$$

when AGGREGATE=TOTAL and $\tilde{x}_{i,t}=\hat{y}_t$ when AGGREGATE=AVERAGE.

If the WEIGHTED option is not specified, W is the identity matrix I. If the WEIGHTED option is specified, $W=\hat{\Sigma}$, the diagonal matrix with the variances of $\hat{x}_t$ on the main diagonal. When an observation has zero standard error, it is equivalent to imposing a locked equality constraint equal to the statistical forecast.

Unconstrained Solutions

Now consider the case where the only constraint is the top-down constraint and W=I. Under such hypotheses, the top-down problem admits intuitive solutions.

When DISAGGREGATION=DIFFERENCE, the loss function becomes $$L(\tilde{x}_t;\hat{x}_t) = \sum_{i=1}^{m} (\hat{x}_{i,t} - \tilde{x}_{i,t})^2$$

This leads to the following solution:

$$\tilde{x}_{i,t} = \hat{x}_{i,t} + \frac{r_t}{m}$$

where $r_t$ is the aggregation error—that is, $$r_t := \hat{y}_t - \sum_{i=1}^{m} \hat{x}_{i,t} \text{ when AGGREGATE = TOTAL}$$

and $$r_t := m\hat{y}_t - \sum_{i=1}^{m} \hat{x}_{i,t} \text{ when AGGREGATE = AVERAGE}$$

Thus, when DISAGGREGATION=DIFFERENCE, the reconciled forecast is $\tilde{x}_{i,t}$ found by equally splitting the aggregation error $r_t$ among the disaggregated forecasts $\hat{x}_{i,t}$.

Notice that even if all statistical forecasts $\hat{x}_{i,t}$ are strictly positive, the reconciled forecasts $\tilde{x}_{i,t}$ need not be so if no bounds are specified. In particular, $\hat{x}_{i,t}=0$ does not imply $\tilde{x}_{i,t}=0$. On the other hand, as previously mentioned, DISAGGREGATION=DIFFERENCE can be used when the statistical forecasts have discordant signs.

If DISAGGREGATION=PROPORTIONS, the loss function becomes $$L(\tilde{x}_t; \hat{x}_t) = \sum_{i=1}^{m} \left( \frac{\hat{x}_{i,t} - \tilde{x}_{i,t}}{\sqrt{\hat{x}_{i,t}}} \right)^2$$

This leads to the following solutions:

$$\tilde{x}_{i,t} = \frac{\hat{x}_{i,t}}{\sum_{j=1}^{m} \hat{x}_{j,t}} \hat{y}_t \text{ when AGGREGATE = TOTAL}$$

and $$\tilde{x}_{i,t} = \frac{\hat{x}_{i,t}}{\sum_{j=1}^{m} \hat{x}_{j,t}} m\hat{y}_t \text{ when AGGREGATE = AVERAGE}$$

Thus, the reconciled forecast $\tilde{x}_{i,t}$ is found by disaggregating $y_t$ or $my_t$ according to the proportion that $\hat{x}_{i,t}$ represents in the total sum of the disaggregated forecasts.

Missing Values

When some of the predicted values are missing, the missing values are replaced y the actual values $x_{i,t}$, if these are present. This is done to prevent bias between the aggregated and reconciled forecasts, which results from models in which missing values in the predictions are generated because of the presence of lagged variables.

When you use the WEIGHTED option and the standard error is missing, the weight is assumed to be the average of the non-missing variances. If all standard errors are missing, the weights are assumed to be all equal to one, which is equivalent to not using the WEIGHTED option.

Standard Errors

When STDMETHOD=UNCHANGED, the reconciled standard error $\tilde{\sigma}_{i,t}$ of $\tilde{x}_{i,t}$ is equal to the original standard error $\hat{\sigma}_{i,t}$ of $\hat{x}_{i,t}$.

When STDMETHOD=DISAGG, the reconciled standard error is proportional to the original disaggregated standard error and is computed as follows:

$$\tilde{\sigma}_{i,t} = w\hat{\sigma}_{i,t}$$

where $$w = \frac{\tilde{x}_{i,t}}{\hat{x}_{i,t}}$$

When STDMETHOD=AGG, the reconciled standard error of $\tilde{x}_{i,t}$ is proportional to the aggregated standard error. When AGGREGATE=TOTAL, it is $$\tilde{\sigma}_{i,t} = \tilde{p}_{i,t}\hat{\sigma}_t$$

and when AGGREGATE=AVERAGE, it is $$\tilde{\sigma}_{i,t} = \tilde{p}_{i,t}m\hat{\sigma}_t$$

where $$\tilde{p}_{i,t} = \frac{\tilde{x}_{i,t}}{\hat{y}_t},$$

and $\hat{\sigma}_t$ is the standard deviation of $\hat{y}_t$.

When a bound or a locked equality is active, the reconciled standard error is set to missing.

If the selected method for the standard errors fails, PROC HPFRECONCILE tries to use a different method and displays a warning message in the log. For example, if STDMETHOD=DISAGG and the standard error is missing in the DISAGGDATA=data set, STDMETHOD=AGG is used instead, if possible. In such a case, the –RECONSTATUS–variable identifies the observation that was not reconciled according to your preferences. You can also use the ERRORTRACE=ID option to display a message in the log that identifies the ID values for which the standard error was not reconciled according to your specification.

Confidence Limits

When CLMETHOD=SHIFT, the reconciled confidence limits are computed by recentering the original confidence limits around the reconciled predicted values.

When CLMETHOD=GAUSS, the reconciled confidence limits are computed assuming that the series is Gaussian with standard error equal to the reconciled standard error.

When a bound or a locked equality is active, the reconciled confidence limits are set to missing.

If the selected method for the confidence limits fails, PROC HPFRECONCILE tries to use a different method and displays a warning message in the log. For example, if CLMETHOD=SHIFT and the confidence limits are missing in the DISAGGDATA=data set, STDMETHOD=GAUSS is used instead. In such a case, the _RECONSTATUS_ variable identifies the observation that was not reconciled according to your preferences. You can also use the ERRORTRACE=ID option to display a message in the log that identifies the ID values for which the confidence limits were not reconciled according to your specification.

Bottom-Up Reconciliation

The goal of bottom-up (BU) reconciliation is to adjust $\hat{y}_t$ to obtain a new series $\{\tilde{y}_t\}$ of reconciled forecasts so that $\{\tilde{y}_t\}$ satisfies the aggregation constraint. When AGGREGATE=TOTAL, this is done by setting $$\tilde{y}_t = \sum_{i=1}^{m} \hat{x}_{i,t} \quad t = 1, 2, \ldots$$

When AGGREGATE=AVERAGE, this is done by setting $$\tilde{y}_t = \frac{1}{m}\sum_{i=1}^{m} \hat{x}_{i,t} \quad t = 1, 2, \ldots$$

Because the bottom-up problem is exactly identified and admits a unique solution, additional constraints on $\tilde{y}_t$ specified in the CONSTRAINT=data set are either already satisfied by the solution or result in an infeasible problem that will be flagged by the _RECONSTATUS_ variable in the OUTFOR=data set.

Missing Predicted Values

When some of the predicted values $\hat{x}_{i,t}$ are missing, the missing values are replaced by the actual values $x_{i,t}$ if these are present. This is done to prevent bias between the aggregated and reconciled forecasts, which results from models in which missing values in the predictions are generated because of the presence of lagged variables. However, if all predicted values are missing, then the reconciled predicted value $\tilde{y}_t$ will also be missing, even though the actual values $x_{i,t}$ might not be missing.

Standard Errors

When STDMETHOD=UNCHANGED, the reconciled standard error $\tilde{\sigma}_t$ of $\tilde{y}_t$ is equal to the original standard error $\hat{\sigma}_t$ of $\hat{y}_t$.

When STDMETHOD=AGG, the reconciled standard error is proportional to the original aggregated standard error and is computed as follows:

$$\tilde{\sigma}_t = \omega \hat{\sigma}_t$$

Where $$\omega = \frac{\tilde{y}_t}{\hat{y}_t}.$$

If STDMETHOD=DISAGG, the reconciled standard error $\tilde{\sigma}_t$ is equal to the square root of the sum of the squares of the disaggregated standard errors when AGGREGATE=TOTAL, and to the square root of the average of the squares of the disaggregated standard errors when AGGREGATE=AVERAGE.

If the selected method for the standard errors fails, PROC HPFRECONCILE tries to use a different method and displays a warning message in the log. For example, if STDMETHOD=AGG and the standard error is missing in the AGGDATA=data set, STDMETHOD=DISAGG is used instead, if possible. In such a case, the _RECONSTATUS_ variable identifies the observation that was not reconciled according to your preferences. You can also use the ERRORTRACE=ID option to display a message in the log that identifies the ID values for which the standard error was not reconciled according to your specification.

Confidence Limits

When CLMETHOD=SHIFT, the reconciled confidence limits are computed by recentering the original confidence limits around the reconciled predicted values.

When CLMETHOD=GAUSS, the reconciled confidence limits are computed assuming that the series is Gaussian with standard error equal to the reconciled standard error.

If the selected method for the confidence limits fails, PROC HPFRECONCILE tries to use a different method and displays a warning message in the log. For example, if CLMETHOD=SHIFT and the confidence limits are missing in the AGGDATA=data set, STDMETHOD=GAUSS is used instead, if possible. In such a case, the _RECONSTATUS_ variable identifies the observation that was not reconciled according to your preferences. You can also use the ERRORTRACE=ID option to display a message in the log that identifies the ID values for which the confidence limits were not reconciled according to your specification.

Data Set Input/Output

DISAGGDATA=Data Set

The DISAGGDATA=data set contains the variable(s) specified in the BY statement, the variable in the ID statement (when this statement is specified), and the following variables:

| | |
|---|---|
| _NAME_ | Variable name |
| ACTUAL | Actual values |
| PREDICT | Predicted values |
| LOWER | Lower confidence limits |
| UPPER | Upper confidence limits |
| ERROR | Prediction errors |
| STD | Prediction standard errors |

Typically, the DISAGGDATA=data set is generated by the OUTFOR=option of the HPFENGINE procedure.

You can specify custom names for the variables in the DISAGGDATA=data set by using the DISAGGDATA statement.

AGGDATA=Data Set

The AGGDATA=data set contains a subset or none of the variables specified in the BY statement, the time ID variable in the ID statement (when this statement is specified), and the following variables:

| | |
|---|---|
| _NAME_ | Variable name |
| ACTUAL | Actual values |
| PREDICT | Predicted values |
| LOWER | Lower confidence limits |
| UPPER | Upper confidence limits |
| ERROR | Prediction errors |
| STD | Prediction standard errors |

Typically, the AGGDATA=data set is generated by the OUTFOR=option of the HPFENGINE procedure.

You can specify custom names for the variables in the AGGDATA=data set by using the AGGDATA statement.

CONSTRAINT=Data Set

The CONSTRAINT=data set specifies the constraints to be applied to the reconciled forecasts. It contains the BY variables for the level at which reconciled forecasts are generated. That is, it contains the AGGBY variables when DIRECTION=BU, and the variables specified in the BY statement when DIRECTION=TD. If the _NAME_ variable is present in the AGGDATA=and DISAGGDATA=data set, it also is present in the CONSTRAINT=data set. Additionally, the CONSTRAINT=data set contains the variable in the ID statement (when this statement is specified), and the following variables:

| | |
|---|---|
| EQUALITY | specifies an equality constraint for the predicted reconciled values. |
| UNLOCK | A flag that specifies whether the equality constraint should be strictly enforced. Admissible values are as follows:<br>0 The equality constraint is locked.<br>1 The equality constraint is unlocked. |

When EQUALITY is nonmissing and the UNLOCK flag is missing, the equality is treated as locked.

| | |
|---|---|
| LOWERBD | Lower bounds for the reconciled forecasts |
| UPPERBD | Upper bounds for the reconciled forecasts |

Locked equality constraints are treated as constraints in the top-down optimization process, and therefore their value is honored. Unlocked equalities are instead treated as regular forecasts and, in general, are changed by the reconciliation process.

If the NOTSORTED option is specified in the BY statement, then any BY group in the CONSTRAINT=data set that is out of order with respect to the BY groups in the AGGDATA=or DISAGGDATA=data set is ignored without any error or warning message. If the NOTSORTED option is not specified, then the BY groups in the CONSTRAINT=data set is in the same sorted order as the AGGBY groups in the AGGDATA=data set when DIRECTION=BU, and in the same sorted order as the BY groups in the DISAGGDATA=data set when DIRECTION=TD; otherwise processing stops at the first such occurrence of a mismatch.

OUTFOR=Data Set

When DIRECTION=TD, the OUTFOR=data set contains the variables in the DISAGGDATA=data set and the _RECONSTATUS_ variable.

When DIRECTION=BU and the AGGDATA=data set has been specified, the OUTFOR=data set contains the variables in the AGGDATA=data set and the _RECONSTATUS_ variable. Otherwise, the AGGDATA=data set contains the BY variables specified in the AGGBY statement, the time ID variable in the ID statement (when this statement is specified), and the following variables:

| | |
|---|---|
| _NAME_ | Variable name |
| ACTUAL | Actual values |
| PREDICT | Predicted values |
| LOWER | Lower confidence limits |
| UPPER | Upper confidence limits |
| ERROR | Prediction errors |
| STD | Prediction standard errors |
| _RECONSTATUS_ | Reconciliation status |

If the RECDIFF option of the HPFRECONCILE statement has been specified, the OUTFOR=data sets will also contain the following variable:

| | |
|---|---|
| RECDIFF | Difference between the reconciled predicted value and the original predicted value. |

The _RECONSTATUS_ variable contains a code that specifies whether the reconciliation has been successful or not. A corresponding message is also displayed in the log. You can use the ERRORTRACE=option to define the resolution at which the error and warning messages are displayed in the log. The _RECONSTATUS_ variable can take the following values:

| | |
|---|---|
| 0 | Success |
| 500 | A locked equality constraint has been imposed |
| 600 | A lower bound is active |
| 700 | An upper bound is active |
| 1000 | ID value out of the range with respect to the START= and END= interval |
| 2000 | Insufficient data to reconcile |
| 3000 | Reconciliation failed for the predicted value. This implies that it also failed for the confidence limits and standard error. |
| 4000 | Reconciliation failed for the standard error. |
| 5000 | Reconciliation failed for the confidence limits. |
| 6000 | The constrained optimization problem is infeasible. |
| 7000 | The option DISAGGREGATION = PROPORTION has been changed to DISAGGREGATION = DIFFERENCE for this observation because of a discordant sign in the input. |
| 8000 | The option STDMETHOD= provided by the user has been changed for this observation. |
| 9000 | The option CLMETHOD= provided by the user has been changed for this observation. |
| 10000 | The standard error hit the limits imposed by the STDDIFBD= option. |
| 11000 | Multiple warnings have been displayed in the log for this observation. |

Example Operational Scenario To Illustrate Reconciling a Hierarchical Tree

The HPFRECONCILE procedure reconciles forecasts between two levels of a hierarchy. It can also be used recursively for reconciling the whole hierarchy.

Consider the hierarchy structure for the SASHELP.PRICEDATA data set shown in FIG. 34. You can reconcile the hierarchy top down, starting from the top level 0 down to the bottom level 2. At each new iteration, the OUTFOR=data set of the previous reconciliation step becomes the AGGDATA=data set of the current step.

First you need to compute the statistical forecasts for all levels. The forecasts at the company levels are computed as follows.

```
/*
/ Forecast series at company level
/------------------------------------------------------------------------------*/
*Step 1: model selection;
proc hpfdiagnose data=sashelp.pricedata
    outest=1v10est
    modelrepository=work.mycat
    prefilter=both
    criterion=mape;
    id date interval=month notsorted;
    forecast sale / accumulate=total;
    input price / accumulate=average;
run;
*Step 2: estimation and forecasting;
proc hpfengine data=sashelp.pricedata inest=1v10est
    out=_null_ outest=1v10fest
```

```
modelrepository=work.mycat outfor=lvl0for;
id date interval=month notsorted;
forecast sale / task=select accumulate=total;
stochastic price / accumulate=average;
run;
```

First you reconcile the top and region levels. The output data set lvl1recfor contains the reconciled forecasts at level 1. This data set becomes the AGGDATA=data set for the next step of TD reconciliation that involves level 1 and level 2. You can check that the reconciled forecasts at level 2 add up to the forecasts at level 0.

```
/*
/ Reconcile forecasts top down from company to region
/-----------------------------------------------------------------------------*/
proc hpfreconcile disaggdata=lvl1 for aggdata=lvl0 for
        direction=TD
        outfor=lvl1recfor;
    id date interval=month;
    by region;
run;
/*
/ Reconcile forecasts top down from region to region/product
/-----------------------------------------------------------------------------*/
Proc hpfreconcile disaggdata=lvl2 for aggdata=lvl1recfor
        direction=TD
        outfor= lvl2recfor;
    id date interval=month;
    by region product;
run;
/*
/ Verify that level 2 forecasts add up to level 0 forecasts
/-----------------------------------------------------------------------------*/
proc timeseries data=lvl2 recfor out=toprec ;
    id date interval=month notsorted accumulate=total;
    var predict;
run;
proc compare base=lvl0for compare=toprec criterion=0.00001;
    var predict;
run;
```

You can also reconcile the hierarchy from the bottom up. In such a case, the OUTFOR=data set of the previous step becomes the DISAGGDATA=data set of the current step. Alternatively, you could choose to reconcile the hierarchy from the middle out from an intermediate level. In this case, you choose an intermediate level as a starting point, and reconcile all levels above from the bottom up, while reconciling all levels below from the top down. In the following SAS code, the hierarchy of FIG. 34 is reconciled from the middle out, starting from level 1.

```
/*
/ Reconcile forecasts bottom up from region to company
/-----------------------------------------------------------------------------*/
proc hpfreconcile disaggdata=lvl1 for aggdata=lvl0for
        direction=BU
        outfor= lvl0recfor;
    id date interval=month;
    by region;
run;
/*
/ Reconcile forecasts top down from region to region/product
/-----------------------------------------------------------------------------*/
proc hpfreconcile disaggdata=lvl2 for aggdata=lvl1for
        direction=TD
        outfor=lvl2recfor;
```

```
    id date interval=month;
    by region;
run;
```

You can use the external forecasts feature of the HPFENGINE procedure to generate summary statistics and statistics of fit for the reconciled forecasts, as shown in the following SAS statements for the company level. First, an external model spec is generated using PROC HPFEXMSPEC (which is available from SAS Institute Inc.). The characteristics of estimated models that determine the options for PROC HPFEXMSPEC can be found in the OUTEST=data set of the HPFENGINE call for the corresponding level. In this case, the lvl0fest data set shows that the estimated model has three parameters and that the dependent variable sales has not undergone any transformation.

```
/*
/ Generate external model spec
/-----------------------------------------------------------------------------*/
proc hpfexmspec modelrepository=work.mycat
        specname=lvl0exm;
    exm transform=none nparms=3;
run;
```

Subsequently, a selection list containing the external model is defined with PROC HPFSELECT (which is available from SAS Institute Inc.).

```
/*
/ Generate select list
/-----------------------------------------------------------------------------*/
proc hpfselect modelrepository=work.mycat
        selectname=lvl0selexm;
    spec lvl0exm;
run;
```

Finally, the EXTERNAL statement of the HPFENGINE procedure is used in conjunction with the FORECAST statement to generate the OUTSTAT=and OUTSUM=data sets that correspond to the reconciled forecasts input data set lvl0recfor and the model specifications contained in the external model lvl0exm.

```
/*
/ Create OUTSTAT= and OUTSUM= data sets
/-----------------------------------------------------------------------------*/
proc hpfengine data=lvl0recfor (rename= (actual=sales))
        out=_NULL_
        outstat=lvl0outstat
        outsum=lvl0outsum
        modelrepository=work.mycat
        globalselection=lvl0selexm;
    id date interval=month notsorted;
    forecast sales;
    external sales=(predict=predict lower=lower
        upper=upper stderr=std);
run;
```

Example Operational Scenario to Illustrate Aggregating Forecasts

If you do not provide the AGGDATA=input data set, but provide only the DISAGGDATA=data set, PROC HPFRECONCILE aggregates the forecasts according to the BY variable that you specify in the AGGBY option. If you use the options STDMETHOD=DISAGG and CLMETHOD=GAUSS, you can obtain standard errors and confidence interval as well.

In this example, the forecasts at level 2 of FIG. 34 are aggregated to find forecasts at level 1.

```
/*
/ Aggregate region/product forecasts to region level
/--------------------------------------------------------------------------------*/
proc hpfreconcile disaggdata=lvl2 for
        direction=BU
        outfor=lvl1aggfor
        stdmethod=disagg
        clmethod=gauss;
    id date interval=month;
    by region product;
    aggby region;
run;
```

Example Operational Scenario To Illustrate Disaggregating Forecasts

You can use the HPFRECONCILE procedure to disaggregate top-level forecasts according to proportions that you supply. This can be accomplished by creating a DISAGGDATA=data set that contains the proportions that you want to use in place of the PREDICT variable. In this example, the level 1 forecasts of the variable sale in a data set are disaggregated to level 2 according to the historical median proportions.

First, a combination of DATA steps and PROC UNIVARIATE is used to compute the median proportions and merge them with the level 2 OUTFOR=data set from PROC HPFENGINE.

```
/*
/ Compute total sales per region
/--------------------------------------------------------------------------------*/
proc timeseries data=sashelp.pricedata out=lvl1sales ;
    id date interval=month notsorted accumulate=total;
    by region;
    var sale;
run;
/*
/ Compute sale proportions
/--------------------------------------------------------------------------------*/
proc sort data=sashelp.pricedata out=tmp;
    by region date;
run;
data lvl2 prop;
    merge tmp lvl1sales (rename= (sale=totsale));
    by region date;
    prop = sale / totsale;
run;
/*
/ Compute median sale proportions
/--------------------------------------------------------------------------------*/
proc sort data=lvl2prop;
    by region product;
run;
proc univariate data=lvl2prop noprint;
    var prop;
    by region product;
    output out=lvl2medprop median=medprop;
run;
/*
/ Merge median proportions with level2 OUTFOR
/--------------------------------------------------------------------------------*/
data lvl2medfor;
    merge lvl2for lvl2medprop;
    by region product;
run;
```

Then PROC HPFRECONCILE is invoked, using the DISAGGDATA statement to specify that the variable medprop is to be used instead of the default PREDICT. Note that the proportions need not sum to one. PROC HPFRECONCILE automatically rescales them to sum to one.

```
/*
/ Disaggregate level1 forecasts according to median sale
/--------------------------------------------------------------------------------*/
proc hpfreconcile disaggdata=lvl2medfor aggdata=lvl1for
        direction=TD
        stdmethod=unchanged
        clmethod=gauss
        outfor=lvl2recmedfor;
    disaggdata predict=medprop;
    by region product;
run;
```

The variable medprop in the OUTFOR=lvl2recmedfor data set contains the disaggregated forecasts according to the proportions that you supplied.

In this case the options STDMETHOD=UNCHANGED and CLMETHOD=GAUSS have been used to obtain standard errors and confidence intervals. However, you need to be aware that they might not be reliable.

Alternatively, if you are interested in disaggregating the predicted values only, you can use the PREDICTONLY option as in the following code.

```
/*
/ Disaggregate level1 predict only
/--------------------------------------------------------------------------------*/
proc hpfreconcile disaggdata=lvl2medfor aggdata=lvl1for
        direction=TD
        predictonly
        outfor= lvl2recmedfor;
    disaggdata predict=medprop;
    by region product;
run;
```

Example Operational Scenario To Illustrate Imposing Constraints

You can impose constraints on the reconciled forecasts by using the CONSTRAINT=option or the SIGN=option.

In this example, different types of constraints are imposed on the reconciled forecasts. Suppose you want all reconciled forecasts to be nonnegative, and for the month of April 2003 you want the following:

1. Product 1 at Region 1 to have a locked equality of 400
2. Product 2 at Region 1 to have an unlocked equality of 400
3. Product 4 at Region 2 to be less or equal to 300

First you need to create a CONSTRAINT=data set that contains the constraints you want for the date of April 2003.

```
/*
/ Create constraint data set
/------------------------------------------------------------------------------*/
data constraint;
    length __name__ $32;
    input region product __name__ $ date MONYY7. equality
        unlock lowerbd upperbd;
    datalines;
    1 1 sale Apr2003 400 0 . .
    1 2 sale Apr2003 400 1 . .
    2 4 sale Apr2003 . .  . 300
    ;
run;
```

Then you reconcile the two levels by using the SIGN=NONNEGATIVE option to impose the normegativity constraint, and by using the CONSTRAINT=option to impose your constraints on the reconciled forecasts in April 2003. The PREDICTONLY option of the HPFRECONCILE statement restricts the reconciliation to the PREDICT variable.

```
/*
/ Reconcile forecasts with constraints
/------------------------------------------------------------------------------*/
proc hpfreconcile disaggdata=1v12fbr aggdata=1v11for
        direction=TD
        sign=nonnegative
        constraint=constraint
        outfor=1v12recfor
        predictonly;
    id date interval=month;
    by region product;
run;
```

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, a system can reconcile forecasts of time series data at two different levels of aggregation. Optionally, the HPFRECONCILE procedure can disaggregate forecasts from upper-level forecasts or aggregate forecasts from lower-level forecasts. Additionally, the procedure can enable the user to specify the direction and the method of reconciliation, equality constraints, and bounds on the reconciled values at each point in time.

A system can be also configured to enable the reconciliation of two levels of a hierarchy of forecasts while simultaneously taking into account judgmental forecasts and bounds imposed by the user. In this process, it makes an efficient use of the information about the variability of the forecasts. The problem is solved by minimizing a quadratic loss function using an efficient interior point quadratic programming algorithm.

Another system can be configured for reconciliation of a large-scale hierarchy of forecasts. This system reconciles a hierarchy when judgmental forecasts are present. The user can choose whether the constraint implied by the judgmental forecasts should be influencing other levels of the hierarchy. Furthermore, conflicting judgmental forecasts in different parts of the hierarchy, which lead to an infeasible reconciliation problem, are identified by a fast parser (conflict checker) before reconciliation takes place. The user is presented with two options for dealing with such conflicts.

It is further noted that the systems and methods disclosed herein may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for reconciling hierarchical forecasts, comprising:
   receiving, using one or more processing units, a plurality of input hierarchical forecast data sets, wherein the hierarchical forecast data sets include forecasts independently generated for each of a plurality of nodes hierarchically arranged according to parent child relationships, wherein one or more of the forecasts are included in records of a parent data set, wherein one or more of the forecasts are included in records of a child data set, and wherein the records of the child data set are in a particular order according to an index;
   generating, the one or more processing units, an output child data set including one record for each of the records in the child data set in an identical order as the child data set, wherein the output child data set record includes an index value and a status indicator representing an unprocessed state;
   identifying, using the one or more processing units, a particular parent data set forecast from the parent data set;
   identifying, using the one or more processing units, locations for a group of one or more child data set forecasts that are children of the particular parent data set forecast;
   accessing, using the one or more processing units, the one or more identified child data set forecasts using the identified locations;
   performing, using the one or more processing units, a reconciliation operation based upon the particular parent data set forecast and the one or more accessed child data set forecasts, wherein the reconciled particular parent data set forecast is mathematically equivalent to the aggregation of the reconciled one or more accessed child data set forecasts, wherein the reconciled forecasts include associated measures of uncertainty, and wherein the reconciliation operation adjusts a particular child data set forecast;
   storing, using the one or more processing units, the adjusted child data set forecast in a record of the output child data set using the index value corresponding to the particular child data forecast; and
   changing, the one or more processing units, the status indicator for the record of the output child data set to represent a processed state.

2. The method of claim 1, wherein the parent data set records include one or more parent entity attributes, wherein the child data set records include one or more child entity attributes, and wherein the index values for the group of one or more child data set forecasts are identified based upon a match between the parent entity attributes and the child entity attributes.

3. The method of claim 1, wherein the adjustment to the particular child data set forecast results in a sum of the group of child set forecasts equaling the particular parent data set forecast.

4. The method of claim 1, wherein the adjustment to the particular child data set forecast results in an average of the group of child set forecasts equaling the particular parent data set forecast.

5. The method of claim 1, further comprising:
   identifying a next parent data set forecast from the parent data set;
   identifying further locations for a group of one or more further child data set forecasts that are children of the next parent data set forecast;
   accessing the one or more identified further child data set forecasts using the identified further locations;
   performing a reconciliation operation based upon the next parent data set forecast and the one or more accessed further child data set forecasts, wherein the reconciled next parent data set forecast is mathematically equivalent to the aggregation of the reconciled one or more accessed further child data set forecasts, wherein the reconciled forecasts include associated measures of uncertainty, and wherein the reconciliation operation adjusts a particular child data set forecast;
   storing the adjusted further child data set forecast in a further record of the output child data set using an index value corresponding to the particular further child data forecast; and
   changing the status indicator for the further record of the output child data set to represent a processed state.

6. The method of claim 1, further comprising:
   storing copies of a plurality of the records of the child data set in memory, wherein locations for the group of one or more child data set forecasts that are children of the particular parent data set forecast are identified using the stored copies.

7. The method of claim 6, further comprising:
   replacing one or more of the stored copies with one or more additional copies of records of the child data set.

8. The method of claim 6, wherein a number of copies stored is based upon an amount of memory space designated as cache storage.

9. The method of claim 6, further comprising:
   storing a pointer to a first record in the plurality of records in the child data set, wherein the first record is not stored in the memory.

10. The method of claim 9, further comprising:
    using the pointer to replace one or more of the stored copies with one or more additional copies of records in the child data set.

11. A computer-implemented system, comprising:
    one or more processors;
    one or more non-transitory computer-readable storage media containing instructions configured to cause the one or more processors to perform operations including:
       receiving a plurality of input hierarchical forecast data sets, wherein the hierarchical forecast data sets include forecasts independently generated for each of a plurality of nodes hierarchically arranged according to parent child relationships, wherein one or more of the forecasts are included in records of a parent data set, wherein one or more of the forecasts are included in records of a child data set, and wherein the records of the child data set are in a particular order according to an index;
       generating an output child data set including one record for each of the records in the child data set in an identical order as the child data set, wherein the output child data set record includes an index value and a status indicator representing an unprocessed state;
       identifying a particular parent data set forecast from the parent data set;
       identifying locations for a group of one or more child data set forecasts that are children of the particular parent data set forecast;
       accessing the one or more identified child data set forecasts using the identified locations;
       performing a reconciliation operation based upon the particular parent data set forecast and the one or more accessed child data set forecasts, wherein the reconciled particular parent data set forecast is mathematically equivalent to the aggregation of the reconciled one or more accessed child data set forecasts, wherein the reconciled forecasts include associated measures of uncertainty, and wherein the reconciliation operation adjusts a particular child data set forecast;
storing the adjusted child data set forecast in a record of the output child data set using the index value corresponding to the particular child data forecast; and
changing the status indicator for the record of the output child data set to represent a processed state.

12. The system of claim 11, wherein the parent data set records include one or more parent entity attributes, wherein the child data set records include one or more child entity attributes, and wherein the index values for the group of one or more child data set forecasts are identified based upon a match between the parent entity attributes and the child entity attributes.

13. The system of claim 11, wherein the adjustment to the particular child data set forecast results in a sum of the group of child set forecasts equaling the particular parent data set forecast.

14. The system of claim 11, wherein the adjustment to the particular child data set forecast results in an average of the group of child set forecasts equaling the particular parent data set forecast.

15. The system of claim 11, further comprising instructions configured to cause the one or more processors to perform operations including:
identifying a next parent data set forecast from the parent data set;
identifying further locations for a group of one or more further child data set forecasts that are children of the next parent data set forecast;
accessing the one or more identified further child data set forecasts using the identified further locations;
performing a reconciliation operation based upon the next parent data set forecast and the one or more accessed further child data set forecasts, wherein the reconciled next parent data set forecast is mathematically equivalent to the aggregation of the reconciled one or more accessed further child data set forecasts, wherein the reconciled forecasts include associated measures of uncertainty, and wherein the reconciliation operation adjusts a particular child data set forecast;
storing the adjusted further child data set forecast in a further record of the output child data set using an index value corresponding to the particular further child data forecast; and
changing the status indicator for the further record of the output child data set to represent a processed state.

16. The system of claim 11, further comprising instructions configured to cause the one or more processors to perform operations including:
storing copies of a plurality of the records of the child data set in memory, wherein locations for the group of one or more child data set forecasts that are children of the particular parent data set forecast are identified using the stored copies.

17. The system of claim 16, further comprising instructions configured to cause the one or more processors to perform operations including:
replacing one or more of the stored copies with one or more additional copies of records of the child data set.

18. The system of claim 16, wherein a number of copies stored is based upon an amount of memory space designated as cache storage.

19. The system of claim 16, further comprising instructions configured to cause the one or more processors to perform operations including:
storing a pointer to a first record in the plurality of records in the child data set, wherein the first record is not stored in the memory.

20. The system of claim 19, further comprising instructions configured to cause the one or more processors to perform operations including:
using the pointer to replace one or more of the stored copies with one or more additional copies of records in the child data set.

21. A computer-program product tangibly embodied in a non-transitory computer-readable storage medium, including instructions configured to cause a data processing system to:
receive a plurality of input hierarchical forecast data sets, wherein the hierarchical forecast data sets include forecasts independently generated for each of a plurality of nodes hierarchically arranged according to parent child relationships, wherein one or more of the forecasts are included in records of a parent data set, wherein one or more of the forecasts are included in records of a child data set, and wherein the records of the child data set are in a particular order according to an index;
generate an output child data set including one record for each of the records in the child data set in an identical order as the child data set, wherein the output child data set record includes an index value and a status indicator representing an unprocessed state;
identify a particular parent data set forecast from the parent data set;
identify locations for a group of one or more child data set forecasts that are children of the particular parent data set forecast;
access the one or more identified child data set forecasts using the identified locations;
perform a reconciliation operation based upon the particular parent data set forecast and the one or more accessed child data set forecasts, wherein the reconciled particular parent data set forecast is mathematically equivalent to the aggregation of the reconciled one or more accessed child data set forecasts, wherein the reconciled forecasts include associated measures of uncertainty, and wherein the reconciliation operation adjusts a particular child data set forecast;
store the adjusted child data set forecast in a record of the output child data set using the index value corresponding to the particular child data forecast; and
change the status indicator for the record of the output child data set to represent a processed state.

22. The computer-program product of claim 21, wherein the parent data set records include one or more parent entity attributes, wherein the child data set records include one or more child entity attributes, and wherein the index values for the group of one or more child data set forecasts are identified based upon a match between the parent entity attributes and the child entity attributes.

23. The computer-program product of claim 21, wherein the adjustment to the particular child data set forecast results in a sum of the group of child set forecasts equaling the particular parent data set forecast.

24. The computer-program product of claim 21, wherein the adjustment to the particular child data set forecast results in an average of the group of child set forecasts equaling the particular parent data set forecast.

25. The computer-program product of claim 21, further comprising instructions configured to cause a data processing system to:
  identify a next parent data set forecast from the parent data set;
  identify further locations for a group of one or more further child data set forecasts that are children of the next parent data set forecast;
  access the one or more identified further child data set forecasts using the identified further locations;
  perform a reconciliation operation based upon the next parent data set forecast and the one or more accessed further child data set forecasts, wherein the reconciled next parent data set forecast is mathematically equivalent to the aggregation of the reconciled one or more accessed further child data set forecasts, wherein the reconciled forecasts include associated measures of uncertainty, and wherein the reconciliation operation adjusts a particular child data set forecast;
  store the adjusted further child data set forecast in a further record of the output child data set using an index value corresponding to the particular further child data forecast; and
  change the status indicator for the further record of the output child data set to represent a processed state.

26. The computer-program product of claim 21, further comprising instructions configured to cause a data processing system to:
  store copies of a plurality of the records of the child data set in memory, wherein locations for the group of one or more child data set forecasts that are children of the particular parent data set forecast are identified using the stored copies.

27. The computer-program product of claim 26, further comprising instructions configured to cause a data processing system to:
  replace one or more of the stored copies with one or more additional copies of records of the child data set.

28. The computer-program product of claim 26, wherein a number of copies stored is based upon an amount of memory space designated as cache storage.

29. The computer-program product of claim 26, further comprising instructions configured to cause a data processing system to:
  store a pointer to a first record in the plurality of records in the child data set, wherein the first record is not stored in the memory.

30. The computer-program product of claim 29, further comprising instructions configured to cause a data processing system to:
  use the pointer to replace one or more of the stored copies with one or more additional copies of records in the child data set.

* * * * *